United States Patent [19]

Hara et al.

[11] Patent Number: 5,473,906
[45] Date of Patent: Dec. 12, 1995

[54] AIR CONDITIONER FOR VEHICLE

[75] Inventors: Junichiro Hara, Yokohama; Takayoshi Matsuoka, Yokosuka, both of Japan

[73] Assignee: Nissan Motor Co., Ltd., Yokohama, Japan

[21] Appl. No.: 301,988

[22] Filed: Sep. 9, 1994

Related U.S. Application Data

[63] Continuation-in-part of Ser. No. 185,419, Jan. 24, 1994, Pat. No. 5,375,427.

[30] Foreign Application Priority Data

Jan. 29, 1993 [JP] Japan ..................... 5-13898
Jan. 31, 1994 [JP] Japan ..................... 6-010027

[51] Int. Cl.$^6$ ............................ F25B 13/00; F25B 19/00
[52] U.S. Cl. .................... 62/160; 62/90; 62/231; 62/324.6
[58] Field of Search ............... 62/90, 324.6, 196.4, 62/117, 173, 159, 160

[56] References Cited

U.S. PATENT DOCUMENTS

| | | | |
|---|---|---|---|
| 3,798,920 | 3/1974 | Morgan | 62/173 |
| 5,277,034 | 1/1994 | Hodo et al. | 62/160 |
| 5,299,431 | 4/1994 | Iritani et al. | 62/243 |
| 5,355,690 | 10/1994 | Iritani et al. | 62/184 |
| 5,375,427 | 12/1994 | Hara et al. | 62/159 |

FOREIGN PATENT DOCUMENTS

| | | |
|---|---|---|
| 2-130808 | 10/1990 | Japan . |
| 2-290475 | 11/1990 | Japan . |
| 2258302 | 2/1993 | United Kingdom . |

Primary Examiner—William E. Wayner
Attorney, Agent, or Firm—Foley & Lardner

[57] ABSTRACT

An air conditioner for a vehicle having a compressor, an outer heat exchanger, a heat-radiating inner heat exchanger an expansion valve, a heat-absorbing inner heat exchanger which are connected therebetween. A connecting condition of these elements is changed into one of a cooling, a first heating and a second heating, by controlling a refrigerant passage switching device. During the cooling, refrigerant in the air conditioner is circulated in the order of at least the outer heat exchanger, the expansion valve, the heat-absorbing inner heat exchanger and the compressor. During the first heating the refrigerant is circulated in the order of the heat-radiating inner heat exchanger, the expansion valve, the heat-absorbing inner heat exchanger and the compressor while bypassing the outer heat exchanger. During the second heating, the refrigerant is circulated in the order of the heat-radiating inner heat exchanger, the expansion valve, at least the outer heat exchanger and the compressor. Therefore, it becomes possible to implement a heating operation in a wide-range from an intensely cold condition to a slightly cool condition while saving an energy consumption.

19 Claims, 53 Drawing Sheets

FIG.5

| MODE | FOUR-WAY VALVE | | REFRIGERANT FLOW SWITCHING VALVE | | | HEAT-RADIATING INNER HEAT EXCHANGER | HEAT-ABSORBING INNER HEAT EXCHANGER | OUTER HEAT EXCHANGER |
|---|---|---|---|---|---|---|---|---|
| | 1ST | 2ND | 1ST | 2ND | 3RD | | | |
| | 90 | 91 | 92 | 93 | 94 | 33 | 35 | 38 |
| COOLING | CONT. LINE | CONT. LINE | OPEN | CLOSE | OPEN | CONDENSER | EVAPORATOR | CONDENSER |
| HEATING | CONT. LINE | CONT. LINE | CLOSE | OPEN | CLOSE | CONDENSER | EVAPORATOR | NOT USED |
| WEAK HEATING | DOTTED LINE | DOTTED LINE | OPEN | CLOSE | OPEN | CONDENSER | EVAPORATOR | EVAPORATOR |

FIG.7

| MODE | FOUR-WAY VALVE | | REFRIGERANT CONTROL VALVE | HEAT-RADIATING INNER HEAT EXCHANGER | HEAT-ABSORBING INNER HEAT EXCHANGER | OUTER HEAT EXCHANGER |
|---|---|---|---|---|---|---|
| | 1ST 90 | 2ND 91 | 97 | 33 | 35 | 38 |
| COOLING | CONT. LINE | CONT. LINE | OPEN | CONDENSER | EVAPORATOR | CONDENSER |
| HEATING | DOTTED LINE | CONT. LINE | CLOSE | CONDENSER | EVAPORATOR | NOT USED |
| WEAK HEATING | DOTTED LINE | DOTTED LINE | CLOSE | CONDENSER | EVAPORATOR | EVAPORATOR |

FIG. 9

| MODE | FOUR-WAY VALVE | | REFRIGERANT FLOW SWITCHING VALVE | | | HEAT-RADIATING INNER HEAT EXCHANGER | HEAT-ABSORBING INNER HEAT EXCHANGER | OUTER HEAT EXCHANGER |
|---|---|---|---|---|---|---|---|---|
| | 1ST | 2ND | 1ST | 2ND | 3RD | | | |
| | 90 | 91 | | 93 | 94 | 33 | 35 | 38 |
| COOLING | CONT. LINE | CONT. LINE | | CLOSE | OPEN | CONDENSER | EVAPORATOR | CONDENSER |
| HEATING | DOTTED LINE | DOTTED LINE | | OPEN | CLOSE | CONDENSER | EVAPORATOR | NOT USED |
| WEAK HEATING | DOTTED LINE | DOTTED LINE | | CLOSE | OPEN | CONDENSER | EVAPORATOR | EVAPORATOR |

FIG.11

| MODE | FOUR-WAY VALVE | | REFRIGERANT FLOW SWITCHING VALVE | | HEAT-RADIATING INNER HEAT EXCHANGER | HEAT-ABSORBING INNER HEAT EXCHANGER | OUTER HEAT EXCHANGER |
|---|---|---|---|---|---|---|---|
| | 1ST 90 | 2ND 91 | 1ST 92 | 2ND 93 | 33 | 35 | 38 |
| COOLING | CONT. LINE | CONT. LINE | OPEN | CLOSE | CONDENSER | EVAPORATOR | CONDENSER |
| HEATING | CONT. LINE | CONT. LINE | CLOSE | OPEN | CONDENSER | EVAPORATOR | NOT USED |
| MILD HEATING | DOTTED LINE | DOTTED LINE | OPEN | CLOSE | CONDENSER | EVAPORATOR | EVAPORATOR |

FIG.13

| MODE | FOUR-WAY VALVE | | HEAT-RADIATING INNER HEAT EXCHANGER | HEAT-ABSORBING INNER HEAT EXCHANGER | OUTER HEAT EXCHANGER |
|---|---|---|---|---|---|
| | 1ST 90 | 2ND 91 | 33 | 35 | 38 |
| COOLING | CONT. LINE | CONT. LINE | CONDENSER | EVAPORATOR | CONDENSER |
| HEATING | DOTTED LINE | CONT. LINE | CONDENSER | EVAPORATOR | NOT USED |
| WEAK HEATING | DOTTED LINE | DOTTED LINE | CONDENSER | EVAPORATOR | EVAPORATOR |

FIG.15

| MODE | FOUR-WAY VALVE | | HEAT-RADIATING INNER HEAT EXCHANGER 33 | HEAT-ABSORBING INNER HEAT EXCHANGER 35 | OUTER HEAT EXCHANGER 38 |
| --- | --- | --- | --- | --- | --- |
| | 1ST 90 | 2ND 91 | | | |
| COOLING | CONT. LINE | CONT. LINE | CONDENSER | EVAPORATOR | CONDENSER |
| HEATING | DOTTED LINE | CONT. LINE | CONDENSER | EVAPORATOR | NOT USED |
| WEAK HEATING | DOTTED LINE | DOTTED LINE | CONDENSER | EVAPORATOR | EVAPORATOR |

FIG. 18

| MODE | FOUR-WAY VALVE | | | HEAT-RADIATING INNER HEAT EXCHANGER | HEAT-ABSORBING INNER HEAT EXCHANGER | OUTER HEAT EXCHANGER |
|---|---|---|---|---|---|---|
| | 1ST 90 | 2ND 91 | 3RD 99 | 33 | 35 | 38 |
| COOLING | CONT. LINE | CONT. LINE | CONT. LINE | CONDENSER | EVAPORATOR | CONDENSER |
| HEATING | DOTTED LINE | CONT. LINE | CONT. LINE | CONDENSER | EVAPORATOR | NOT USED |
| WEAK HEATING | DOTTED LINE | DOTTED LINE | CONT. LINE | CONDENSER | EVAPORATOR | EVAPORATOR |
| SIMPLE HEAT PUMP TYPE HEATING | DOTTED LINE | DOTTED LINE | DOTTED LINE | CONDENSER | NOT USED | EVAPORATOR |

FIG.20

| MODE | FOUR-WAY VALVE | | | HEAT-RADIATING INNER HEAT EXCHANGER | HEAT-ABSORBING INNER HEAT EXCHANGER | OUTER HEAT EXCHANGER |
|---|---|---|---|---|---|---|
| | 1ST 90 | 2ND 91 | 3RD 99 | 33 | 35 | 38 |
| COOLING | CONT. LINE | CONT. LINE | CONT. LINE | CONDENSER | EVAPORATOR | CONDENSER |
| HEATING | DOTTED LINE | CONT. LINE | CONT. LINE | CONDENSER | EVAPORATOR | NOT USED |
| WEAK HEATING | DOTTED LINE | DOTTED LINE | CONT. LINE | CONDENSER | EVAPORATOR | EVAPORATOR |
| SIMPLE HEAT PUMP TYPE HEATING | DOTTED LINE | DOTTED LINE | DOTTED LINE | CONDENSER | NOT USED | EVAPORATOR |

FIG.24A

| MODE | VALVE 92 | VALVE 93 | VALVE 155 | VALVE 157 |
|---|---|---|---|---|
| COOLING | OPEN | CLOSE | CLOSE | CLOSE |
| STABLE HEATING | CLOSE | OPEN | CLOSE | CLOSE |
| TRANSIENT HEATING | CLOSE | OPEN | OPEN | OPEN |

FIG.24B

| MODE | REFRIGERANT FLOW |
|---|---|
| COOLING | 31→92→38→70→33→36→34→35→31 |
| STABLE HEATING | 31→93→33→36→34→35→31 |
| TRANSIENT HEATING | 31→93→33→36→<br>→34→35 ---------→ 31<br>↘ 155→38→157 ↗ |

FIG.26A

| MODE | VALVE 92 | VALVE 93 | VALVE 155 | VALVE 157 |
|---|---|---|---|---|
| COOLING | OPEN | CLOSE | CLOSE | CLOSE |
| STABLE HEATING | CLOSE | OPEN | CLOSE | CLOSE |
| TRANSIENT HEATING | CLOSE | OPEN | OPEN | OPEN |

FIG.26B

| MODE | REFRIGERANT FLOW |
|---|---|
| COOLING | 31→92→38→70→33→36→34→35→31 |
| STABLE HEATING | 31→93→33→36→34→35→31 |
| TRANSIENT HEATING | 31→93→33→36→ →34→35 ---------→31 ↘ 157→38→155 ↗ |

FIG.28A

| MODE | VALVE 92 | VALVE 93 | VALVE 155 | VALVE 157 | VALVE 163 |
|---|---|---|---|---|---|
| COOLING | OPEN | CLOSE | CLOSE | CLOSE | OPEN |
| STABLE HEATING | CLOSE | OPEN | CLOSE | CLOSE | OPEN |
| TRANSIENT HEATING | CLOSE | OPEN | OPEN | OPEN | CLOSE |

FIG.28B

| MODE | REFRIGERANT FLOW |
|---|---|
| COOLING | 31→92→38→70→33→36→34→35→163→31 |
| STABLE HEATING | 31→93→33→36→34→35→163→31 |
| TRANSIENT HEATING | 31→93→33→36→34→35→155→38→157→31 |

FIG.30A

| MODE | VALVE 92 | VALVE 93 | VALVE 155 | VALVE 157 | VALVE 163 |
|---|---|---|---|---|---|
| COOLING | OPEN | CLOSE | CLOSE | CLOSE | OPEN |
| STABLE HEATING | CLOSE | OPEN | CLOSE | CLOSE | OPEN |
| TRANSIENT HEATING | CLOSE | OPEN | OPEN | OPEN | CLOSE |

FIG.30B

| MODE | REFRIGERANT FLOW |
|---|---|
| COOLING | 31→92→38→70→33→36→34→163→ →35→31 |
| STABLE HEATING | 31→93→33→36→34→163→35→31 |
| TRANSIENT HEATING | 31→93→33→36→34→155→38→157→ →35→31 |

FIG.32A

| MODE | VALVE 92 | VALVE 93 | VALVE 155 | VALVE 157 | VALVE 163 |
|---|---|---|---|---|---|
| COOLING | OPEN | CLOSE | CLOSE | CLOSE | OPEN |
| STABLE HEATING | CLOSE | OPEN | CLOSE | CLOSE | OPEN |
| TRANSIENT HEATING | CLOSE | OPEN | OPEN | OPEN | CLOSE |

FIG.32B

| MODE | REFRIGERANT FLOW |
|---|---|
| COOLING | 31→92→38→70→33→36→34→35→→163→31 |
| STABLE HEATING | 31→93→33→36→34→35→163→31 |
| TRANSIENT HEATING | 31→93→33→36→34→35→157→38→→155→31 |

← COOLING
←--- STABLE HEATING
←·-- TRANSIENT HEATING

FIG.34A

| MODE | VALVE 92 | VALVE 93 | VALVE 155 | VALVE 157 | VALVE 163 |
|---|---|---|---|---|---|
| COOLING | OPEN | CLOSE | CLOSE | CLOSE | OPEN |
| STABLE HEATING | CLOSE | OPEN | CLOSE | CLOSE | OPEN |
| TRANSIENT HEATING | CLOSE | OPEN | OPEN | OPEN | CLOSE |

FIG.34B

| MODE | REFRIGERANT FLOW |
|---|---|
| COOLING | 31→92→38→70→33→36→34→163→ →31 |
| STABLE HEATING | 31→93→33→36→34→163→35→31 |
| TRANSIENT HEATING | 31→93→33→36→34→157→38→155→ →35→31 |

FIG.36A

| MODE | VALVE 92 | VALVE 93 | VALVE 155 | VALVE 157 | VALVE 165 |
|---|---|---|---|---|---|
| COOLING | OPEN | CLOSE | CLOSE | CLOSE | INDICATED CONT. LINE |
| STABLE HEATING | CLOSE | OPEN | CLOSE | CLOSE | INDICATED CONT. LINE |
| TRANSIENT HEATING | CLOSE | OPEN | OPEN | OPEN | INDICATED DOTTED LINE |

FIG.36B

| MODE | REFRIGERANT FLOW |
|---|---|
| COOLING | 31→92→38→70→33→36→34→35→→165→31 |
| STABLE HEATING | 31→93→33→36→34→35→165→31 |
| TRANSIENT HEATING | 31→93→33→36→34→35→165→155→→38→157→165→31 |

FIG.38A

| MODE | VALVE 92 | VALVE 93 | VALVE 157 | VALVE 165 |
|---|---|---|---|---|
| COOLING | OPEN | CLOSE | CLOSE | INDICATED CONT. LINE |
| STABLE HEATING | CLOSE | OPEN | CLOSE | INDICATED CONT. LINE |
| TRANSIENT HEATING | CLOSE | OPEN | OPEN | INDICATED DOTTED LINE |

FIG.38B

| MODE | REFRIGERANT FLOW |
|---|---|
| COOLING | 31→92→38→70→33→36→34→35→ →165→31 |
| STABLE HEATING | 31→93→33→36→34→35→165→31 |
| TRANSIENT HEATING | 31→93→33→36→34→35→165→155→ →38→157→165→31 |

FIG.40A

| MODE | VALVE 92 | VALVE 93 | VALVE 155 | VALVE 157 | VALVE 165 |
|---|---|---|---|---|---|
| COOLING | OPEN | CLOSE | CLOSE | CLOSE | INDICATED CONT. LINE |
| STABLE HEATING | CLOSE | OPEN | CLOSE | CLOSE | INDICATED CONT. LINE |
| TRANSIENT HEATING | CLOSE | OPEN | OPEN | OPEN | INDICATED DOTTED LINE |

FIG.40B

| MODE | REFRIGERANT FLOW |
|---|---|
| COOLING | 31→92→38→70→33→36→34→165→ →35→31 |
| STABLE HEATING | 31→93→33→36→34→165→35→31 |
| TRANSIENT HEATING | 31→93→33→36→34→165→155→ →38→157→165→35→31 |

FIG.42A

| MODE | VALVE 92 | VALVE 93 | VALVE 157 | VALVE 165 |
|---|---|---|---|---|
| COOLING | OPEN | CLOSE | CLOSE | INDICATED CONT. LINE |
| STABLE HEATING | CLOSE | OPEN | CLOSE | INDICATED CONT. LINE |
| TRANSIENT HEATING | CLOSE | OPEN | OPEN | INDICATED DOTTED LINE |

FIG.42B

| MODE | REFRIGERANT FLOW |
|---|---|
| COOLING | 31→92→38→70→33→36→34→165→ →35→31 |
| STABLE HEATING | 31→93→33→36→34→165→35→31 |
| TRANSIENT HEATING | 31→93→33→36→34→165→155→ →38→157→165→35→31 |

FIG.44A

| MODE | VALVE 92 | VALVE 93 | VALVE 155 | VALVE 157 | VALVE 165 |
|---|---|---|---|---|---|
| COOLING | OPEN | CLOSE | CLOSE | CLOSE | INDICATED CONT. LINE |
| STABLE HEATING | CLOSE | OPEN | CLOSE | CLOSE | INDICATED CONT. LINE |
| TRANSIENT HEATING | CLOSE | OPEN | OPEN | OPEN | INDICATED DOTTED LINE |

FIG.44B

| MODE | REFRIGERANT FLOW |
|---|---|
| COOLING | 31→92→38→70→33→36→34→35→ →165→31 |
| STABLE HEATING | 31→93→33→36→34→35→165→31 |
| TRANSIENT HEATING | 31→93→33→36→34→35→165→ →157→38→155→165→31 |

FIG.46A

| MODE | VALVE 92 | VALVE 93 | VALVE 155 | VALVE 165 |
|---|---|---|---|---|
| COOLING | OPEN | CLOSE | CLOSE | INDICATED CONT. LINE |
| STABLE HEATING | CLOSE | OPEN | CLOSE | INDICATED CONT. LINE |
| TRANSIENT HEATING | CLOSE | OPEN | OPEN | INDICATED DOTTED LINE |

FIG.46B

| MODE | REFRIGERANT FLOW |
|---|---|
| COOLING | 31→92→38→70→33→36→34→35→<br>→165→31 |
| STABLE HEATING | 31→93→33→36→34→35→165→31 |
| TRANSIENT HEATING | 31→93→33→36→34→35→165→<br>→157→38→155→165→31 |

FIG.48A

| MODE | VALVE 92 | VALVE 93 | VALVE 155 | VALVE 157 | VALVE 165 |
|---|---|---|---|---|---|
| COOLING | OPEN | CLOSE | CLOSE | CLOSE | INDICATED CONT. LINE |
| STABLE HEATING | CLOSE | OPEN | CLOSE | CLOSE | INDICATED CONT. LINE |
| TRANSIENT HEATING | CLOSE | OPEN | OPEN | OPEN | INDICATED DOTTED LINE |

FIG.48B

| MODE | REFRIGERANT FLOW |
|---|---|
| COOLING | 31→92→38→70→33→36→34→165→ →35→31 |
| STABLE HEATING | 31→93→33→36→34→165→35→31 |
| TRANSIENT HEATING | 31→93→33→36→34→165→157→ →38→155→165→35→31 |

FIG.50A

| MODE | VALVE 92 | VALVE 93 | VALVE 155 | VALVE 165 |
|---|---|---|---|---|
| COOLING | OPEN | CLOSE | CLOSE | INDICATED CONT. LINE |
| STABLE HEATING | CLOSE | OPEN | CLOSE | INDICATED CONT. LINE |
| TRANSIENT HEATING | CLOSE | OPEN | OPEN | INDICATED DOTTED LINE |

FIG.50B

| MODE | REFRIGERANT FLOW |
|---|---|
| COOLING | 31→92→38→70→33→36→34→165→ →35→31 |
| STABLE HEATING | 31→93→33→36→34→165→35→31 |
| TRANSIENT HEATING | 31→93→33→36→34→165→157→ →38→155→165→35→31 |

AIR CONDITIONER FOR VEHICLE

The present application is a continuation in-part of application Ser. No. 08/185,419, filed on Jan. 24, 1994 now U.S. Pat. No. 5,375,427.

BACKGROUND OF THE INVENTION

1. Field of the Invention

The present invention relates to improvements in an air conditioner for a vehicle which is provided with a vapor-compression cycle.

2. Description of the Prior Art

Japanese Patent Provisional Publication No. 2-290475 discloses an air conditioner for a vehicle in which a four-way valve 2 is used in order to change refrigerant flow in the air conditioner by each of a heating operation and a cooling operation, as shown in FIG. 52. That is, during the heating operation, an outer heat exchanger 7 is used as an evaporator and inner heat exchangers 3 and 5 are used as a condenser. On the other hand, during the cooling operation, the outer heat exchanger 7 is used as a condenser and the inner heat exchangers 3 and 5 are used as an evaporator. More particularly, as shown in FIG. 52, during the heating operation, the four-way valve 2 is set as indicated by a continuous line, and refrigerant is circulated as follows: A compressor 1→the four-way valve 2→a first inner heat exchanger 3→a heating heat exchanger 4→a second inner heat exchanger 5→an expansion valve 6→an outer heat exchanger 7→the four-way valve 2→a receiver 8→the compressor 1. Accordingly, the heat of the refrigerant is transmitted to air blown by a blower fan 9 and used for heating a passenger compartment. The heat from an engine 10 is transmitted to the refrigerant through the heating heat exchanger 4 and further transmitted from the refrigerant to air blown by a blower fan 11 for heating the passenger compartment. The heat of the air blown by a fan 12 is transmitted to the refrigerant through the outer heat exchanger 7. On the other hand, during the cooling operation, the four-way valve 2 is set as indicated by a broken line in FIG. 52 and refrigerant is circulated as follows: The compressor 1→the outer heat exchanger 7→the expansion valve 6→the second inner heat exchanger 5→the first inner heat exchanger 3→the four-way valve 2→the receiver 8→the compressor 1. Accordingly, the heat of the refrigerant discharged from the compressor 1 is radiated into the atmosphere through the outer heat exchanger 7, and the heat of air led by the blower fans 9 and 11 is radiated into the refrigerant by the first and second inner heat exchanger 3 and 5. Further, the cooled air is supplied to the passenger compartment.

With such a conventional air conditioner, the absorbed heat amount by the outer heat exchanger 7 is decreased during the heating operation under a condition such that the ambient temperature is low, the automotive vehicle is running, or it is raining or snowing. Furthermore, if the workload of the compressor 1 is constant, the radiated heat amount from the first and second inner heat exchangers 3 and 5, which is the sum of the heat absorbing amount from the outer heat exchanger 7 and the workload of the compressor 1, is decreased. This decreases the heating capacity of the air conditioner. Additionally, the decrease of the heating capacity invites frost to form on the heat exchanger. This increases a defrost operation and prevents a stable heating operation. Furthermore, since the conventional air conditioner is arranged such that the flow direction of the refrigerant is changed by each of the cooling and heating operations, it is necessary to rearrange the design of the conduits of the outer and inner heat exchangers 7, 3 and 5 so as to be durable to high temperature and high pressure. Also, since the conventional air conditioner is arranged to generate heated air for the heating by utilizing the waste heat of the engine 10 during the heating operation, this air conditioner can not sufficiently operate if applied to a vehicle which only has a small heat source, such as a solar car or an electric vehicle.

On the other hand, the applicant of this invention has disclosed a new-type air conditioner for a vehicle in U.S. Pat. No. 5,404,729. The air conditioner is provided with a heat-radiating inner heat exchanger 235 in addition to a heat-absorbing inner heat exchanger 233, and is arranged to change an operation mode by controlling a three-way valve 232. With this arrangement, it is possible to improve the air-conditioning performance by a stable control without being affected by the weather condition. More particularly, the construction of this air conditioner is arranged as shown in FIG. 53. Accordingly, during the heating operation, the three-way valve 232 is switched as indicated by a continuous line, and the refrigerant in the air conditioner is circulated as follows: A compressor 231→the three-way valve 232→a heat-radiating inner heat exchanger 233→a receiver 236→an expansion valve 234→a heat-absorbing inner heat exchanger 235→the compressor 231. Accordingly, the air blown by a blower fan is cooled at the heat-absorbing inner heat exchanger 235 for a cooling dehumidification, and then is warmed at the heat-radiating inner heat exchanger 233. During a cooling operation, the three-way valve 232 is switched as indicated by a dotted line in FIG. 53, and the refrigerant is circulated as follows: The compressor 231→ the three-way valve 232→an outer heat exchanger 238→a one-way valve 270→the heat-radiating inner heat exchanger 233→the receiver 236→the expansion valve 234→the heat-absorbing inner heat exchanger 235→the compressor 231. Accordingly, the heat of the refrigerant is radiated through the outer heat exchanger 238, and the air blown by the blower fan is cooled at the heat-absorbing inner heat exchanger 235.

With this air conditioner, since the refrigerant bypasses the outer heat exchanger 238 during the heating operation, even if the ambient air temperature is lower than 5° C., the air conditioner operates without causing the freezing of the outer heat exchanger 238. On the other hand, when the input to the compressor 231 is W, the quantity of heat used for a cool-dehumidification of the air is QE, and the quantity of heat applied to the air at the heat-radiating heat exchanger 233 is QC, the following equation is obtained:

$$W=QC-QE$$

Since the air in the passenger compartment is QC–QE, it is noted that the workload of the compressor 231 is used for the heating of the air supplied to the passenger compartment. That is, it is possible to control the compartment temperature by the control of the compressor. Therefore, when the ambient air temperature is ranging from 5° C. to 15° C., it is possible to implement a weak heating operation by controlling an input to the compressor 231.

However, when the ambient air temperature is ranging from 5° C. to 15° C., the outer heat exchanger 238 is not used, although it is possible to use the outer heat exchanger 238 as a condenser. This prevents the coefficient of the performance of the air conditioner from being larger than 1.

SUMMARY OF THE INVENTION

It is an object of the present invention to provide an improved air conditioner for a vehicle which enables the heating operation under wide-range cold condition from an intensely cold condition to a slightly cold condition.

Another objection of the present invention is to provide an improved air conditioner which prevents functional degradation during a heating operation by returning refrigerant stored in an outer heat exchanger to an operating cycle.

An air conditioner for a vehicle according to the present invention includes refrigerant and a compressor which applies a workload to the refrigerant. An outer heat exchanger transmits heat between the refrigerant and ambient air. A blower leads air for air-conditioning a passenger compartment of the vehicle. A heat-radiating inner heat exchanger transmits the heat of the refrigerant to the air led by the blower. An expansion valve adiabatically expands the refrigerant. A heat-absorbing inner heat exchanger transmits the heat of the air led by the blower to the refrigerant. A refrigerant passage switching device is arranged to switch a refrigerant flow among the compressor, the outer heat exchanger, the heat-radiating inner heat exchanger, the expansion valve and the heat-absorbing inner heat exchanger. The refrigerant passage switching device is set at one of a cooling mode, a heating mode and a weak heating mode. During a cooling operation of the air conditioner, the refrigerant passage switching device is set at the cooling mode, in which the refrigerant flows in the order of the compressor, the outer heat exchanger, the expansion valve, the heat-absorbing inner heat exchanger and the compressor. During a heating operation of the air conditioner, the refrigerant passage switching device is set at the heating mode, in which the refrigerant flows in the order of the compressor, the heat-radiating inner heat exchanger, the expansion valve, the heat-absorbing inner heat exchanger and the compressor, while bypassing the outer heat exchanger. During a weak heating operation of the air conditioner, the refrigerant passage switching device is set at the weak heating mode, in which the refrigerant flows in the order of the compressor, the heat-radiating inner heat exchanger, the expansion valve, the outer heat exchanger and the compressor.

With this arrangement, the air conditioner functions such that the heating operation is implemented in wide-range cold circumstances from an intensely cold condition to a slightly cold condition. Furthermore, this air conditioner operates such that a coefficient of its performance is larger than 1 under a slightly cold condition. This enables the air conditioner to reduce its energy consumption. Additionally, since during the weak heating operation, the holdup of the refrigerant in the outer heat exchanger is avoided by the refrigerant flow to the outer heat exchanger, the amount of the refrigerant is kept sufficient when the operation is changed into the heat operation, and the heating capacity is sufficiently ensured.

BRIEF DESCRIPTION OF THE DRAWINGS

In the drawings, like reference numerals designate like parts and like elements throughout all figures; in which:

FIG. 5 is a table which shows a control of four-way valves and the like in the first embodiment of FIG. 1;

FIG. 7 is a table which shows a control of four-way valves and the like in the second embodiment of FIG. 6;

FIG. 9 is a table which shows a control of four-way valves and the like in the third embodiment of FIG. 8;

FIG. 11 is a table which shows a control of four-way valves and the like in the fourth embodiment of FIG. 10;

FIG. 13 is a table which shows a control of four-way valves and the like in the fifth embodiment of FIG. 12;

FIG. 15 is a table which shows a control of four-way valves and the like in the sixth embodiment of FIG. 14;

FIG. 18 is a table which shows a control of four-way valves and the like in the seventh embodiment;

FIG. 20 is a table which shows a control of four-way valves and the like in the eighth embodiment of FIG. 19;

FIGS. 24A and 24B are tables which show a control of valves and the refrigerant flow of the ninth embodiment of FIG. 21;

FIGS. 26A and 26B are tables which show a control of valves and the refrigerant flow of the tenth embodiment of FIG. 25;

FIGS. 28A and 28B are tables which show a control of valves and the refrigerant flow of the eleventh embodiment of FIG. 27;

FIGS. 30A and 30B are tables which shows a control of valves and the refrigerant flow of the twelfth embodiment of FIG. 29;

FIGS. 32A and 32B are tables which show a control of valves and the refrigerant flow of the thirteenth embodiment of FIG. 31;

FIGS. 34A and 34B are tables which show a control of valves and the refrigerant flow of the fourteenth embodiment of FIG. 33;

FIGS. 36A and 36B are tables which show a control of valves and the refrigerant flow of the fifteenth embodiment of FIG. 35;

FIGS. 38A and 38B are tables which show a control of valves and the refrigerant flow of the sixteenth embodiment of FIG. 37;

FIGS. 40A and 40B are tables which show a control of valves and the refrigerant flow of the seventeenth embodiment of FIG. 39;

FIGS. 42A and 42B are tables which show a control of valves and the refrigerant flow of the eighteenth embodiment of FIG. 41;

FIGS. 44A and 44B are tables which show a control of valves and the refrigerant flow of the nineteenth embodiment of FIG. 43;

FIGS. 46A and 46B are tables which show a control of valves and the refrigerant flow of the twentieth embodiment of FIG. 45;

FIGS. 48A and 48B are tables which show a control of valves and the refrigerant flow of the twenty-first embodiment of FIG. 47;

FIGS. 50A and 50B are tables which show a control of valves and the refrigerant flow of the twenty-second embodiment of FIG. 49;

DETAILED DESCRIPTION OF THE INVENTION

Referring to FIGS. 1 to 5, there is shown a first embodiment of an air conditioner for an automotive vehicle according to the present invention.

Figure 1:
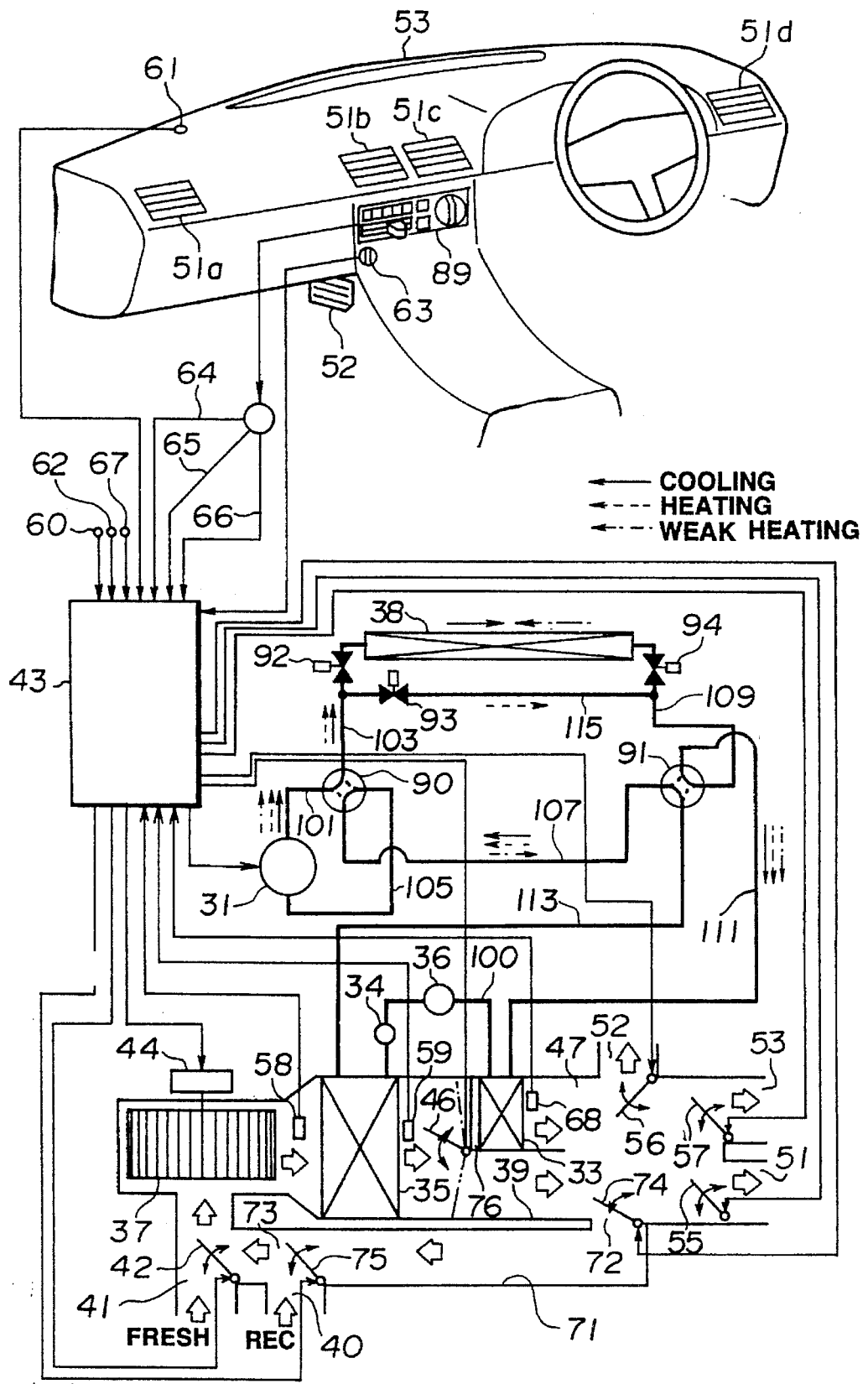
FIG. 1 is a schematic structural view of a first embodiment of an air conditioner for a vehicle according to the present invention.
Figure 2:
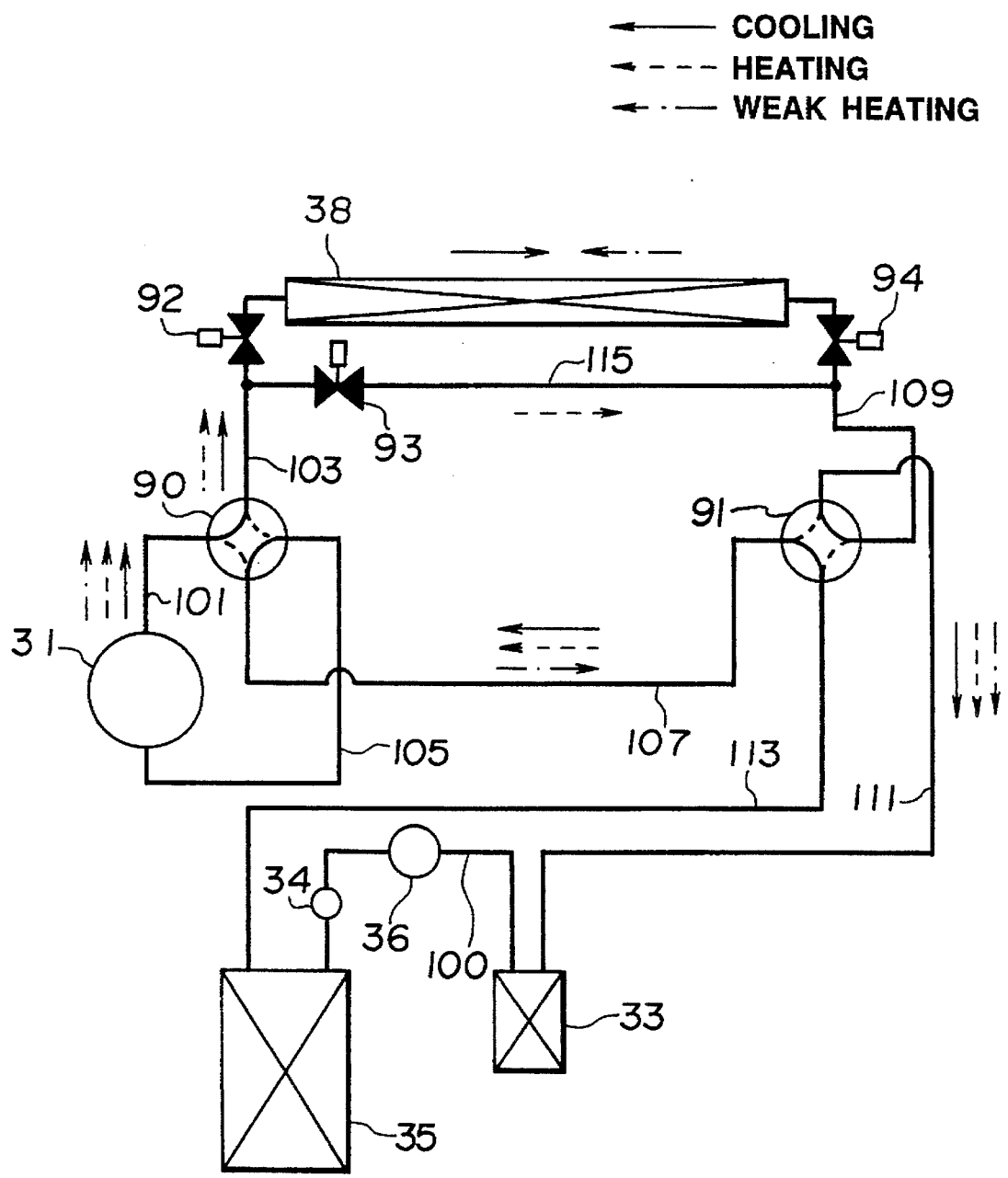
FIG. 2 is a view which shows a refrigerant flow during each operation mode in the first embodiment of FIG. 1.

As shown in FIGS. 1 and 2, a compressor 31 is disposed outside of a passenger compartment of the automotive vehicle, such as in an engine room. The compressor 31 is of a type which variably changes an input power, such as of an electric drive type or hydraulic drive type. An outer heat exchanger 38, a heat-radiating heat inner heat exchanger 33, an expansion valve 34 functioning as an expansion means, and a heat-absorbing inner heat exchanger 35 are connected to the compressor 31 through a refrigerant passage switching means which is constituted by first and second four-way valves 90 and 91 and a bypass means which is constituted by first and second switching valves 92 and 93 so as to form a predetermined passage relative to the outer heat exchanger 38.

The outer heat exchanger 38 functions to transmit the heat between the refrigerant and the ambient air. That is, the outer heat exchanger 38 functions as an outer condenser which radiates heat of the refrigerant discharged from the compressor 31 into the ambient air, or functions as an outer evaporator which transmits heat from the ambient air to the refrigerant splayed from an expansion valve 34.

The heat-radiating inner heat exchanger 33 is disposed in a duct 39 serving as a main body of the air conditioner. The duct 39 is located at a front portion of the passenger compartment, such as at a back side of an instrument panel. A blower fan 37 functioning as a blowing means is disposed near an inlet of the duct 39. The heat-radiating inner heat exchanger 33 functions as an inner condenser of a radiating type in which heat of the refrigerant discharged from the compressor 31 is radiated into the air forced by the blower fan 37.

The refrigerant outlet side of the heat-radiating inner heat exchanger 33 is connected to a refrigerant inlet side of a heat-absorbing inner heat exchanger 35 through a conduit 100. A receiver 36 and the expansion valve 34 are disposed in the conduit 100. The expansion valve 34 functions in the air conditioner so as to atomize liquid refrigerant by adiabatic expansion.

The heat-absorbing inner heat exchanger 35 functions as a heat-absorbing type evaporator which cools the air forced by the blower fan 37, in a manner to absorb the heat of the air into the refrigerant supplied from the expansion valve 34.

The first four-way valve 90 is connected to the suction side and the discharge side of the compressor 31 through conduits 101 and 105, respectively. Further, the first four-way valve 90 is connected to the refrigerant inlet side of the outer heat exchanger 38 and the second four-way vale 91 through conduits 103 and 107, respectively.

The second four-way valve 91 is connected to the first four-way valve 90 and the refrigerant outlet side of the outer heat exchanger 38 through the conduit 107 and a conduit 109, respectively. Further, the second four-way valve 91 is connected to the refrigerant inlet side of the heat-radiating inner heat exchanger 33 and the refrigerant outlet side of the heat-absorbing inner heat exchanger 35 through conduits 111 and 113, respectively.

The first switching valve 92 which is set at one of an open state and a closed state is disposed in the conduit 103, and the second switching valve 92 which is set at one of an open state and a closed state is disposed in a conduit 115 which connects the conduit 103 and the conduit 109. A third switching valve 94 which is set at one of an open state and a closed state is disposed in the conduit 109.

An auxiliary heater 76 is disposed at an air inlet side of the heat-radiating inner heat exchanger 33. The auxiliary heater 76 is an electric heater and of a type which variably changes output according to input voltage controlled by a control unit 43. When the auxiliary heater 76 is turned on, the air passing through the heat-radiating inner heat exchanger 33 is heated, and the temperature of the refrigerant which flows through the heat-radiating inner heat exchanger 33 is increased.

In the duct 39, an inner air inlet 40 for leading the air into the passenger compartment and an outer air inlet 41 for leading outside air due to the wind pressure caused by the running of the automotive vehicle are disposed upstream of the heat-absorbing inner heat exchanger 35. An intake door 42 for properly mixing the air from the inner air inlet 40 and the air from the outer air inlet 41 is disposed at a dividing portion between the inner and outer air inlets 40 and 41 in the duct 39. The intake door 42 is arranged to open and close the outer air inlet 41 by using an intake door actuator (not shown) controlled by the control unit 43. The blower fan 37 is disposed downstream of the inner and outer air inlets 40 and 41 and upstream of the heat-absorbing inner heat exchanger 35 in the duct 39. The blower fan 37 is arranged to be rotated by a blower fan motor 44 which is controlled by the control unit 43.

An air mixing door 46 is disposed upstream of the heat-radiating inner heat exchanger 33 in the duct 39. The air mixing door 46 is driven by an air mixing door actuator (not shown) controlled by the control unit 43 so as to change the ratio of air flow rates of cool air and hot air, wherein the cool air is air which bypasses the heat-radiating inner heat exchanger 33, and the hot air is the air which passes through the heat-radiating inner heat exchanger 33. An opening degree $X_{dsc}$ of the air mixing door 46 is defined as follows: When the air mixing door 46 is located at a position indicated by a long and short dash line in FIG. 1, that is, when the ratio of the cool air is 100%, the opening degree $X_{dsc}$ is defined as 0% (full close condition). When the air mixing door 46 is located at a position indicated by a long and two short dashes line in FIG. 1, that is, when the ratio of the hot air is 100%, the opening degree $X_{dsc}$ is defined as 100% (full open condition).

In order to further improve the mixing between cool air and hot air, an air mixing chamber 47 is disposed downstream of the heat-radiating inner heat exchanger 33 in the duct 39. The air mixing chamber 47 has a ventilator outlet 51 (51a, 51b, 51,c, 51d) for feeding the conditioned air toward an upper side of a vehicle passenger (not shown), a foot outlet 52 (52a) for feeding the conditioned air toward a foot portion of the vehicle passenger, and a defroster outlet 53 (53a) for feeding the conditioned air toward a front glass (not shown) of the automotive vehicle. A ventilator door 55, a foot door 56, and a defroster door 57 are disposed in the air mixing chamber 47. The ventilator door 55 is arranged to open and close the ventilator outlet 51 according to the operation of a ventilator door actuator (not shown), which is controlled by the control unit 43. The foot door 56 is arranged to open and close the foot outlet 52 according to the operation of a foot door actuator (not shown), which is controlled by the control unit 43. The defroster door 57 is arranged to open and close the defroster outlet 53 according to the operation of a defroster door actuator (not shown), which is controlled by the control unit 43.

A circulation passage 71 is disposed to communicate the air mixing chamber 47 and the inner air inlet 40. An inlet door 74 is disposed at an opening 72 of the circulation passage 71, in which the opening is formed in the vicinity of the air mixing chamber 47 in the duct 39. An outlet door 75 is disposed at a branch portion 73 between the circulation passage 71 and the inner air inlet 40. The inlet door 74 is arranged to open and close the opening 72 by means of an inlet door actuator (not shown), which is driven according to a signal from the control unit 43. The outlet door 75 is arranged to change a communicating condition of the branch portion 73 by means of an outlet door actuator (not shown), which is driven according to a signal from the control unit 43. That is, the conditioned air is circulated from the air mixing chamber 47 to an upstream side of the blower fan 37 when the inlet door 74 and the outlet door 75 are opened, wherein the outlet door 75 is positioned to close the inner air port 40.

The control unit 43 is connected to thermal information detecting means, such as an inlet air temperature sensor 58, for the heat-absorbing inner heat exchanger 35, an outlet air temperature sensor 59 for the heat-absorbing inner heat exchanger 35, an outlet air temperature sensor 60 for the ventilator outlet 51, a solar radiation sensor 61, an outer air (ambient) temperature sensor 62, a room air temperature sensor 63, a room air temperature setting device 64 which is disposed in an air-conditioner panel 89, an outlet-port mode switch 65, a blower fan switch 66, a refrigerant temperature sensor 67, and an outlet air temperature sensor 68 of the heat-radiating inner heat exchanger 33.

The control unit 43 calculates a target air-conditioned state, such as an opening degree $X_{dsc}$ of the air mixing door 46, and an input value $W_{comp}$ of the compressor 31, an air flow rate $V_{eva}$ passing through the heat-absorbing inner heat exchanger 35, and a target outlet air temperature $T_{of}$ according to thermal information from the thermal information detecting means. Furthermore, on the basis of the calculated values, the control unit 43 controls the compressor 31, the first and second four-way valves 90 and 91, the first, second and third switching valves 92, 93 and 94, the blower fan motor 44, the air-mixing door actuator, the return door actuator, the ventilator door actuator, the foot door actuator, and the defroster door actuator so as to correspond the air-conditioned state with the calculated target air-conditioned state. The inlet air temperature sensor 58 detects an inlet air temperature $T_{suc}$ and sends it to the control unit 43. The outlet air temperature sensor 59 detects an outlet air temperature $T_{out}$ and sends it to the control unit 43. The blowout air temperature sensor 60 detects a ventilator outlet air temperature $T_{vent}$ and sends it to the control unit 43. The solar radiation sensor 61 detects a solar radiation amount $Q_{sun}$ to the vehicle and sends it to the control unit 43. The ambient air temperature sensor 62 detects an ambient air temperature $T_{amb}$ and sends it to the control unit 43. The room air temperature sensor 63 detects a room air temperature $T_{room}$ and sends it to the control unit 43. A preset room temperature $T_{ptc}$ set at the room temperature setting device 64 is sent to the control unit 43. The refrigerant temperature sensor 67 detects a refrigerant temperature $T_{ref}$ of the refrigerant outlet of the heat-radiating inner heat exchanger 33 and sends it to the control unit 43. The outlet air temperature sensor 68 detects the outlet air temperature $T_v$ and sends it to the control unit 43. Such detected data function as the thermal information.

Accordingly, in the first embodiment of the air conditioner according to the present invention, the room air temperature sensor 63 functions as a means for detecting a thermal condition in the passenger compartment, the room temperature setting device 64 functions as a means for setting a thermal condition in the passenger compartment, and the control unit 43 functions as a means for controlling the compressor 31 according to the thermal condition detecting and setting means. Furthermore, the control unit 43 functions as a switch controlling means which controls the switching of the first and second four-way valves 90 and 91, and the first and second switching valves 92 and 93 according to the thermal condition detecting and setting means.

With reference to a flow chart of FIGS. 3 to 4, the manner of controlling operation of the first embodiment of the air conditioner will be discussed hereinafter.

Figure 3:
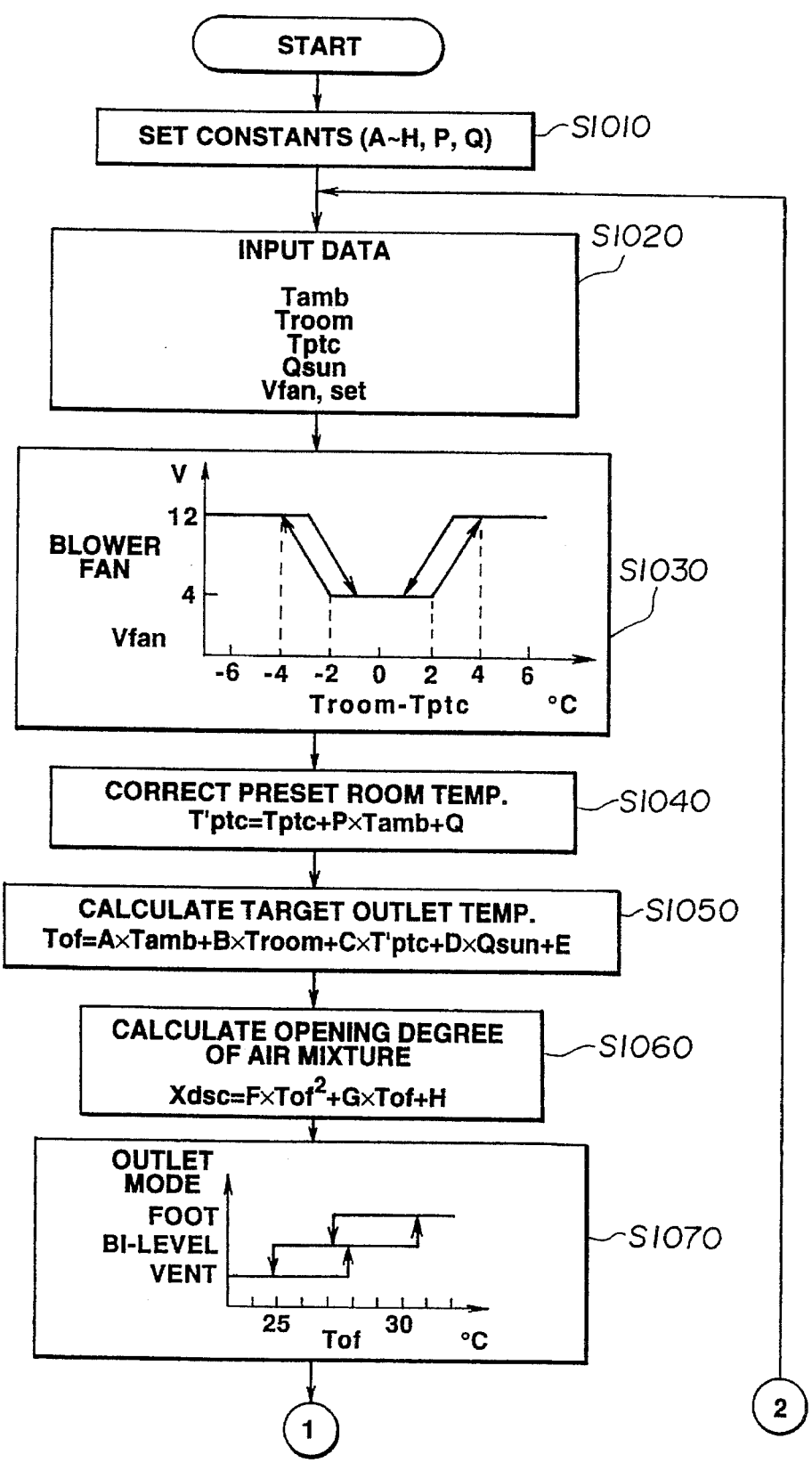
FIG. 3 is a part of a flow chart which is applied to the control of the first embodiment of FIG. 1.
Figure 4:
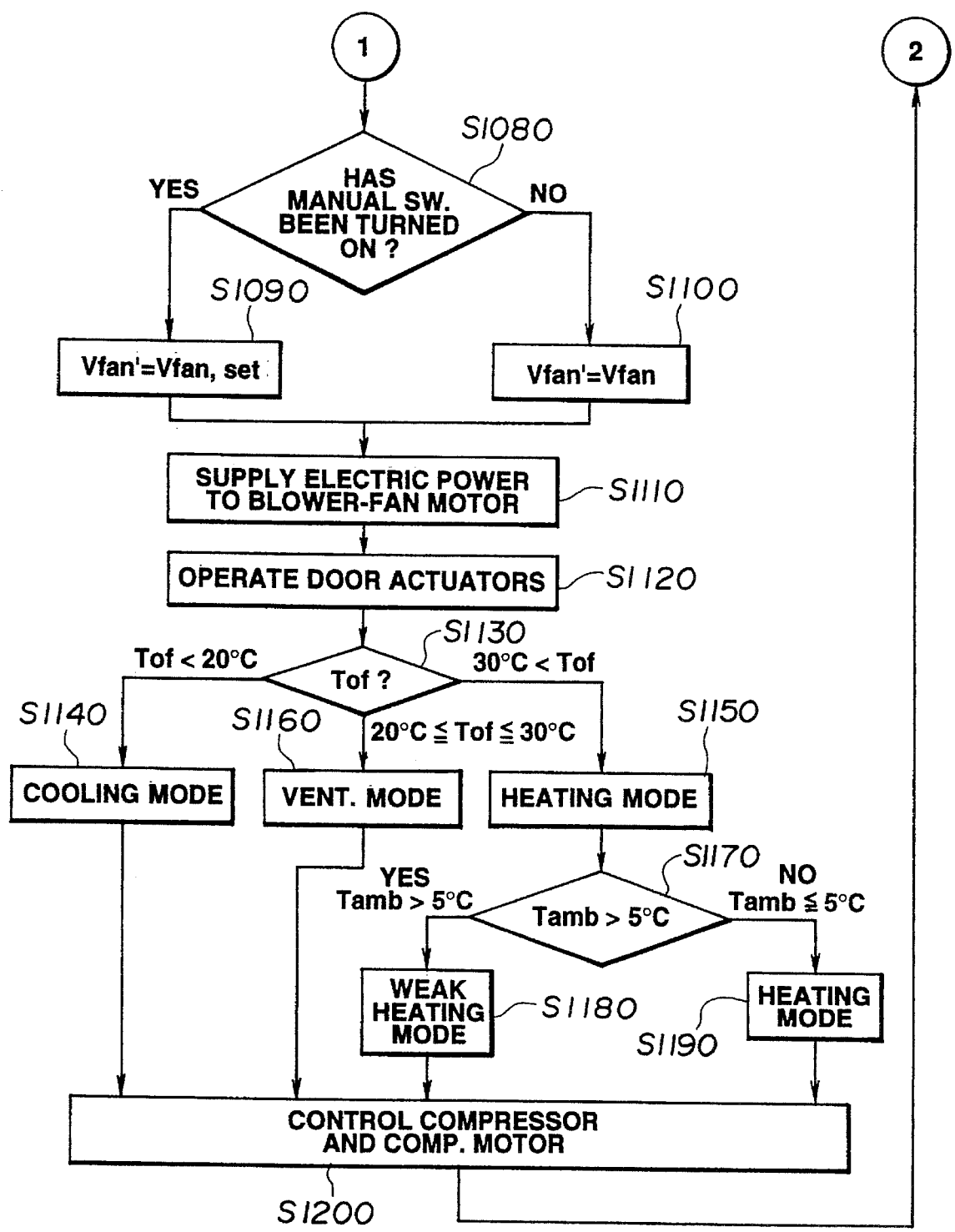
FIG. 4 is another part of the flow chart which is applied to the control of the first embodiment of FIG. 1.

The flow chart shown in FIG. 3 starts processing with the start of the control unit 43, which is turned-on by the turning-on of a main switch of the air conditioner. As shown in FIG. 3, in a step S1010, constants A to H, P, and Q are set in the control unit 43. The constants A to E are applied to an equation by which the target outlet air temperature $T_{of}$ is calculated; the constants F, G, and H are applied to an equation by which the opening degree X of the air mixing door 46 is calculated; and the constants P and Q are used as a correction of the preset room temperature.

In a step S1020, the control unit 43 reads the outputs from the various sensors (the thermal information detecting means), such as output signals indicative of the room air temperature $T_{room}$ from the room air temperature sensor 63, an output signal indicative of the solar radiation $Q_{sun}$ of the solar radiation sensor 61, an output signal indicative of the ambient air temperature $T_{amb}$ of the ambient air temperature sensor 62, an output signal indicative of the preset room air temperature $T_{ptc}$ of the room air temperature setting device 64, and an output signal indicative of a preset value $V_{fan,set}$ of the fan switch.

In a step S1030, the applied voltage $V_{fan}$ of the blower fan 37 is determined according to a difference $(T_{room}-T_{ptc})$ between the preset room air temperature $T_{ptc}$ and the room air temperature $T_{room}$, in order to control the air flow rate caused by the blower fan 37. In concrete terms, as is clear from a graph shown in the step S1030, the applied voltage $V_{fan}$ is increased in accordance with the increase of the difference $(T_{room}-T_{ptc})$ so as to rapidly approach the room air temperature $T_{room}$ to the preset room air temperature $T_{ptc}$.

In a step S1040, the correction of the preset room air temperature $T_{ptc}$ is implemented by using the following equation:

$$T'_{ptc}=T_{ptc}+P\times T_{amb}+Q$$

In concrete terms, when the ambient air temperature $T_{amb}$ is low, the preset room air temperature is increased. When the ambient air temperature is high, the preset room air temperature is decreased. This correction is implemented for the following reason: Normally, people feel cool when the room air temperature is lowered under an environment where people feel hot, and feel warm when the room air temperature is increased under an environment where people feel cold. Thus, by correcting the preset room air temperature so as to be in reverse proportion to an environmental temperature, people receive thermal stimulation and obtain amenity.

In a step S1050, the target outlet air temperature $T_{of}$ is calculated by using the following equation:

$$T_{of}=A\times T_{amb}+B\times T_{room}+C\times T'_{ptc}+D\times Q_{sun}+E$$

where A, B, C, D, and E are constant, $T_{amb}$ is the ambient air temperature, $T_{room}$ is the room air temperature, $T'_{ptc}$ is a corrected preset room air temperature, and $Q_{sun}$ is the solar radiation amount.

In a step S1060, the opening degree X of the air mixing door 46 is calculated on the basis of the target outlet air temperature $T_{of}$ by the following equation:

$$X=F\times T_{of}^2+G\times T_{of}+H$$

where F, G, and H are constants.

In a step S1070, the outlet-port mode is determined on the basis of the target outlet air temperature $T_{of}$. That is, when the target outlet air temperature $T_{of}$ is high, the foot mode is selected so as to feed the conditioned air to the passenger's feet. When medium, the bi-level mode is selected so as to feed the conditioned air to the passenger's feet and chest. When low, the vent mode is selected so as to feed the conditioned air to passenger's chest.

In a step S1080, it is judged whether or not a manual fan switch (no numeral) disposed in the air-conditioner panel 89 is turned on by a passenger. When the manual fan switch is turned on, the program proceeds to a step S1090, wherein the value $V_{fan,set}$ is determined as a final value (fan preset value $V_{fan}=V_{fan,set}$). When the manual fan switch is not turned on, the program proceeds to a step S1100, wherein the value determined in the step S1030 is used as the blower fan voltage $(V_{fan}=V_{fan})$.

In a step S1110, the blower fan voltage $V_{fan,set}$, which is determined in the step S1090 or step S1100, is applied to the blower fan motor 44.

In a step S1120, the corresponding signals are outputted to the door actuators such that the corresponding doors are automatically disposed at predetermined positions, respectively. Following this, the program proceeds to a step S1130.

In the step S1130, it is judged which operation mode should be selected. That is, it is judged whether the target outlet air temperature $T_{of}$ is lower than 20° C., or higher than 30° C. When the target outlet air temperature $T_{of}$ is lower than 20° C. ($T_{of}$<20° C.), the program proceeds to a step S1140, wherein a cooling mode is selected to implement the cooling operation. When the target outlet air temperature $T_{of}$ is higher than 30° C. ($T_{of}$>30° C.), the program proceeds to a step S1150, wherein a heating mode is selected to implement the heating operation. When the target outlet air temperature $T_{of}$ is not lower than 20° C. and not higher than 30° C. (20° C.$\leq T_{of}\leq$30° C.), the program proceeds to a step S1160, wherein a vent mode is selected to implement a ventilating operation.

After the implement of the step S1140 or S1160, the program proceeds to a step S1200, wherein the compressor control and the compressor-motor control are implemented to control the input to the compressor 31.

Following the step S1150, the program proceeds to a step S1170, wherein it is judged whether or not the weak heating operation is selected. That is, it is judged whether or not the ambient air temperature $T_{amb}$ is higher than 5° C. When the judgment in the step S1170 is "YES" ($T_{amb}$>5° C.), the program proceeds to a step S1180, wherein a weak heating mode is selected to implement the weak heat operation. When the judgment in the step S1170 is "NO" ($T_{amb} \leq 5°$ C.), the program proceeds to a step S1190, wherein the heating mode is selected to implement the heating operation.

Following this, the program proceeds to the step S1200, wherein the compressor control and the compressor-motor control are implemented to control the input to the compressor 31.

The operating condition of the valves and the heat exchangers in the above-mentioned control is represented by a table of FIG. 5. That is, during the cooling operation, the first and second four-way valves 90 and 91 are switched as indicated by a continuous line, the first and second switching valves 92 and 93 are closed, and the third switching valve 94 is opened. Further, the heat-radiating inner heat exchanger 33 functions as a condenser, the heat-absorbing inner heat exchanger 35 functions as an evaporator, and the outer heat exchanger 38 functions as a condenser.

Accordingly, as shown in FIGS. 1 and 2, during the cooling operation, the refrigerant is circulated as follows: The compressor 31→the conduit 101→the first four-way valve 90→ the first switching valve 92 in the conduit 103→the outer heat exchanger 38→the third switching valve 94 in the conduit 109→the second four-way valve 91→the conduit 111→the heat-radiating inner heat exchanger 33→the receiver 36 and the expansion valve 34 in the conduit 100→the heat-absorbing inner heat exchanger 35→the conduit 113→the second four-way valve 91→the conduit 107→the first four-way valve 90→the conduit 105→the compressor 31. Accordingly, the outer heat exchanger 38 radiates the heat of the high-temperature refrigerant discharged from the compressor 38, and the remaining heat of the refrigerant is radiated into the air blown by the blower fan 37 or the air forced by a ram pressure during a vehicle running through the heat-radiating inner heat exchanger 33. Furthermore, air led by the blower fan 37 or the air forced by a ram pressure during a vehicle running is cooled by the refrigerant passing through the heat-absorbing inner heat exchanger 35.

During the heating operation, the refrigerant is circulated as follows: The compressor 31→the conduit 101→the four-way valve 90→the conduit 103→the second switching valve 93 in the conduit 115→the conduit 109→the second four-way valve 91→the conduit 111→the heat-radiating inner heat exchanger 33→the receiver 36 and the expansion valve 34 in the conduit 100→heat-absorbing inner heat exchanging 35→the conduit 113→the second four-way valve 91→the conduit 107→ the four-way valve 90→the conduit 105→the compressor 31. Accordingly, the heat-radiating inner heat exchanger 33 generates heated air by radiating the heat of the refrigerant discharged from the compressor 31 into the air blown by the blower fan 37 or the air forced by a ram pressure during a vehicle running condition. Therefore, the dehumidified air is generated at the heat absorbing inner heat exchanger 35, and the heat-radiating inner heat exchanger 33 generates the heated air in sufficient amount. This enables a dehumidifying heating, and therefore even if the vehicle is put under the condition that the ambient air temperature is lower than 5° C., the sufficient heating operation is implemented without fogging the windows. Furthermore, since the outer heat exchanger 38 is not used during the heating operation, even if it is put under an intensely cold ambient condition such that the outer heat exchanger 38 will freeze, it is possible to implement the heating operation sufficiently.

During the weak heating operation, the refrigerant is circulated as follows: The compressor 31→the conduit 101→ the first four-way valve 90→the conduit 107→the second four-way valve 91→the conduit 111→the heat-radiating inner heat exchanger 33→the receiver 36 and the expansion valve 34 in the conduit 100→the heat-absorbing inner heat exchanger 35→ the conduit 113→the second four-way valve 91→the third switching valve 94 in the conduit 109→the outer heat exchanger 38→the first switching valve 92 of the conduit 103→ the first four-way valve 90→the conduit 105→the compressor 31. Accordingly, it is possible to implement the dehumidifying heating by generating cool air at the heat-absorbing inner heat exchanger 35 and generating warm air at the heat-radiating inner heat exchanger 33. Furthermore, since it is possible to absorb heat from the ambient air which is higher than 5° C., the outer heat exchanger 38 can absorb the heat from the ambient air. Therefore, it is possible to increase a coefficient of a performance of the system to be higher than 1 by implementing the weak heating operation under a slightly cold condition.

That is, when the workload of the compressor 31 is W, the heating amount used for dehumidifying the air in the passenger compartment is QE, the heating amount used for heating the air in the passenger compartment is QC, and the heating amount absorbed from the ambient air is QA, the following relationship is obtained:

$$W=QC-(QE+QA)$$

Since the total heating amount of the air in the passenger compartment is QC–QE, the coefficient of the performance of the air conditioner is represented as follows:

$$\epsilon=(QC-QE)/\{QC-(QE+QA)\}$$

This equation clearly shows a fact that the coefficient of the performance of the air conditioner is larger than 1. Accordingly, it is possible to reduce the input to the compressor 31, and therefore it is possible to largely reduce the energy consumption of the air conditioner. Therefore, it becomes possible to largely improve the limit running distance of an electric vehicle if it is applied to the electric vehicle.

In the first embodiment of the air conditioner according to the present invention, the outer heat exchanger 38 is operated so as to radiate the heat into the ambient air, to absorb the heat from the ambient air, or to shut the communication between the ambient air and the refrigerant in reply to the needs of the system. That is, under an intensely cold condition, the outer heat exchanger 38 is not used so as to shut the communication between the ambient air and the refrigerant, and under a slightly cold condition, it functions to absorb heat from the ambient air. Further, under a hot condition, it functions to radiate the heat of the refrigerant into the ambient air. Accordingly, this air conditioner functions such that the heating operation is implemented in wide-range cold circumstances from an intensely cold condition to a slightly cold condition. Furthermore, this air conditioner operates such that a coefficient of its performance is larger than 1 under a slightly cold condition. This enables the air conditioner to reduce its energy consumption.

Figure 6:
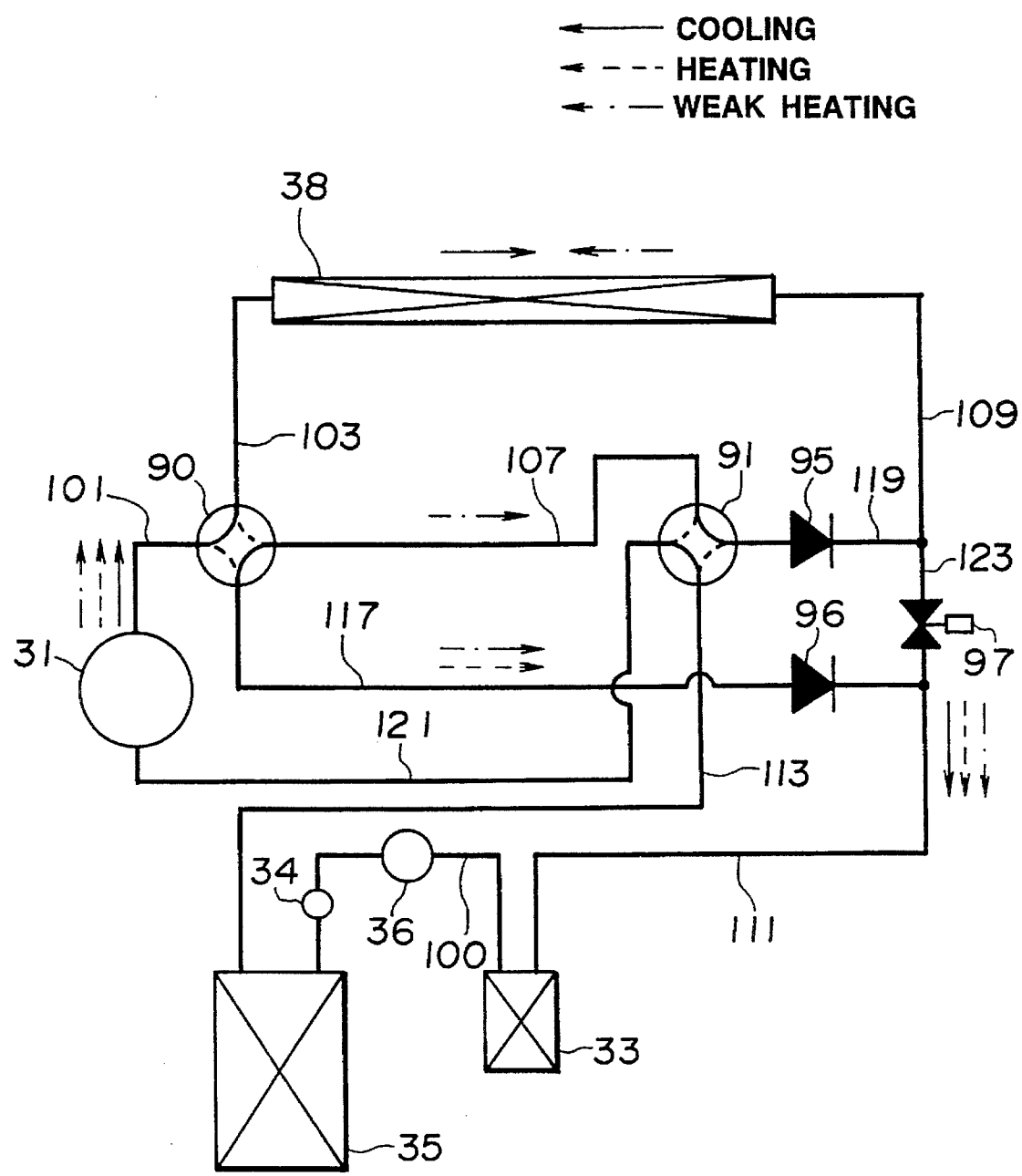
FIG. 6 is a view which shows a refrigerant flow during each operation mode in a second embodiment of the air conditioner according to the present invention.

Referring to FIGS. 6 and 7, there is shown a second embodiment of the air conditioner for a vehicle according to the present invention.

In the second embodiment, the refrigerant passage switching means is constituted by the first and second valves 90 and 91 and a refrigerant flow control valve 97.

The first four-way valve 90 is connected to the refrigerant discharge side of the compressor 31 and the refrigerant inlet side of the outer heat exchanger 38 through the conduits 101 and 103, respectively. Further, the first four-way valve 90 is connected to the second four-way valve 91 and the conduit 111 through conduits 107 and 117, respectively.

The second four-way valve 91 is connected to the first four-way valve 90 and the conduit 109 through the conduits 107 and 119, receptively. Further, the second four-way valve 91 is connected to the refrigerant outlet side of the heat-absorbing inner heat exchanger 35 and the refrigerant suction side of the compressor 31 through conduits 113 and 121, respectively. The refrigerant control valve 97 is disposed in a conduit 123 which communicates the conduits 109 and 111. One-way valves 95 and 96 are disposed in conduits 119 and 117, respectively.

The operating condition of the valves and the heat exchangers according to the selected operation mode in the second embodiment is represented by a table of FIG. 7. Accordingly, during the cooling operation, the operating condition of them is set such that the refrigerant is circulated as follows: The compressor 31→the conduit 101→the four-way valve 90→ the conduit 103→the outer heat exchanger 38→the conduit 109→the refrigerant control valve 97 in the conduit 123→the conduit 111→the heat-radiating inner heat exchanger 33→the receiver 36 and the expansion valve 34 in the conduit 100→the heat-absorbing inner heat exchanger 35→the conduit 113→the second four-way valve 91→the conduit 121→the compressor 31. Therefore, the heat of the refrigerant in the air conditioner is radiated through the outer heat exchanger 38 and the heat-radiating inner heat exchanger 35, and the heat of the air flowing the duct 39 is absorbed into the refrigerant through the heat-absorbing inner heat exchanger 35.

During the heating operation, the refrigerant is circulated as follows: The compressor 31→the conduit 101→the first four-way valve 90→the conduit 117→the conduit 111→the heat-radiating inner heat exchanger 33→the receiver 36 and the expansion valve 34 of the conduit 100→the heat-absorbing inner heat exchanger 35→the conduit 113→the second four-way valve 91→the conduit 121→the compressor 31. Accordingly, the outer heat exchanger 38 is not used, the heat-radiating inner heat exchanger 33 is operated to radiate the heat of the refrigerant, and the heat-absorbing inner heat exchanger 35 is operated to absorb the heat into the refrigerant.

During the weak heating operation, the refrigerant is circulated as follows: The compressor 31→the conduit 101→ the first four-way valve 90→the conduit 117→the conduit 111→ the heat-radiating inner heat exchanger 33→the receiver 36 and the expansion valve 34 in the conduit 100→the heat-absorbing inner heat exchanger 35→the conduit 113→the second four-way valve 91→the conduit 119→the conduit 109→ the outer heat exchanger 38→the conduit 103→the first four-way valve 90→the conduit 107→the second four-way valve 91→the conduit 121→the compressor 31. Accordingly, the heat-radiating inner heat exchanger 33 warms the air flowing through it, and the heat-absorbing inner heat exchanger 35 generates coolness from the air flowing through it. Further, the outer heat exchanger 38 absorbs heat from the ambient air.

The second embodiment of the air conditioner according to the present invention gains functional effects as mentioned in the first embodiment. Furthermore, since the second embodiment is arranged to implement the cooling operation, the heating operation and the weak heating operation only by using two four-way valves 90 and 91, and the refrigerant control valve 97, the control of this system is simple and the production cost thereof is reduced.

Figure 8:
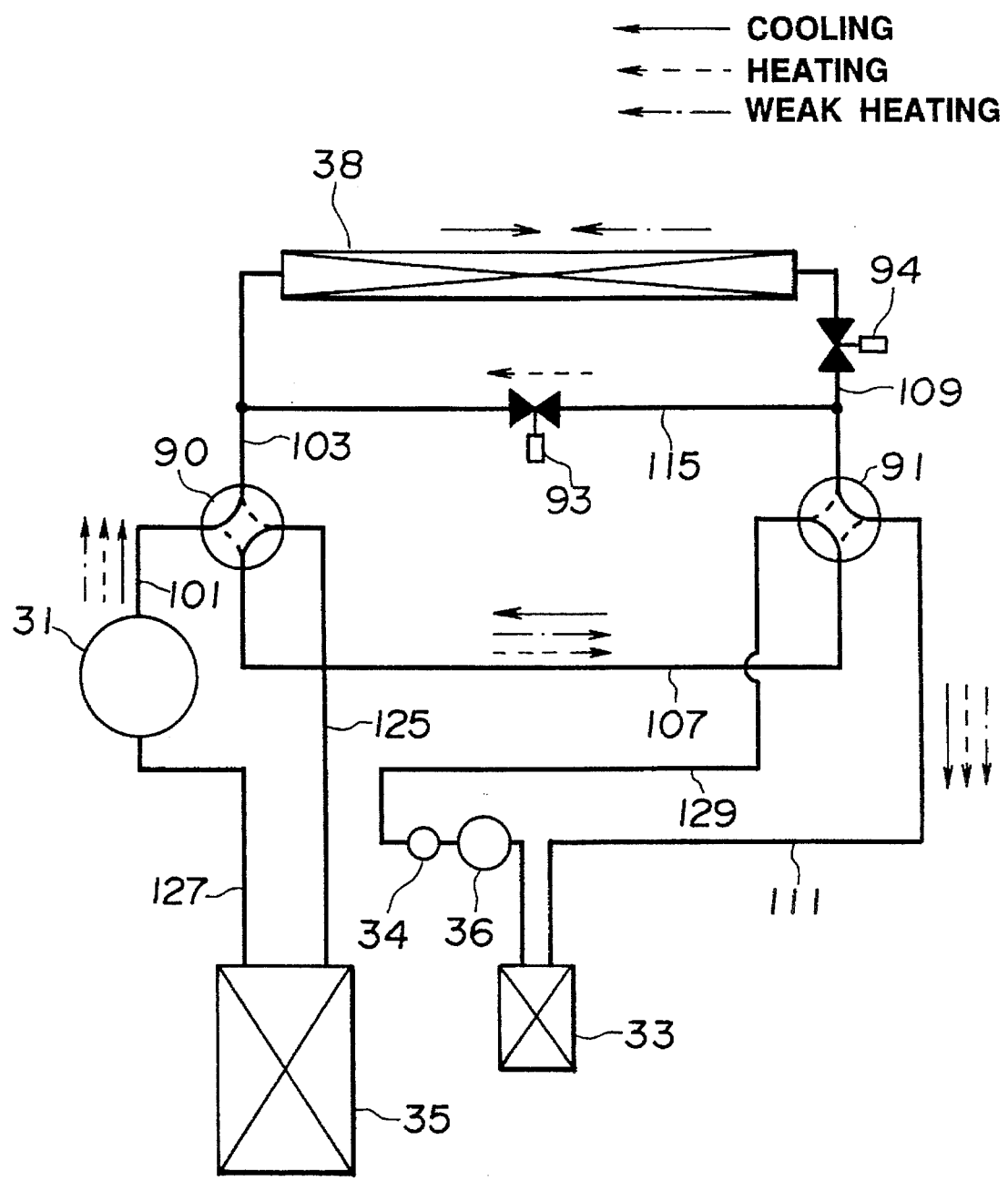
FIG. 8 is a view which shows refrigerant flow during each mode in a third embodiment of the air conditioner according to the present invention.

Referring to FIGS. 8 and 9, there is shown a third embodiment of the air conditioner for a vehicle according to the present invention.

In the third embodiment, the first and second four-way valves 90 and 91, and a bypass valve constituted by the second and third switching valves 93 and 94 are used as a refrigerant passage switching means.

The first four-way valve 90 is connected to the refrigerant discharge side of the compressor 31 and the refrigerant inlet side of the outer heat exchanger 38 through the conduits 101 and 103, respectively. Further, the first four-way valve 90 is connected to the second four-way valve 91 and the refrigerant inlet side of the heat-absorbing inner heat exchanger 35 through conduits 107 and 125, respectively. The refrigerant outlet side of the heat-absorbing inner heat exchanger 35 is connected to the refrigerant suction side of the compressor 31 through a conduit 127.

The second four-way valve 91 is connected to the first four-way valve 90 and the refrigerant outlet side of the outer heat exchanger 38 through the conduits 107 and 109, respectively. Further, the second four-way valve 91 is connected to the refrigerant inlet side of the heat-radiating inner heat exchanger 33 and the refrigerant outlet side of the heat-radiating inner heat exchanger 33 through conduits 111 and 129, respectively. The expansion valve 34 and the receiver 36 are disposed in the conduit 129.

The second switching valve 93 is disposed in the conduit 115 which connects the conduit 103 and the conduit 109, so as to bypass the outer heat exchanger 38. The third switching valve 94 is disposed in the conduit 109 so as to be located at a position between the refrigerant outlet side of the outer heat exchanger 38 and an end of the conduit 115.

The operating condition of the valves and the heat exchangers according to the selected operation mode in the third embodiment is represented by a table of FIG. 9. Accordingly, during the cooling operation, the operating condition of them is set such that the refrigerant is circulated as follows: The compressor 31→the conduit 101→the first four-way valve 90→ the conduit 103→the outer heat exchanger 38→the third switching valve 94 in the conduit 109→the second four-way valve 91→the conduit 111→the heat-radiating inner heat exchanger 33→the receiver 36 and the expansion valve 34 in the conduit 129→the second four-way valve 91→the conduit 107→the first four-way valve 90→the conduit 125→the heat-absorbing inner heat exchanger 35→the conduit 127→the compressor 31. Therefore, the heat of the refrigerant is radiated into the ambient air through the outer heat exchanger 38, and warmed air is generated by the heat-radiating inner heat exchanger 33. Further, cool air is generated by the heat-absorbing inner heat exchanger 35.

During the heating operation, the refrigerant is circulated as follows: The compressor 31→the conduit 101→the first four-way valve 90→the conduit 107→the second four-way valve 91→the conduit 111→the heat-radiating inner heat exchanger 33→receiver 36 and the expansion valve 34 in the conduit 129→the second four-way valve 91→the second switching valve 93 in the conduit 115→the conduit 103→ the first four-way valve 90→the conduit 125→the heat-absorbing inner heat exchanger 35→the conduit 127→the compressor 31. Accordingly, the outer heat exchanger 38 is not used, and the air for air conditioning is warmed at the heat-radiating inner heat exchanger 33. Further, the air for air conditioning is cooled at the heat-absorbing inner heat exchanger 35.

During the weak heating operation, the refrigerant is circulated as follows: The compressor 31→the conduit 101→ the first four-way valve 90→the conduit 107→the second four-way valve 91→the conduit 111→the heat-radiating inner heat exchanger 33→the receiver 36 and the expansion valve 34 in the conduit 129→the second four-way valve 91→the third switching valve 94 in the conduit 109→the outer heat exchanger 38→the conduit 103→the first four-way valve 90→ the conduit 125→the heat-absorbing inner heat exchanger 35→ the conduit 127→the compressor 31. Accordingly, the air for the air conditioning is warmed at the heat-radiating inner heat exchanger 33 and is cooled at the heat-absorbing inner heat exchanger 35. Further, the outer heat exchanger 38 functions to absorb the heat from the ambient air.

The third embodiment of the air conditioner according to the present invention gains functional effects that are similar to those of the first embodiment. Furthermore, the third embodiment is arranged to implement the cooling operation, the heating operation and the weak heating operation only by using two four-way valves 90 and 91, and the two switching valves 93 and 94. Additionally, since during the weak heating operation the refrigerant is flowed into the outer heat exchanger 38 before the heat-absorbing inner heat exchanger 35, it is possible to arrange such that the heat-absorbing amount of the outer heat exchanger 38 is larger than that of the heat-absorbing inner heat exchanger 35 when the air conditioner of the third embodiment is used under a slightly cold condition.

Figure 10:
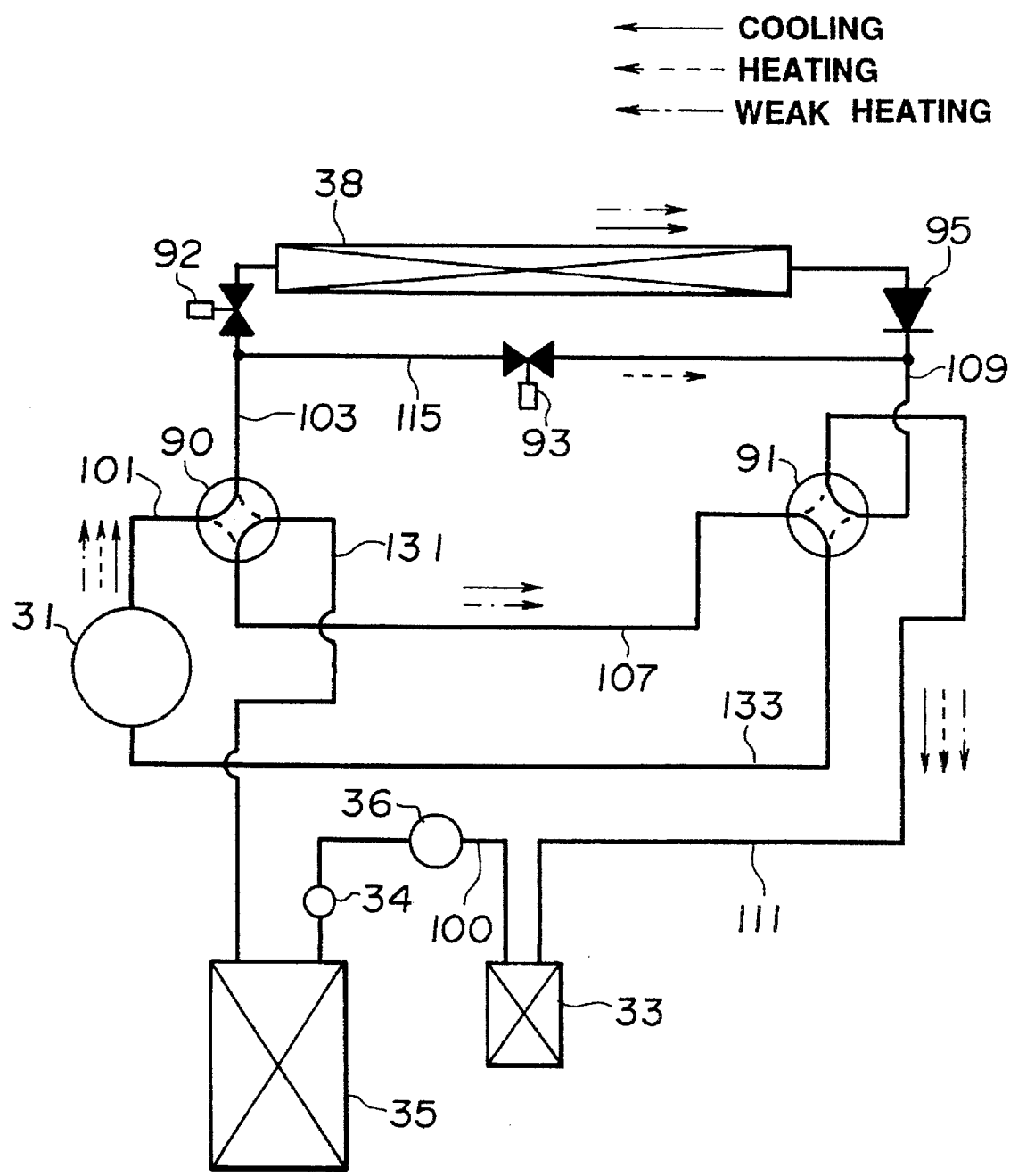
FIG. 10 is a view which shows refrigerant flow during each mode in a fourth embodiment of the air conditioner according to the present invention.

Referring to FIGS. 10 and 11, there is shown a fourth embodiment of the air conditioner for a vehicle according to the present invention.

In this embodiment, a refrigerant passage switching means is constituted by the first and second four-way valves 90 and 91, and a bypass valve which is constituted by the first and second switching valves 92 and 93.

The first four-way valve 90 is connected to the refrigerant discharge side of the compressor 31 and the refrigerant inlet side of the outer heat exchanger 38 through the conduits 101 and 103, respectively. Further, the first four-way valve 90 is connected to the second four-way valve 91 and the refrigerant outlet side of the heat-absorbing inner heat exchanger 35 through conduits 107 and 131, respectively.

The second four-way valve 91 is connected to the first four-way valve 90 and the refrigerant outlet side of the outer heat exchanger 38 through the conduits 107 and 109, respectively. Further, the second four-way valve 90 is connected to the refrigerant inlet side of the heat-radiating inner heat exchanger 33 and the refrigerant suction side of the compressor 31 through conduits 111 and 133, respectively.

A one-way valve 95 is disposed in the conduit 109 so as to be located between the refrigerant outlet side of the outer heat exchanger 38 and the conjunction of the conduits 109 and 115. The one-way valve 95 functions to allow refrigerant to flow from the outer heat exchanger 38 to the second four-way valve 91, and to prevent the refrigerant from flowing from the second four-way valve 91 to the outer heat exchanger 38.

The operating condition of the valves and the heat exchangers according to the selected operation mode in the second embodiment is represented by a table of FIG. 11. Accordingly, during the cooling operation, the refrigerant is circulated as follows: The compressor 31→the conduit 101→ the first four-way valve 90→the first switching valve 92 in the conduit 103→the outer heat exchanger 38→the one-way valve 95 in the conduit 109→the second four-way valve 91→the conduit 111→the heat-radiating inner heat exchanger 33→the receiver 36 and the expansion valve 34 in the conduit 100→the heat-absorbing inner heat exchanger 35→the conduit 131→the first four-way valve 90→the conduit 107→the second four-way valve 91→the conduit 133→the compressor 31. Therefore, the heat of the refrigerant is radiated at the outer heat exchanger 38 into the ambient air, the air for air conditioning is warmed at the heat-radiating inner heat exchanger 33, and the air for air-conditioning is cooled at the heat-absorbing inner heat exchanger 35.

During the heating operation, the refrigerant is circulated as follows: The compressor 31→the conduit 101→the first four-way valve 90→the conduit 103→the second switching valve 93 in the conduit 115→the conduit 109→the second four-way valve 91→the conduit 111→the heat-radiating inner heat exchanger 33→the receiver 36 and the expansion valve 34 in the conduit 100→the heat-absorbing inner heat exchanger 35→ the conduit 131→the first four-way valve 90→the conduit 107→the second four-way valve 91→the conduit 133→the compressor 31. Accordingly, the outer heat exchanger 38 is not used, and the air for air conditioning is warmed at the heat-radiating inner heat exchanger 33. Further, the air for air-conditioning is cooled at the heat-absorbing inner heat exchanger 35.

During the weak heating operation, the refrigerant is circulated as follows: The compressor 31→the conduit 101→ the first four-way valve 90→the conduit 107→the second four-way valve 91→the conduit 111→the heat-radiating inner heat exchanger 33→the receiver 36 and the expansion valve 34 in the conduit 100→the heat-absorbing inner heat exchanger 35→ the conduit 131→the first four-way valve 90→the first switching valve 92 in the conduit 103→the outer heat exchanger 38→the one-way valve 95 in the conduit 109→the second four-way valve 91→the conduit 133→the compressor 31. Accordingly, the air for air-conditioning is warmed at the heat-radiating inner heat exchanger 33, and the air for air-conditioning is cooled at the heat-absorbing inner heat exchanger 35. Further, the outer heat exchanger 38 absorbs the heat of the ambient air.

Figure 12:
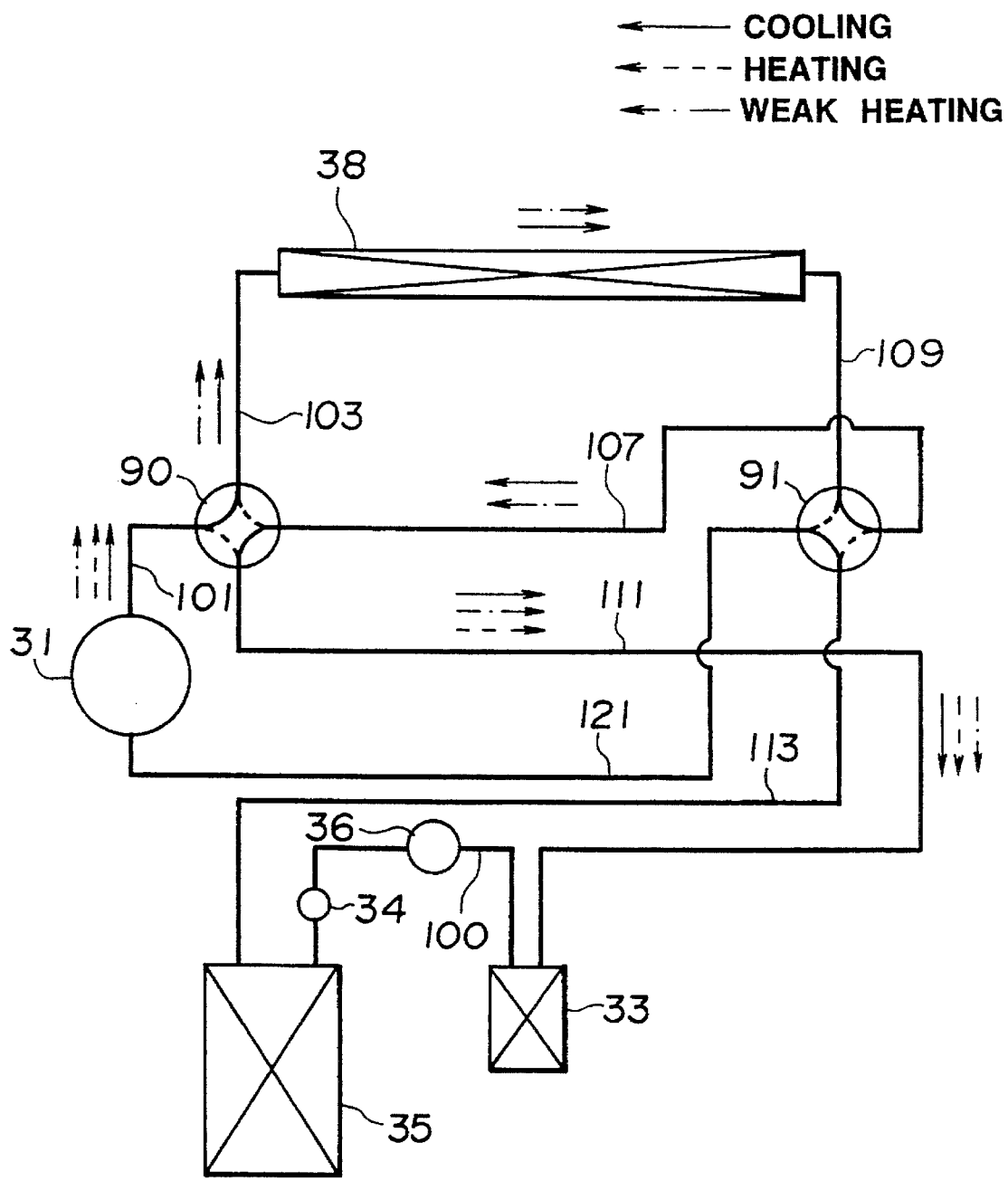
FIG. 12 is a view which shows refrigerant flow during each mode in a fifth embodiment of the air conditioner according to the present invention.

Referring to FIGS. 12 and 13, there is shown a fifth embodiment of the air conditioner according to the present invention.

In this embodiment, the first and second four-way valves 90 and 91 function as a refrigerant passage switching means.

The first four-way valve 90 is connected to the refrigerant discharge side of the compressor 31 and the refrigerant inlet side of the outer heat exchanger 38 through the conduits 101 and 103, respectively. Further, the first four-way valve 90 is connected to the second four-way valve 91 and the refrigerant inlet side of the heat-radiating inner heat exchanger 33 through the conduits 107 and 111, respectively.

The second four-way valve 91 is connected to the first four-way valve 90 and the refrigerant outlet side of the outer heat exchanger 38 through the conduits 107 and 109, respectively. Further, the second four-way valve 91 is connected to the refrigerant outlet side of the heat-absorbing inner heat exchanger 35 and the refrigerant suction side of the compressor 31 through the conduits 113 and 121, respectively.

The operating condition of the valves and the heat exchangers according to the selected operation mode in the second embodiment is represented by a table of FIG. 13. That is, during the cooling operation, the refrigerant is circulated as follows: The compressor 31→the conduit 101→the first four-way valve 90→the conduit 103→the outer heat exchanger 38→the conduit 109→the second four-way valve 91→the conduit 107→the first four-way valve 90→the conduit 111→ the heat-radiating inner heat exchanger 33→the receiver 36 an the expansion valve 34 in the conduit 100→the heat-absorbing inner heat exchanger 35→the conduit 113→the second four-way valve 91→the conduit 121→the compressor 31. Accordingly, the outer heat exchanger 38 radiates the heat of the refrigerant into the ambient air, and the air for air-conditioning is warmed at the heat-radiating inner heat exchanger 33. Further, the air for air-conditioning is cooled at the heat-absorbing inner heat exchanger 35.

During the heating operation, the refrigerant is circulated as follows: The compressor 31→the conduit 101→the first four-way valve 90→the conduit 111→the heat-radiating inner heat exchanger 33→the receiver 36 and the expansion valve 34 in the conduit 100→the heat-absorbing inner heat exchanger 35→ the conduit 113→the second four-way valve 91→the conduit 121→the compressor 31. Accordingly, the outer heat exchanger 38 is not used, and the air for air-conditioning is warmed at the heat-radiating inner heat exchanger 33. Further, the air for air conditioning is cooled at the heat-absorbing inner heat exchanger 35.

During the weak heating operation, the refrigerant is circulated as follows: The compressor 31→the conduit 101→ the first four-way valve 90→the conduit 111→the heat-radiating inner heat exchanger 33→the receiver 36 and the expansion valve 34 in the conduit 100→the heat-absorbing inner heat exchanger 35→the conduit 113→the second four-way valve 91→the conduit 107→the first four-way valve 90→the conduit 103→the outer heat exchanger 38→the conduit 109→the second four-way valve 91→the conduit 121→ the compressor 31. Accordingly, the air for air-conditioning is warmed at the heat-radiating inner heat exchanger 33, and the air for air-conditioning is cooled at the heat-absorbing inner heat exchanger 35. Further, the outer heat exchanger 38 functions to absorb heat from the ambient air.

The fifth embodiment of the air conditioner according to the present invention gains functional effects as mentioned in the first embodiment. Furthermore, the fifth embodiment is arranged to implement the cooling operation, the heating operation and the weak heating operation only by using two four-way valves 90 and 91. Additionally, since the flowing direction of the refrigerant is not changed between the cooling operation and the heating operation, it is not necessary to provide a passage for bypassing the outer heat exchanger 38.

Figure 14:
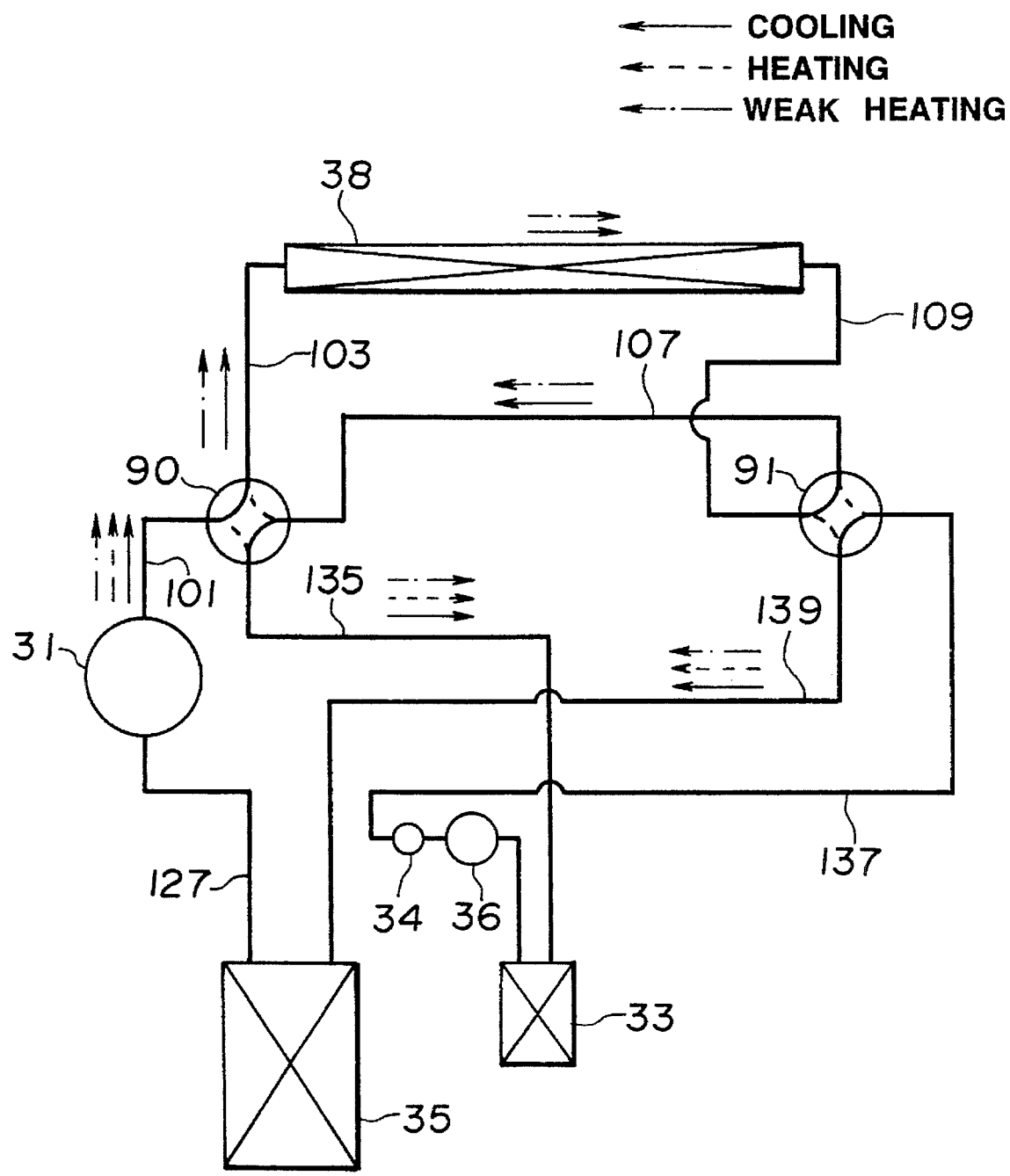
FIG. 14 is a view which shows refrigerant flow during each mode in a sixth embodiment of the air conditioner according to the present invention.

Referring to FIGS. 14 and 15, there is shown a sixth embodiment of the air conditioner according to the present invention.

In this embodiment, the first and second four-way valves 90 and 91 are used as a refrigerant passage switching means as is similar to the fifth embodiment.

The first four-way valve 90 is connected to the refrigerant discharge side of the compressor 31 and the refrigerant inlet side of the outer heat exchanger 38 through the conduit 101 and 103, respectively. Further, the first four-way valve 90 is connected to the second four-way valve 91 and the refrigerant inlet side of the heat-radiating inner heat exchanger 33 through conduits 107 and 135, respectively.

The second four-way valve 91 is connected to the first four-way valve 90 and the refrigerant outlet side of the outer heat exchanger 38 through the conduits 107 and 109, respectively. Further, the second four-way valve 91 is connected to the refrigerant outlet side of the heat-radiating inner heat exchanger 33 through the expansion valve 34 and the receiver 36, through conduits 137 and 139, respectively.

The operating condition of the valves and the heat exchangers according to the selected operation mode in the sixth embodiment is represented by a table of FIG. 15. During the cooling operation, the refrigerant is circulated as follows: The compressor 31→the conduit 101→the first four-way valve 90→ the conduit 103→the outer heat exchanger 38→the conduit 109→the second four-way valve 91→the conduit 107→the first four-way valve 90→the conduit 135→the heat-radiating inner heat exchanger 33→the receiver 36 and the expansion valve 34 in the conduit 137→the second four-way valve 91→ the conduit 139→the heat-absorbing inner heat exchanger 35→ the conduit 127→the compressor 31. Accordingly, the outer heat exchanger 38 radiates the heat of the refrigerant in the ambient air, and the air for air conditioning is warmed at the heat-radiating inner heat exchanger 33. Further, the air for air-conditioning is cooled at the heat-absorbing inner heat exchanger 35.

During the heating operation, the refrigerant is circulated as follows: The compressor 31→the conduit 101→the first four-way valve 90→the conduit 135→the heat-radiating inner heat exchanger 33→the receiver 36 and the expansion valve 34 in the conduit 137→the second four-way valve 91→the conduit 139→the heat-absorbing inner heat exchanger 35→the conduit 127→the compressor 31. Accordingly, the outer heat exchanger 38 is not used, and the air for air conditioning is warmed at the heat-radiating inner heat exchanger 33. Further, the air for air-conditioning is cooled at the heat-absorbing inner heat exchanger 35.

During the weak heating operation, the refrigerant is circulated as follows: The compressor 31→the conduit 101→ the first four-way valve 90→the conduit 135→the heat-radiating inner heat exchanger 33→the receiver 36 and the expansion valve 34 in the conduit 137→the second four-way valve 91→the conduit 107→the first four-way valve 90→the conduit 103→the outer heat exchanger 38→the conduit 109→the second four-way valve 91→the conduit 139→ the heat-absorbing inner heat exchanger 35→the conduit 127→ the compressor 31. Accordingly, the air for air conditioning is warmed at the heat-radiating inner heat exchanger 33, and the air for air-conditioning is cooled at the heat-absorbing inner heat exchanger 35. Further, the outer heat exchanger 38 functions to absorb heat from the ambient air.

The sixth embodiment of the air conditioner according to the present invention gains functional effects as mentioned in the fifth embodiment. Furthermore, since during the weak heating operation the refrigerant is flowed into the outer heat exchanger 38 before the heat-absorbing inner heat exchanger 35, it is possible to arrange such that the heat-absorbing amount of the outer heat exchanger 38 is larger than that of the heat-absorbing inner heat exchanger 35. Therefore it becomes possible to increase the absorbing heating amount from the ambient air.

Figure 16:
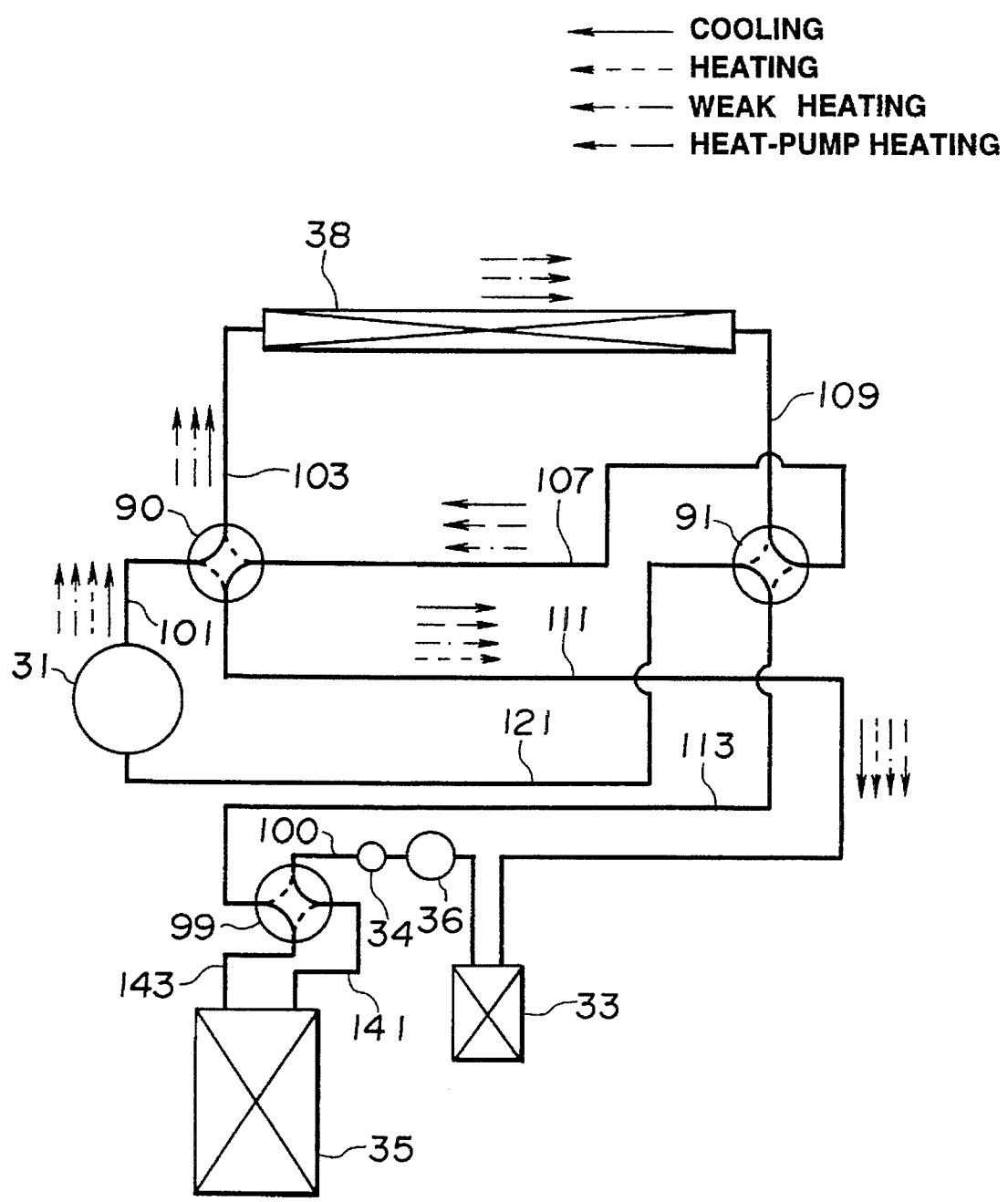
FIG. 16 is a view which shows refrigerant flow during each mode in a seventh embodiment of the air conditioner according to the present invention.
Figure 17:
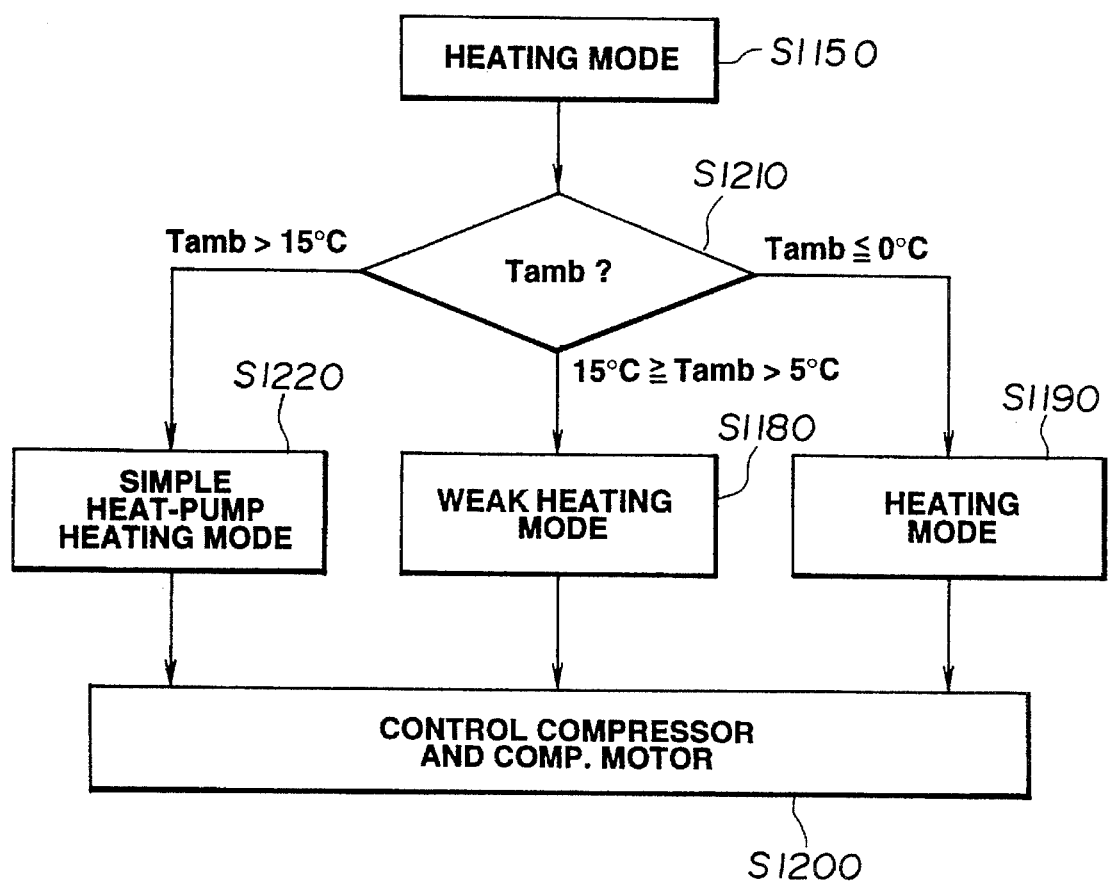
FIG. 17 is a part of a flow chart which is applied to the control of the seventh embodiment of FIG. 16.

Referring to FIGS. 16 to 18, there is shown a seventh embodiment of the air conditioner according to the present invention.

In this embodiment, a third four-way valve 99 is used in addition to the first and second four-way valves 90 and 91 as a refrigerant passage switching means.

The connecting condition of the first and second four-way valves 90 and 91 is generally the same as that of the fifth embodiment shown in FIG. 12. In addition, in this seventh embodiment, the third four-way valve 99 is connected to the conduits 100 and 113, and conduits 141 and 143 which are connected to the refrigerant inlet side and the refrigerant outlet side of the heat-absorbing inner heat exchanger 35, respectively.

The control of the seventh embodiment is basically the same as that of the first embodiment, except that a part of the flow chart shown in FIG. 17 is used instead of the steps S1150, S1170, S1180, S1190 and S1200. That is, the program of the seventh embodiment is arranged such that in a step S1210 shown in FIG. 17, it is judged which heating mode of the weak heating mode, the heating mode, simple heat-pump heating mode is selected, and that in a step S1220, the simple heat-pump heating mode is implemented.

More particularly, in the step S1210, it is judged whether the ambient air temperature is lower than 5° C., is between 5° C. and 15° C., or is higher than 15° C. When $T_{amb} \leq 5°$ C., the program proceeds to the step S1190, wherein the heating mode is selected. When $15° C. \geq T_{amb} > 5°$ C., the program proceeds to the step S1180, wherein the weak heating mode is selected. When $T_{amb} > 15°$ C., the program proceeds to the step S1220, wherein the simple heating mode is selected. After the implementation of each of the steps S1180, S1190 and S1220, the program proceeds to a step S1200, wherein the control of the compressor 31 and the compressor motor is implemented according to the selected operation mode.

With this control of the seventh embodiment, the first, second and third four-way valves 90, 91 and 99 are controlled as shown in FIG. 18, and the heat exchangers 33, 35 and 38 function as shown in a table of FIG. 18 in each operation mode. That is, during the cooling operation, the refrigerant is circulated as follows: The compressor 31→the conduit 101→the first four-way valve 90→the conduit 103→the outer heat exchanger 38→the conduit 109→the second four-way valve 91→the conduit 107→the first four-way valve 90→the conduit 111→ the heat-radiating inner heat exchanger 33→the receiver 36 and the expansion valve 34 in the conduit 100→the third four-way valve 99→the conduit 141→the heat absorbing inner heat exchanger 35→the conduit 143→the third four-way valve 99→the conduit 113→the second four-way valve 91→the conduit 121→the compressor 31. Accordingly, the outer heat exchanger 38 functions to radiate the heat of the refrigerant into the ambient air, the air for air conditioning is warmed at the heat-radiating inner heat exchanger 33, and the air for air-conditioning is cooled at the heat-absorbing inner heat exchanger 35.

During the heating operation, the refrigerant is circulated as follows: The compressor 31→the conduit 101→the first four-way valve 90→the conduit 111→the heat-radiating inner heat exchanger 33→the receiver 36 and the expansion valve 34 in the conduit 100→the their four-way valve 99→the conduit 141→the heat-absorbing inner heat exchanger 35→the conduit 143→the third four-way valve 99→the conduit 113→the second four-way valve 91→the conduit 121→the compressor 31. Accordingly, the outer heat exchanger 38 is not used, and the air for air-conditioning is warmed at the heat-radiating inner heat exchanger 33. Further, the air for air-conditioning is cooled at the heat-absorbing inner heat exchanger 35.

During the weak heating operation, the refrigerant is circulated as follows: The compressor 31→the conduit 101→ the first four-way valve 90→the conduit 111→the heat-radiating inner heat exchanger 33→the receiver 36 and the expansion valve 34 in the conduit 100→the third four-way valve 99→the conduit 141→the heat-absorbing inner heat exchanger 35→the conduit 143→the third four-way valve 99→ the conduit 113→the second four-way valve 91→the conduit 107→the first four-way valve 90→the conduit 103→ the outer heat exchanger 38→the conduit 109→the second four-way valve 91→the conduit 121→the compressor 31. Accordingly, the air for air-conditioning is warmed at the heat-radiating inner heat exchanger 33, and the air for air-conditioning is cooled at the heat-absorbing inner heat exchanger 35. Further, the outer heat exchanger 38 functions to absorb heat from the ambient air.

Furthermore, during a simple heat-pump heating operation, the refrigerant is circulated as follows: The compressor 31→the conduit 101→the first four-way valve 90→the conduit 111→ the heat-radiating inner heat exchanger 33→the receiver 36 and the expansion valve 34 in the conduit 100→the third four-way valve 99→the conduit 113→the second four-way valve 91→the conduit 107→the first four-way valve 90→the conduit 103→the outer heat exchanger 38→the conduit 109→ the second four-way valve 91→the conduit 121→the compressor 31. Accordingly, the heat-absorbing inner heat exchanger 35 is not used, and the outer heat exchanger functions to absorb heat from the ambient air. Further, the air for air-conditioning is warmed at the heat-radiating inner heat exchanger 33.

The seventh embodiment of the air conditioner according to the present invention gains functional effects as mentioned in the fifth embodiment. Furthermore, the seventh embodiment is arranged to implement the simple heat-pump heating operation. Therefore, it becomes possible to properly select an operation mode from the heating, the weak heating and the simple heat-pump heating according to the factors for control, such as the ambient air temperature and the need of defogging operation.

Figure 19:
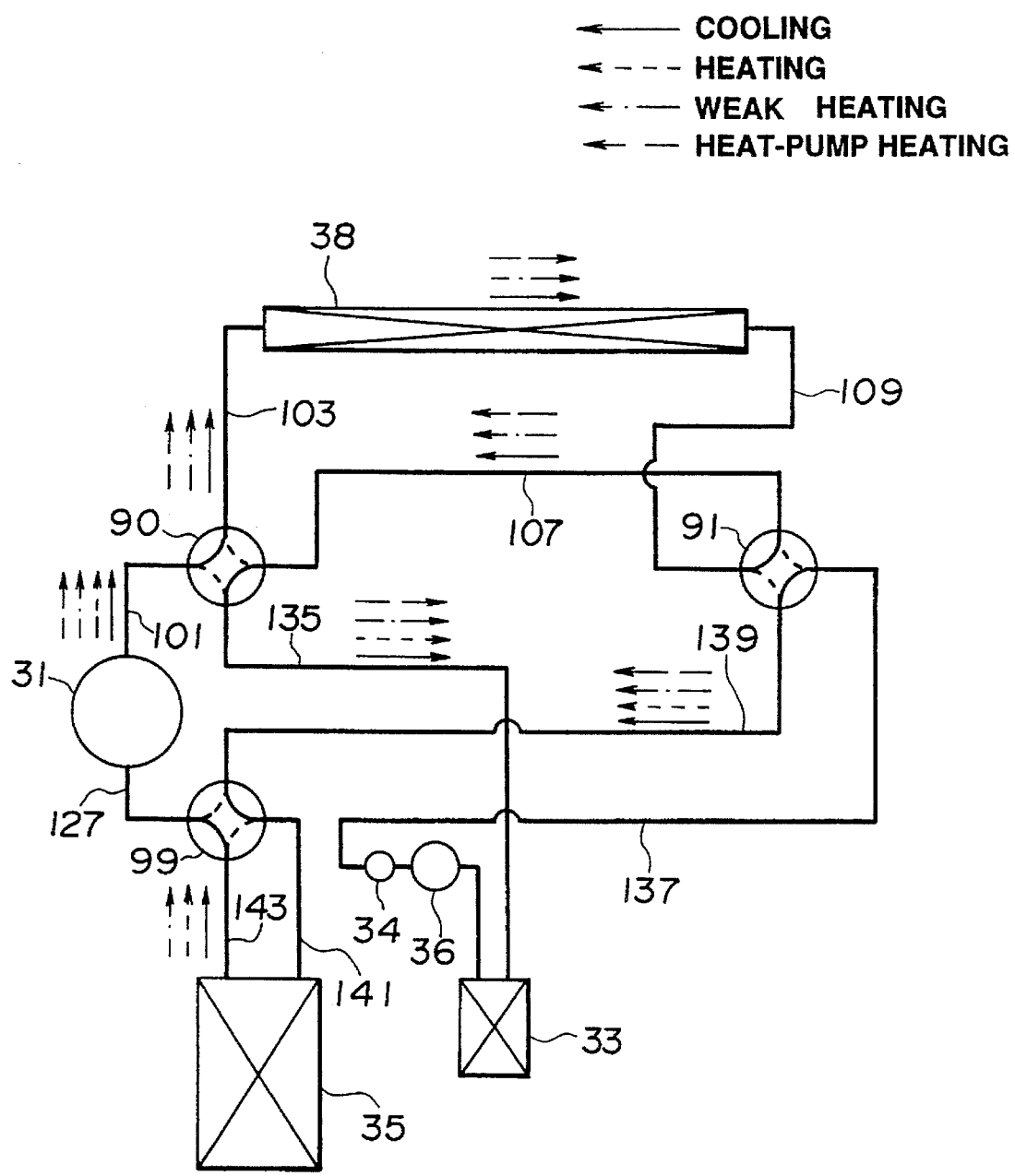
FIG. 19 is a view which shows refrigerant flow during each mode in an eighth embodiment of the air conditioner according to the present invention.

Referring to FIGS. 19 and 20, there is shown an eighth embodiment of the air conditioner according to the present invention.

In this embodiment, the first, second and third four-way valves 90, 91 and 99 are used as a refrigerant passage switching means.

The construction of this eighth embodiment is generally the same as that of the sixth embodiment, except that the third four-way valve 99 is connected to the conduits 127 and the 139. Further, the third four-way valve 99 is connected to the refrigerant inlet side and outlet side of the heat-absorbing inner heat exchanger 35 through the conduits 141 and 143, respectively.

The operating condition of the valves and the heat exchangers according to the selected operation mode in the eighth embodiment is represented by a table of FIG. 20. Accordingly, during the cooling operation, the refrigerant is circulated as follows: The compressor 31→the conduit 101→ the first four-way valve 90→the conduit 103→the outer heat exchanger 38→the conduit 109→the second four-way valve 91→ the conduit 107→the first four-way valve 90→the conduit 135→the heat-radiating inner heat exchanger 33→the receiver 36 and the expansion valve 34 in the conduit 137→the second four-way valve 91→the conduit 139→the third four-way valve 99→the conduit 141→the heat-absorbing inner heat exchanger 35→the conduit 143→the third four-way valve 99→the conduit 127→ the compressor 31. Therefore, the outer heat exchanger 38 functions to radiate the heat of the refrigerant into the ambient air, the air for air-conditioning is warmed at the heat-radiating inner heat exchanger 33, and the air for air-conditioning is cooled at the heat-absorbing inner heat exchanger 35.

During the heating operation, the refrigerant is circulated as follows: The compressor 31→the conduit 101→the first four-way valve 90→the conduit 135→the heat-radiating inner heat exchanger 33→the receiver 36 and the expansion valve 34 in the conduit 137→the second four-way valve 91→the conduit 139→the third four-way valve 99→the conduit 141→ the heat-absorbing inner heat exchanger 35→the conduit 143→ the third four-way valve 99→the conduit 127→the compressor 31. Accordingly, the outer heat exchanger 38 is not used, and the air for air-conditioning is warmed at the heat-radiating inner heat exchanger 33. Further, the air for air-conditioning is cooled at the heat-absorbing inner heat exchanger 35.

During the weak heating operation, the refrigerant is circulated as follows: the compressor 31→the conduit 101→ the first four-way valve 90→the conduit 135→the heat-radiating inner heat exchanger 33→the receiver 36 and the expansion valve 34 in the conduit 137→the second four-way valve 91→the conduit 107→the first four-way valve 90→the conduit 103→the outer heat exchanger 38→the conduit 109→the second four-way valve 91→the conduit 139→ the third four-way valve 99→the conduit 141→the heat-absorbing inner heat exchanger 35→the conduit 143→ the third four-way valve 99→the conduit 127→the compressor 31. Accordingly, the air for air conditioning is warmed at the heat-radiating inner heat exchanger 33 and is cooled at the heat-absorbing inner heat exchanger 35. Further, the outer heat exchanger functions to absorb heat from the ambient air.

Furthermore, during the simple heat-pump heating operation, the refrigerant is circulated as follows: The compressor 31→the conduit 101→the first four-way valve 90→ the heat-radiating inner heat exchanger 33→the receiver 36 and the expansion valve 34 in the conduit 137→the second four-way valve 91→the conduit 107→the first four-way valve 90→the conduit 103→the outer heat exchanger 38→the conduit 109→the second four-way valve 91→the conduit 139→ the third four-way valve 99→the conduit 127→the compressor 31. Accordingly, the heat-absorbing inner heat exchanger 35 is not used, the outer heat exchanger 35 functions to absorb heat of the ambient air, and the air for air-conditioning is warmed at the heat-radiating inner heat exchanger 33.

The eighth embodiment of the air conditioner according to the present invention gains functional effects as mentioned in the sixth embodiment. Furthermore, the eighth embodiment is arranged to implement the simple heat-pump heating operation as is similar to the seventh embodiment. Therefore, it becomes possible to properly select an operation mode from the heating, the weak heating and the simple heat-pump heating according to the factors for control, such as the ambient air temperature and the need of defogging operation.

FIGS. 21 to 37 show further embodiments of the air conditioner according to the present invention. In these embodiments, it is arranged such that so-called holdup refrigerant, which is gradually stored in the outer heat exchanger 38 by the encroachment of the refrigerant through sealing portions during the heating operation, is returned to the operating refrigeration cycle.

That is, if no counterplan is executed, the refrigerant tends to be partially put into a holdup condition during the heating operation. More particularly, since the refrigerant is flowed so as to bypass the outer heat exchanger 38 during the heating operation, the refrigerant tends to gradually enter the outer heat exchanger 38 through a slight clearance of a sealing portions of the valves. Accordingly, the amount of the refrigerant to be used in the refrigeration cycle becomes short, and the heating capacity of the air conditioner may become lowered. Therefore, it is necessary to return the holdup refrigerant in the outer heat exchanger 38 into the operating refrigeration cycle by means of some counterplans. FIGS. 21 to 37 show several embodiments in which some counterplans are incorporated in the system. Since the whole constructions thereof are basically the same as that of the first embodiment of FIG. 1, the same reference numerals designates the same parts and elements.

FIGS. 21, 22, 23A and 23B show a refrigeration cycle and a flow chart of a ninth embodiment of the air conditioner for a vehicle according to the present invention.

Figure 21:
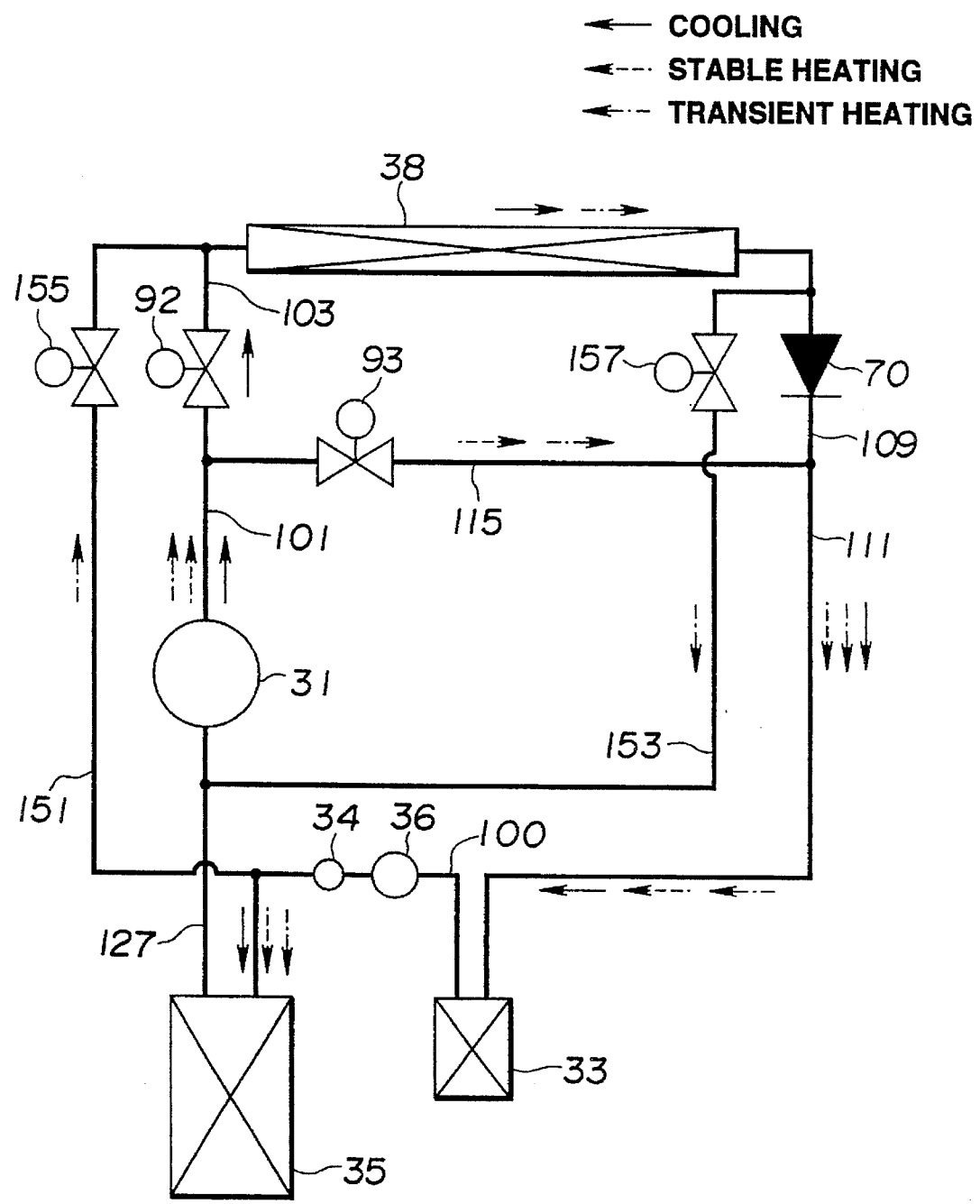
FIG. 21 is a view which shows refrigerant flow during each mode in a ninth embodiment of the air conditioner according to the present invention.

As shown in FIG. 21, the refrigeration cycle of the ninth embodiment of the air conditioner comprises the compressor 31, the outer heat exchanger 38, the heat-radiating inner heat exchanger 33, the expansion valve 34, and the heat-absorbing inner heat exchanger 35. The refrigerant discharge side of the compressor 31 and the refrigerant inlet side of the outer heat exchanger 38 are connected by the conduits 101 and 103. The refrigerant outlet side of the outer heat exchanger 38 and the refrigerant inlet side of the heat-radiating inner heat exchanger 33 are connected by the conduits 109 and 111. The refrigerant outlet side of the heat-radiating inner heat exchanger 33 and the refrigerant inlet side of the heat-absorbing inner heat exchanger 35 are connected by the conduit 100, while the receiver 36 and the expansion valve 34 are disposed in the conduit 100. The refrigerant outlet side of the heat-absorbing inner heat exchanger 35 and the refrigerant suction side of the compressor 31 are connected by the conduit 127. The junction between the conduits 101 and 103 and the junction between the conduit 109 and 111 are connected by the conduit 115. A first on-off valve 92 functioning as a refrigerant flow switching means is disposed in the conduit 103. A second on-off valve 93 is disposed in the conduit 115. A one-way valve 70 is disposed in the conduit 109 so as to only allow the refrigerant flow to the heat-radiating inner heat exchanger 33. With the thus arranged construction constitutes a basic cycle of the ninth embodiment.

On the other hand, a first parallel auxiliary conduit 151 and a second parallel auxiliary conduit 153 are provided in this embodiment as a further refrigerant passage switching means. An end of the first parallel auxiliary conduit 151 is connected to the refrigerant inlet side of the heat-absorbing inner heat exchanger 35 through the conduit 100. The other end of the first parallel auxiliary conduit 151 is connected to the refrigerant inlet side of the outer heat exchanger 38 through the conduit 103. Accordingly, the refrigerant inlet side of the heat-absorbing inner heat exchanger 35 and the refrigerant inlet side of the outer heat exchanger 38 are fluidly communicated through the first parallel auxiliary conduit 151. A first refrigerant passage control valve 155 constituted by a two-way valve as a first refrigerant passage control means is disposed in the first parallel auxiliary conduit 151. An end of the second parallel auxiliary conduit 153 is connected to the refrigerant outlet side of the outer heat exchanger 38 through the conduit 109, and the other end of the second parallel auxiliary conduit 153 is connected to the refrigerant suction side of the compressor 31 through the conduit 127. A second refrigerant passage control valve 157 constituted by a two-way valve as a second refrigerant passage control means is disposed in the second parallel auxiliary conduit 153.

The above-mentioned valves 92, 93, 155 and 157 are of an electromagnetic type two-way valve which is operated by the control unit 43 so as to be switched between an on-state and an off-state. The valves 92 and 93 may be a three-way valve. Either the normal close type or the normal open type may be applied to the two-way valve. Taking into consideration various factors, such as an abnormal raising of the refrigeration cycle pressure during a valve closing period, the holdup of the refrigerant in the outer heat exchanger due to the opening of the valve, and the energy consumption degree under the operation of the system, a preferable type of the valve should be selected.

Figure 22:
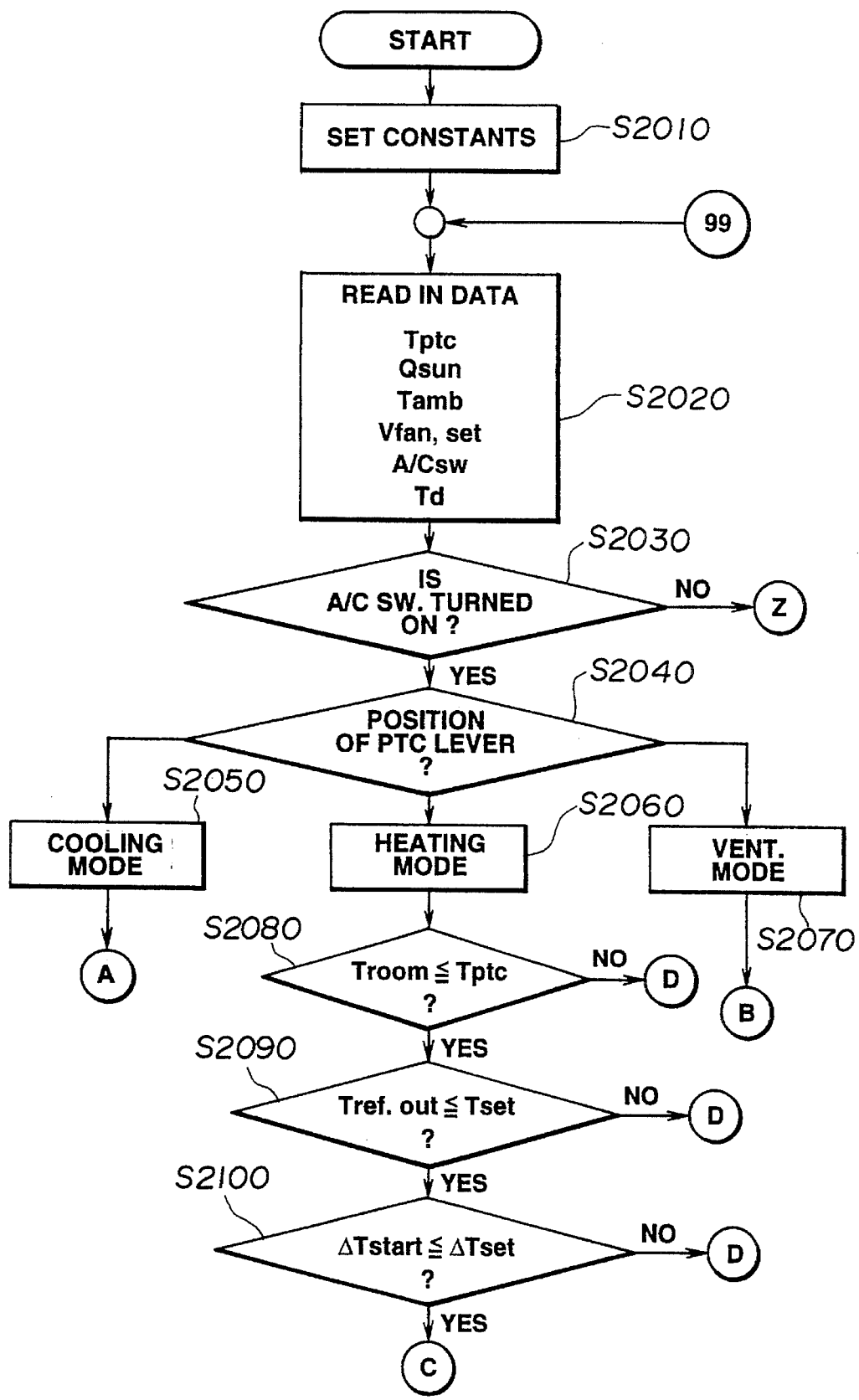
FIG. 22 is a part of a flow chart which is applied to the control of the ninth embodiment of FIG. 21.
Figure 23A:
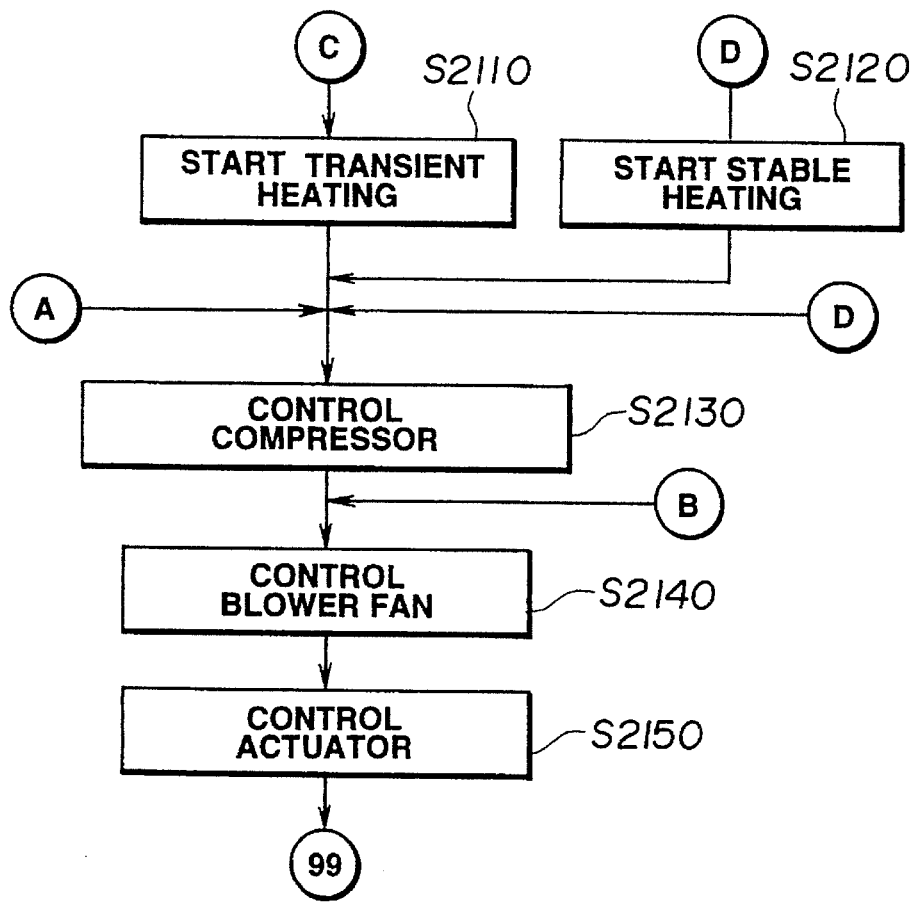
FIGS. 23A and 23B are other parts of the flow chart which are applied to the control of the ninth embodiment of FIG. 21.
Figure 23B:
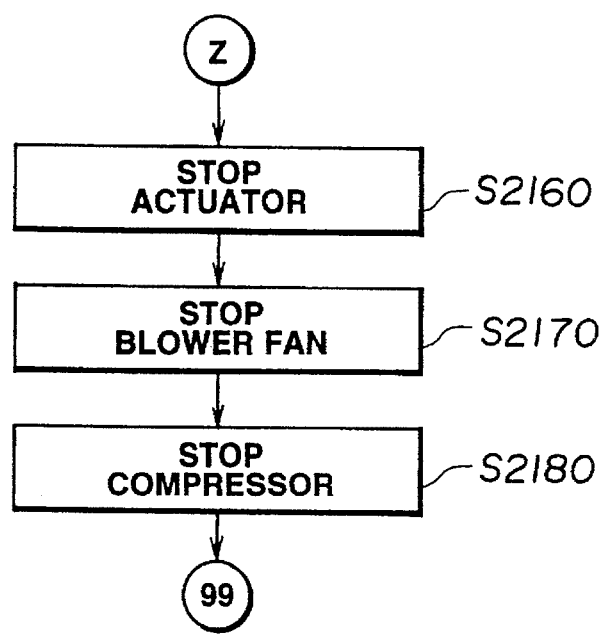

The ninth embodiment of the air conditioner is controlled according to the flow chart shown in FIGS. 22, 23A and 23B. The air conditioner implements a cooling operation, a stable heating operation (heating operation) and a transient heating operation (weak heating operation) according to the control by the control unit 43. The stable heating operation is a first heating operation which is implemented when the room temperature and the refrigeration cycle are in a stable condition. The transient heating operation is a second heating operation which is implemented during an initial period of the heating and during a transient period of the refrigeration cycle.

In a step S2010, constants A to H, P, and Q are set in the control unit 43. The constants A to E are applied to an equation by which the target outlet air temperature $T_{of}$ is calculated; the constants F, G, and H are applied to an equation by which the opening degree X of the air mixing door 46 is calculated; and the constants P and Q are used as a correction of the preset room temperature, as is the same as that in the first embodiment.

In a step S2020, various values detected by the various sensors and the data inputted by the vehicle passenger are read in the control unit 43. That is, the preset value $T_{ptc}$, the solar radiation amount $Q_{sun}$, the ambient temperature $T_{amb}$, the preset fan voltage $V_{fan.set}$ and a signal $AC_{sw}$ of an air conditioner switch (no numeral), and the refrigerant discharged temperature $T_d$ of the refrigerant discharged form the compressor 31 are read in the control unit 43.

In a step S2030, it is judged whether or not the air conditioner switch is turned on. When the switch is turned on in the step S2030, the program proceeds to a step S2040, wherein the operation mode is selected according to the selected position of the temperature preset lever. For example, if a horizontally moved lever is applied to the temperature preset lever, the cooling operation is selected when the lever is set at a left side, the heating operation is selected when the lever is set at a right side, and the ventilation operation is selected when the lever is set at an intermediate portion. The description of "the heating mode" is used since the two types of heating are implemented in this system. When the air conditioner switch is turned off in the step S2030, the program jumps to a routine of FIG. 23B.

In a step S2050, several valves are set in order to implement the cooling operation.

In a step S2060, the heating mode is selected although it is not decided in this step which of the transient heating and the stable heating is selected.

In a step S2070, the ventilation operation is implemented without the operation of the compressor 31.

In a step S2080, it is judged whether or not the room temperature $T_{room}$ is lower than or equal to a first predetermined value, such as 15° C. That is, it is judged whether or not the room temperature $T_{room}$ is not in a stable condition. When the room temperature $T_{room}$ is lower than or equal to the preset value, the program proceeds to a step S2090. When the room temperature $T_{room}$ is higher than the preset value, the program jumps to the routine of FIG. 23A.

In the step S2090, it is judged whether or not the refrigerant discharge temperature is lower than or equal to a second predetermined value, such as 55° C. That is, it is judged whether the refrigeration cycle is not in a fully operable condition. When the judgment in the step 2090 is "YES", the program proceeds to a step S2100. When the judgment in the step S2090 is "NO", the program proceeds to a step S2120 of the routine shown in FIG. 23A.

In the step S2100, the time period from the start of the compressor 31 to the present time is calculated, and it is judged whether the calculated time period is smaller than or equal to a predetermined time period, such as thirty minutes. That is, it is judged whether it is not necessary to implement the defrosting operation. When the judgment in the step S2100 is "YES", the program proceeds to a step S2110 in the routine shown in FIG. 23A. When the judgment in the step S2100 is "NO", the program proceeds to the step S2120 of FIG. 23A.

That is, the judgments in the steps S2080, S2090 and S2100 are implemented in order to select one of the transient heating operation and the stable heating operation. More particularly, when the refrigerant discharge temperature is lower than or equal to the first predetermined value and when the time period from the start of the compressor 31 is smaller than or equal to the second predetermined time period, it is judged that the room air temperature $T_{room}$ and the refrigeration cycle is not in a stable condition and that the outer heat exchanger 38 is not frozen. Accordingly, the transient heating operation is implemented. On the other hand, when the refrigerant discharge temperature is higher than the first predetermined value and when the time period from the start of the compressor 31 is larger than the second predetermined time period, it is judged that the room air temperature and the refrigeration cycle are in a stable condition. Accordingly, the stable heating operation is implemented while implementing the defrosting. The priority order of the judgments is in the order of the room air temperature, the refrigerant discharge temperature and the time period from the start of the compressor 31. It is of course that the selection between the stable and transient heating operations is decided according to one of the judgments in the steps S2080, S2090 and S2100.

In the step S2110, the stable transient heating is implemented. In order to implement the stable transient heating for improving the heating capacity, the valves 92, 93, 155 and 157 are set at a condition such that the outer heat exchanger 38 functions as an evaporator. This heating operation is implemented when all of the following conditions are satisfied. (1) The room temperature $T_{room}$ is lower than or equal to a first predetermined value, such as 15° C. That is, the room temperature is in a stable condition. (2) The refrigerant discharge temperature is lower than or equal to a second predetermined value, such as 55° C. That is, the refrigeration cycle is not in a fully operable condition. (3) The time period from the start of the compressor 31 to the present time is smaller than or equal to a predetermined time period, such as thirty minutes. That is, it is not necessary to implement the defrosting operation.

In a step S2120, the stable heating is implemented by setting the valves 92, 93, 155 and 157 so as not to use the outer heat exchanger 38 as a heat exchanger. This heating operation is implemented when at least one of the following conditions is satisfied. (1) The room temperature $T_{room}$ is higher than a first predetermined value, such as 15° C. That is, the room temperature is in a stable condition. (2) The refrigerant discharge temperature is higher than a second predetermined value, such as 55° C. That is, the refrigeration cycle is in a fully operable condition. (3) The time period from the start of the compressor 31 to the present time is larger than a predetermined time period, such as thirty minutes. That is, it is necessary to implement the defrosting operation.

In a step S2130, a setting of a rotation speed of the compressor 31 is implemented.

In a step S2140, the applied voltage to the blower fan 37 is implemented for setting the air flow rate from the blower fan 37.

In a step S2150, the opening-degree of each door of each actuator is set.

After the implementation of the steps S2130, S2140 and S2150, the program returns to the step S2020.

The routine of FIG. 23B is implemented when it is judged in the step S2030 that the air-conditioner switch is not turned on.

When the above-mentioned control is implemented, the refrigerant flow and the set positions of the valves are determined as shown in FIGS. 24A and 24B.

FIG. 24A is a table which shows a set condition of each of the valves 92, 93, 155 and 157 in each operation of the air conditioner. That is, during the cooling operation the valve 92 is opened, and the valves 93, 155 and 157 are closed. During the stable heating operation, the valve 93 is opened, and the valves 92, 155 and 157 are closed. During the transient heating operation, the valve 92 is closed, and the valves 93, 155 and 157 are opened.

FIG. 24B is a table which shows a refrigerant flow condition of the refrigeration cycle. During the cooling operation the refrigerant flows as follows: The compressor 31→the first switching valve 92→the outer heat exchanger 38→the one-way valve 70→the heat-radiating inner heat exchanger 33→ the receiver 36→the expansion valve 34→the heat-absorbing inner heat exchanger 35→the compressor 31. During the stable heating operation, the refrigerant flows as follows: The compressor 31→the valve 93→the heat-radiating inner heat exchanger 33→the receiver 36→the expansion valve 34→the heat-absorbing inner heat exchanger 35→the compressor 31. During the transient heating operation, the refrigerant flows as follows: The compressor 31→the valve 93→ the heat-radiating inner heat exchanger 33→the receiver 36→ the expansion valve 34. After the expansion valve 34, the refrigerant flow is divided into two ways as follows: (1) the expansion valve 34→the heat-absorbing inner heat exchanger 35→compressor 31, and (2) the expansion valve 34→the valve 155→the outer heat exchanger 38→the valve 157→the compressor 31.

Figure 53:
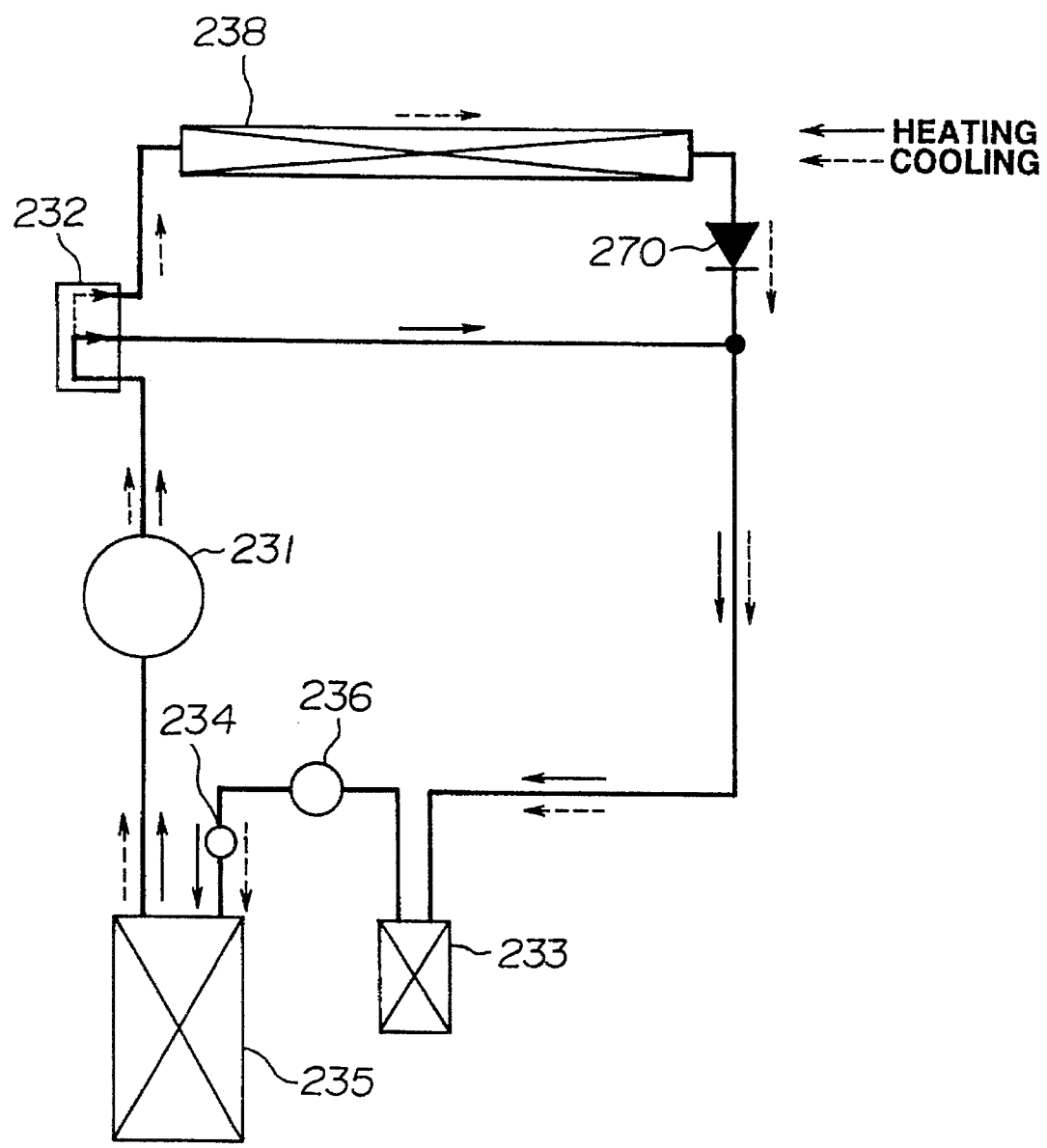
FIG. 53 is a view which shows refrigerant flow of another conventional air conditioner.

Although the refrigerant flows during the cooling operation and the stable heating operation in the ninth embodiment are the same as those in the conventional air conditioner shown in FIG. 53, during the transient heating operation, the refrigerant flowed from the expansion valve 34 is supplied to the heat-absorbing inner heat exchanger 35 and the outer heat exchanger 38 in parallel. Then, the refrigerant is sucked into the compressor 31.

With the thus arranged air conditioner, even if the refrigerant has been stored in the outer heat exchanger 38 by the encroachment of the refrigerant through sealing portions of the valves 70 and 92 during the heating operation, it is possible to avoid the holdup of the refrigerant in the outer heat exchanger 38 by the refrigerant flow to the outer heat exchanger 38 during the transient stable heating operation. Accordingly, the amount of the refrigerant is kept sufficient when the operation is changed into the stable heat operation, and the heating capacity is sufficiently ensured. This enables the dehumidifying heating operation to be sufficiently implemented during the heating operation, and the sufficient dehumidifying heating to be implemented during the transient heating operation in addition to the heat-absorbing function at the outer heat exchanger 38. Furthermore, the operation of the air conditioner is changed from the transient heating operation to the stable heating operation when the predetermined time has elapsed from the start of the operation. Accordingly, it is possible to avoid the generation of freezing of the outer moisture to the outer heat exchanger 38, and therefore it becomes possible to provide a comfortable thermal environmental condition to passengers during the heating operation.

Although one expansion valve 34 has been used in the ninth embodiment, it will be understood that the expansion valve may be installed to both divided refrigerant passages of the heat-absorbing inner heat exchanger 35 and the outer heat exchanger 38. By the installation of a plurality of expansion valves, it becomes possible to freely set the heat exchanger duty according to the respective evaporators 35 and 38. For example, it becomes easy to set such that the heat exchanger duty of the heat-absorbing inner heat exchanger 35 is larger than that at the outer heat exchanger 38. Furthermore, it becomes possible to change the valve 155 from the electro-magnet type two-way valve to a one-way valve which allows the refrigerant flow from the expansion valve 34 to the outer heat exchanger 38. If a one-way valve is applied to the valve 155, it is assumed that the refrigerant passed through the expansion valve 34 may be stored in the outer heat exchanger 38 during the stable heating operation. Accordingly, it is preferable to use the electro-magnet type two-way valve in a condition that the stable heating operation is frequently used.

Figure 25:
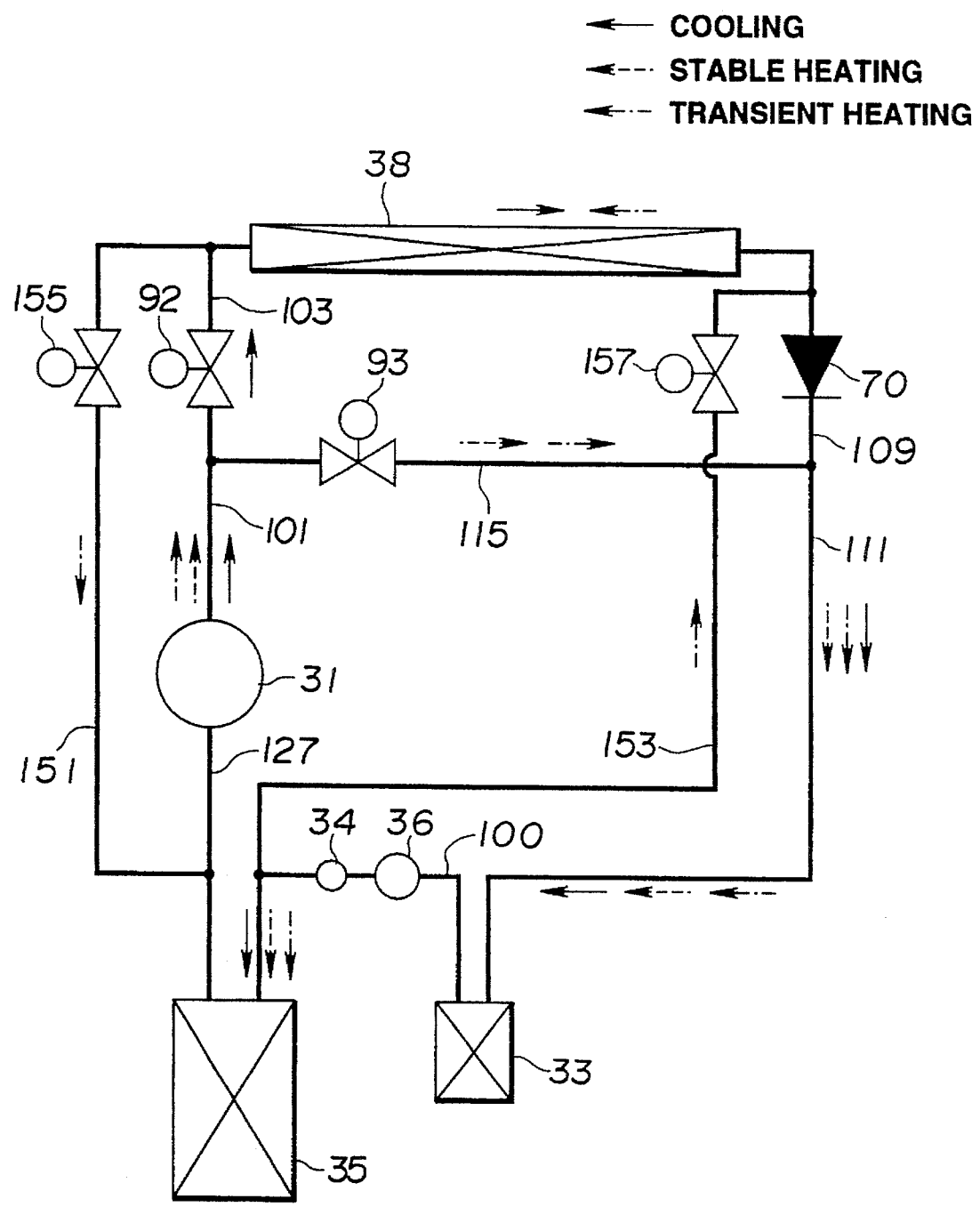
FIG. 25 is a view which shows refrigeration flow during each mode in a tenth embodiment of the air conditioner according to the present invention.

FIG. 25 shows a refrigeration cycle of a tenth embodiment of the air conditioner according to the present invention.

In this embodiment, a first parallel auxiliary conduit 151 and a second parallel auxiliary conduit 153 are arranged so as to parallelly connect the heat-absorbing inner heat exchanger 35 and the outer heat exchanger 38 during the transient heating operation. The first parallel auxiliary conduit 151 is connected to the conduit 127 which connects the heat-absorbing inner heat exchanger 35 and the compressor 31. The second parallel auxiliary conduit 153 is connected to the conduit 100 which connects the expansion valve 34 and the heat-absorbing inner heat exchanger 35. The other construction of this tenth embodiment is the same as that of the ninth embodiment.

FIGS. 26A and 26B show the set positions of the valves and the refrigerant flow conditions according to the operating condition of the tenth embodiment of the air condition. Since the meanings thereof is similar to that of the ninth embodiment, the explanation thereof is facilitated in this description.

Since the tenth embodiment of the air conditioner is arranged so that the refrigerant flows through the outer heat exchanger 38 reversely in direction during the transient heating operation, it is possible to obtain the functional effect similar to that of the ninth embodiment and to certainly prevent the refrigerant from being held up in the outer heat exchanger 38.

Furthermore, it is to be understood that a plurality of the expansion valves 34 may be installed in this embodiment and that the valve 157 may be replaced by a one-way valve which allows the refrigerant to flow from the expansion valve 34 to the outer heat exchanger 38.

Figure 27:
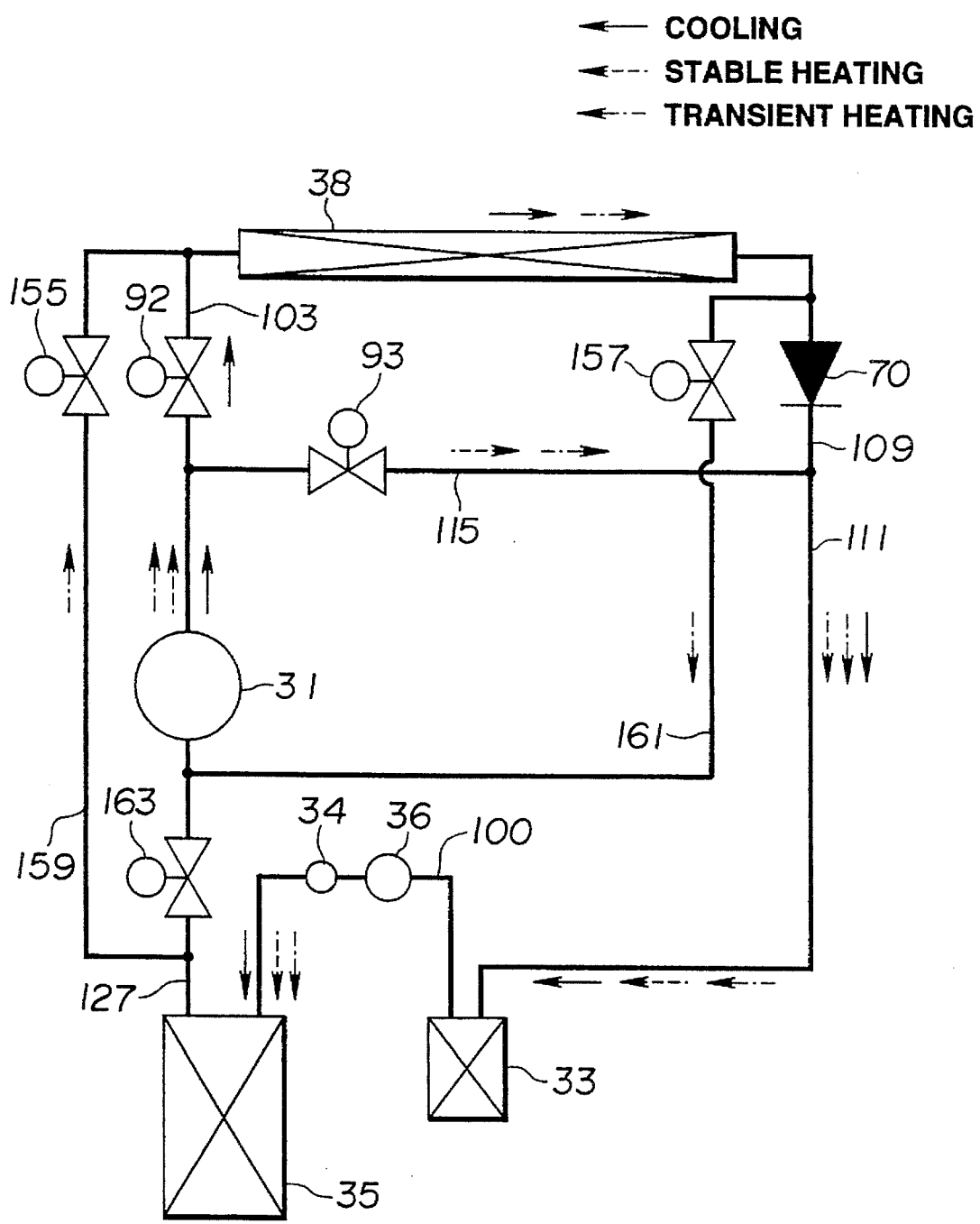
FIG. 27 is a view which shows refrigerant flow during each mode in an eleventh embodiment of the air conditioner according to the present invention.

FIG. 27 shows a refrigeration cycle of an eleventh embodiment of the air conditioner according to the present invention.

A first series auxiliary conduit 159 and a second series auxiliary conduit 161 are provided in this embodiment. One end of the first series auxiliary conduit 159 is connected to the conduit 127 connected to the refrigerant inlet side of the heat-absorbing inner heat exchanger 38. The other end of the first series auxiliary conduit 159 is connected to the refrigerant inlet side of the outer heat exchanger 38. A first refrigerant passage control valve 155 of a two-way valve is disposed in the first series auxiliary conduit 159. An end of the second series auxiliary conduit 161 is connected to the refrigerant suction side of the compressor 31 through the conduit 127. The other end of the second series auxiliary conduit 161 is connected to the refrigerant outlet side of the outer heat exchanger 38 through the conduit 109. A second refrigerant passage control valve 157 of a two-way valve is disposed in the second series auxiliary conduit 161. The constructions of the first and second series auxiliary conduits 159 and 161 are similar to those of the valves 159 and 161 in the ninth embodiment. The valve 155 may be replaced by a one-way valve as is similar to that in the ninth embodiment. A third refrigerant passage control valve 163 is disposed in the conduit 127 between the heat-absorbing inner heat exchanger 35 and the compressor 31 and between the junctions of the first series auxiliary conduit 159 and the second series auxiliary conduit 161. The third refrigerant passage control valve 163 is constituted by a two-way valve of an electromagnet type functioning as a third refrigerant passage control means.

FIGS. 28A and 28B show the set positions of the valves and the refrigerant flow conditions of the eleventh embodiment according to the operating condition of the air condition. Since the meanings thereof is similar to that of the ninth embodiment, the explanation thereof is facilitated in this description.

During the transient heating operation, the refrigerant discharged from the heat-absorbing inner heat exchanger 35 is flowed into the outer heat exchanger 38 through the valve 155, and further sucked into the compressor 31 through the valve 157. That is, the refrigerant flows through the heat-absorbing inner heat exchanger 35 and the outer heat exchanger 38 in series. Accordingly, during the transient heating operation, the refrigerant passed through the expansion valve 34 is heat-transferred in the heat-absorbing inner heat exchanger 35. Then, the refrigerant is flowed into the outer heat exchanger 38 through the valve 155 and transferred in the outer heat exchanger 38. Further, the refrigerant is sucked into the compressor 31 through the valve 157. Thus, the low pressure side refrigerant which has passed through the expansion valve 34 is heat-transferred in the heat-absorbing inner heat exchanger 35 and the outer heat exchanger 38 which function as an evaporator. Therefore, the controlled air which is blown into the passenger compartment is dehumidified by the heat-absorbing inner heat exchanger 35, and the heat of the ambient air is absorbed into the refrigerant while the holdup refrigerant in outer heat exchanger 38 is returned in the operating cycle by the vaporization.

With the thus series connection of the heat-absorbing inner heat exchanger 35 and the outer heat exchanger 38, the holdup of the refrigerant in the outer heat exchanger 38 is prevented, and a preferable thermal environment is obtained.

Figure 29:
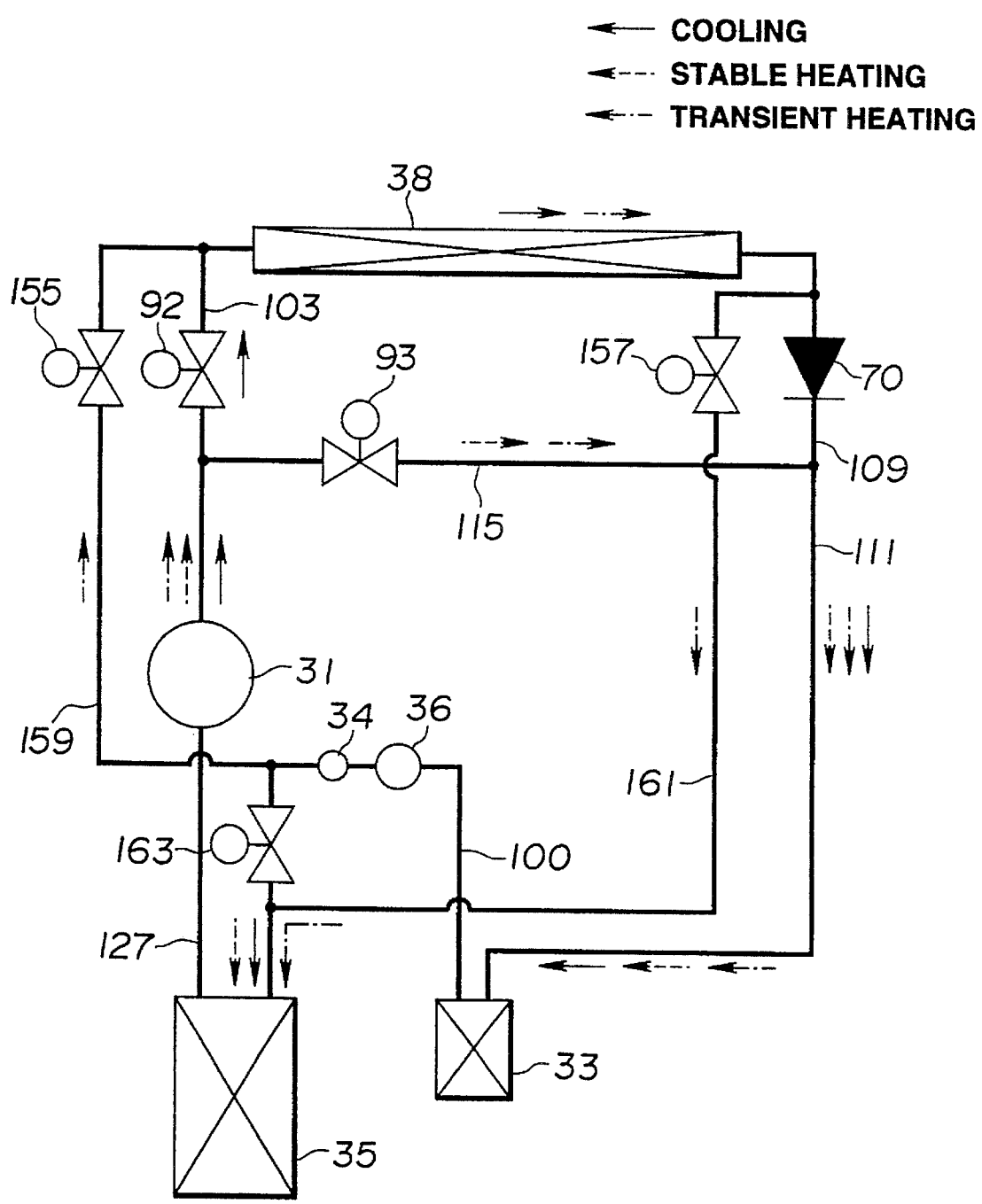
FIG. 29 is a view which shows refrigerant flow during each mode in an twelfth embodiment of the air conditioner according to the present invention.

FIG. 29 shows a refrigerant cycle of a twelfth embodiment of the air conditioner according to the present invention.

In this embodiment, an end of the first series auxiliary conduit 159 is connected to the refrigerant outlet side of the expansion valve 34 through the conduit 100. The other end of the first series auxiliary conduit 159 is connected to the refrigerant inlet side of the outer heat exchanger 38 through the conduit 103. An end of the second series auxiliary conduit 161 is connected to the refrigerant inlet side of the heat-absorbing inner heat exchanger 35 through the conduit 100. Furthermore, a third refrigerant flow-rate control valve 163 is disposed between the expansion valve 34 and the heat-absorbing inner heat exchanger 35, and between the first series auxiliary conduit 159 and the second series auxiliary conduit 161. The other construction of this embodiment is the same as that of the eleventh embodiment.

FIGS. 30A and 30B show set conditions of the valves and the refrigerant flow conditions according to the operating condition of the twelfth embodiment. During the transient heating operation, the refrigerant flowed-out from the expansion valve 34 is flowed into the outer heat exchanger 38 and next flowed into the heat-absorbing inner heat exchanger 35. Accordingly, functional effect is obtained as is similar to that of the eleventh embodiment, and the following effects are obtained. That is, since the refrigerant from the expansion valve 34 is immediately flowed into the outer heat exchanger 38, the heat exchanger duty of the outer heat exchanger 38 is increased, thereby increasing the heat-absorption from the ambient air. In this embodiment, the valve 155 may be replaced by a one-way valve.

Figure 31:
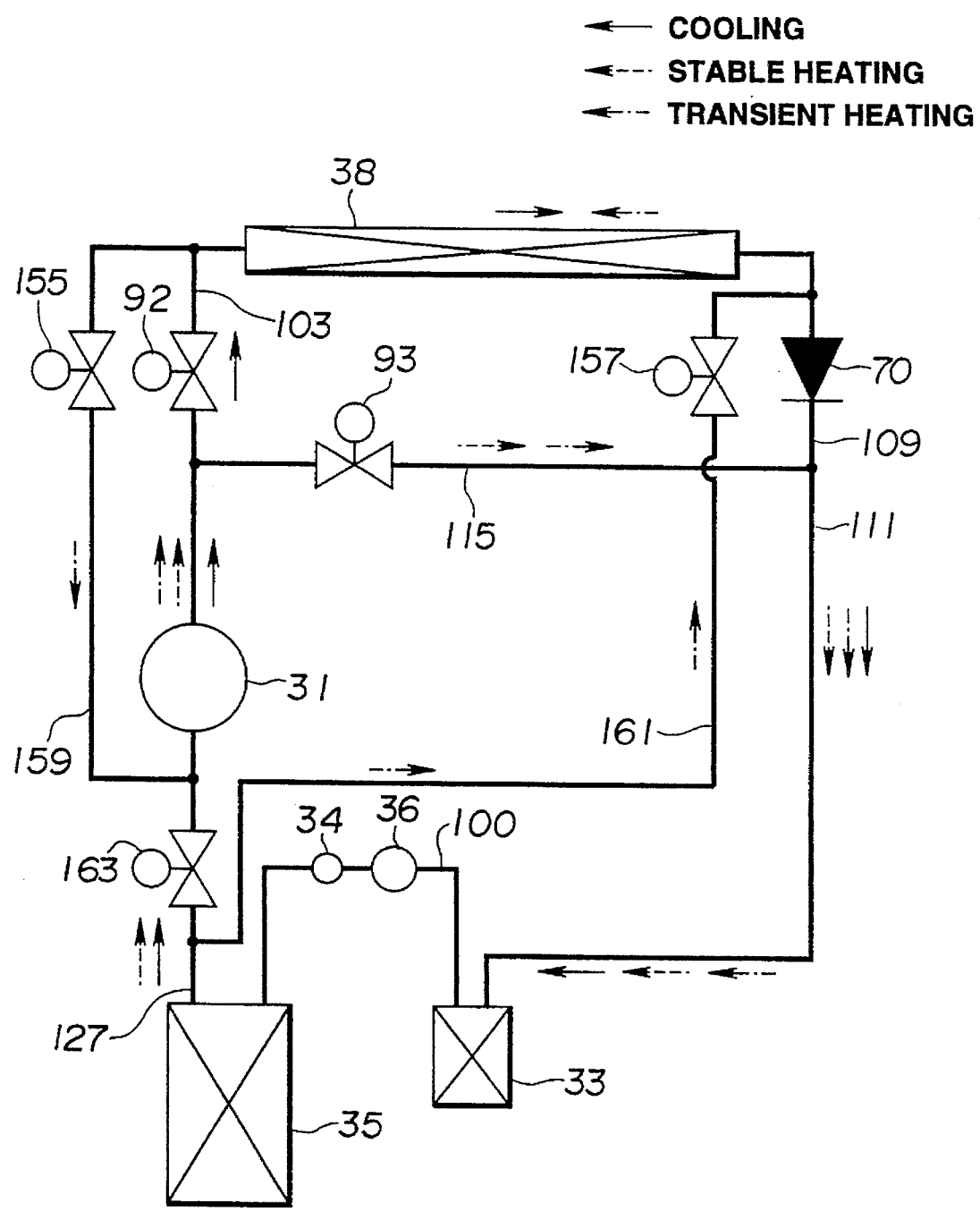
FIG. 31 is a view which shows refrigerant flow during each mode in a thirteenth embodiment of the air conditioner according to the present invention.

FIG. 31 shows a refrigeration cycle of a thirteenth embodiment of the air conditioner according to the present invention.

This embodiment is arranged such that during the transient heating operation, the heat-absorbing inner heat exchanger 35 and the outer heat exchanger 38 are connected in series, and the refrigerant flows through the outer heat exchanger 38 in a reverse direction. Accordingly, the first series auxiliary conduit 159 is connected to the suction side of the compressor 31 through the conduit 127. A second series auxiliary conduit 161 is connected to the refrigerant outlet side of the heat-absorbing inner heat exchanger 35 through the conduit 127. Further, a third refrigerant flow rate control valve 163 is disposed between the first series auxiliary conduit 159 and the second series auxiliary conduit 161. The other construction of this embodiment is the same as that of the eleventh embodiment.

FIGS. 32A and 32B show the set conditions of the valves and the refrigerant flow conditions of the thirteenth embodiment according to the operating conditions. Accordingly, functional effect is obtained as is similar to that of the eleventh embodiment is obtained, and the holdup of the refrigerant in the outer heat exchanger 38 is prevented by a reverse-flow of the refrigerant to the outer heat exchanger 38 during the transient heating operation.

Figure 33:
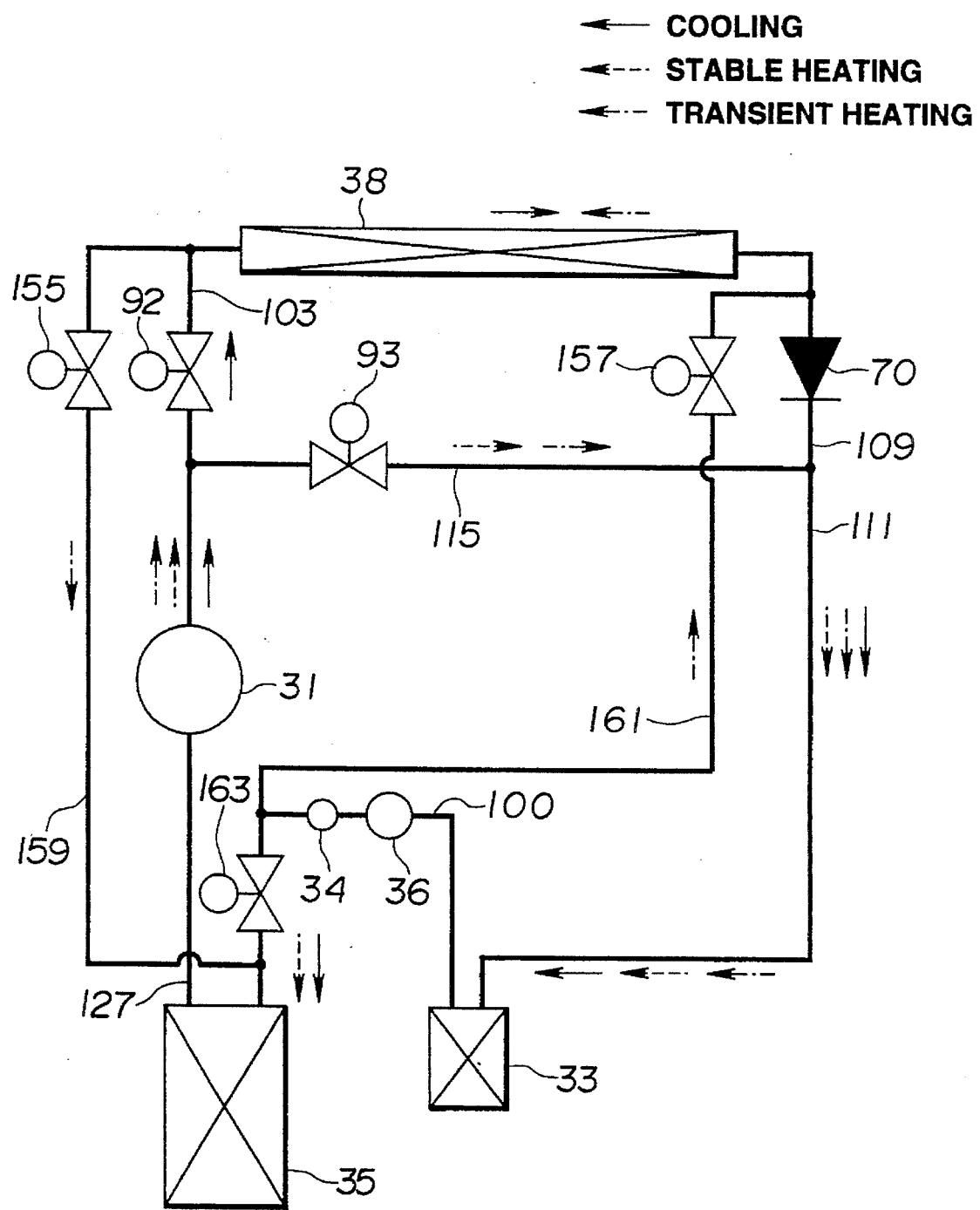
FIG. 33 is a view which shows refrigerant flow during each mode in a fourteenth embodiment of the air conditioner according to the present invention.

FIG. 33 shows a refrigeration cycle of a fourteenth embodiment of the air conditioner according to the present invention.

This embodiment is a modification of the twelfth embodiment. That is, an end of the first series auxiliary conduit 159 is connected to the refrigerant inlet side of the heat-absorbing inner heat exchanger 35 through the conduit 100. An end of the second series auxiliary conduit 161 is connected to the refrigerant outlet side of the expansion valve 34 through the conduit 100. The other construction of this embodiment is the same as that of the twelfth embodiment.

FIGS. 34A and 34B show set conditions of the valves and the refrigerant flow conditions according to the operating condition of the fourteenth embodiment. Accordingly, it is possible to obtain the functional effect as is similar to that of the twelfth embodiment. Further, it is possible to return the holdup refrigerant in the outer heat exchanger 38 by reversely flowing the refrigerant through the outer heat exchanger 38 during the transient heating operation. In this embodiment, the expansion valve 34 may be disposed at the branched conduits 100 and 161, respectively, and the valve 157 may be constituted by a one-way valve.

Figure 35:
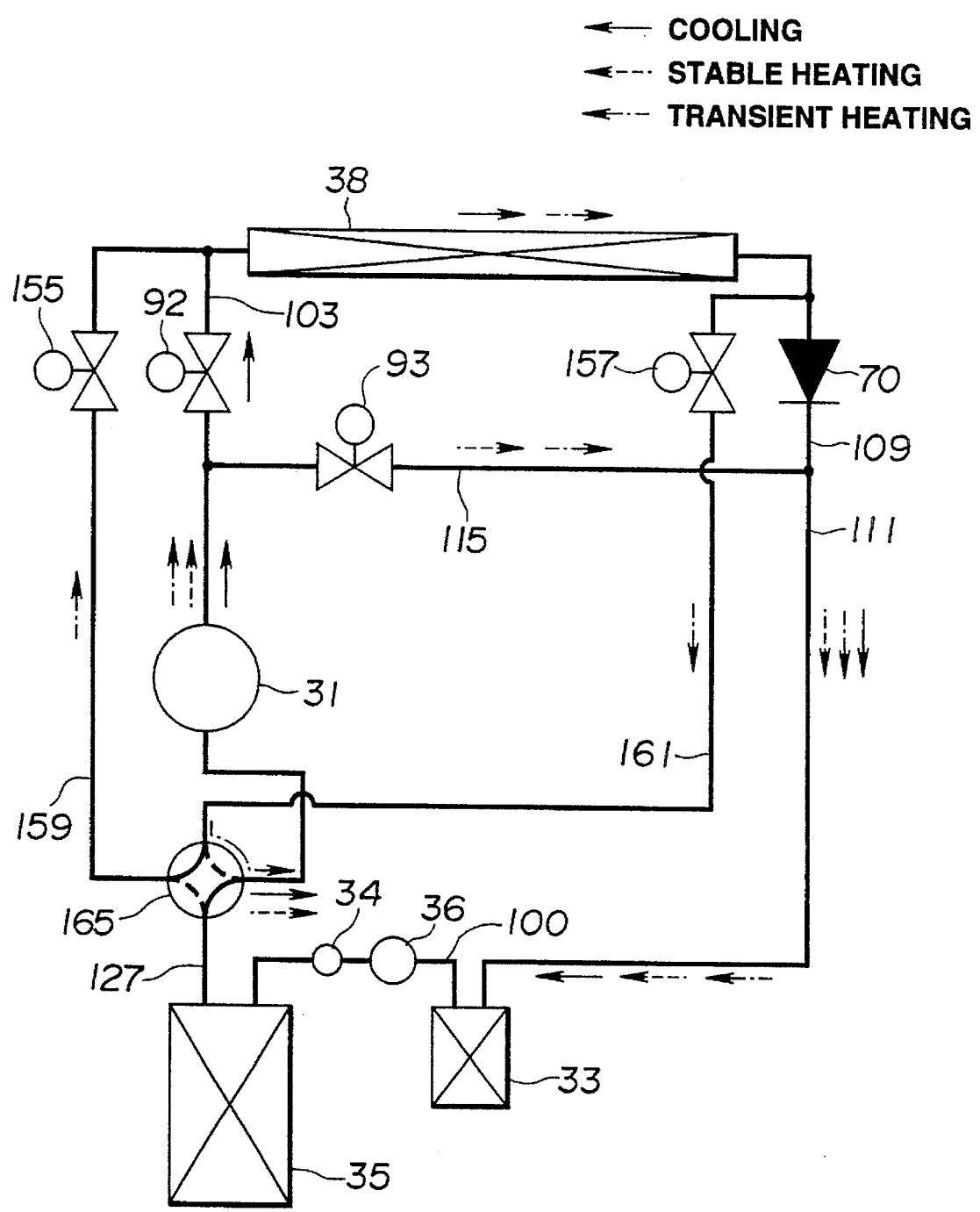
FIG. 35 is a view which shows refrigerant flow during each mode in a fifteenth embodiment of the air conditioner according to the present invention.

FIG. 35 shows a refrigeration cycle of a fifteenth embodiment of the air conditioner according to the present invention.

In this embodiment, the first series auxiliary conduit 159 and the second series auxiliary conduit 161 are connected through a four-way valve 165. That is, the four-way valve 165 is disposed in the conduit 127 connecting the heat-absorbing inner heat exchanger 35 and the compressor 31. An end of the first series auxiliary conduit 159 and an end of the second series auxiliary conduit 161 are connected to the four-way valve 165. The other construction is generally similar to that of the thirteenth embodiment.

FIGS. 36A and 36B show the set conditions of the valves and the refrigerant flow conditions of this embodiment according to the operating condition. That is, during the cooling operation and during the stable heating operation, the refrigerant from the heat-absorbing inner heat exchanger 35 is sucked into the compressor 31 through the four-way valve 165. During the transient heating operation, the refrigerant from the heat-absorbing inner heat exchanger 35 is flowed into the outer heat exchanger 38 through the four-way valve 165 and the valve 155. Further, the refrigerant is sucked into the compressor 31 through the valve 157 and the four-way valve 165. Accordingly, during the transient heating operation, the heat-absorbing inner heat exchanger 35 and the outer heat exchanger 38 are connected in series through the four-way valve 165. This enables the returning of the holdup refrigerant in the outer heat exchanger 38 to the operating refrigerating cycle during the transient heating operation. Therefore, functional effect similar to that of the eleventh embodiment is obtained. Further, by using the four-way valve 165, the number of the valves can be reduced and thereby decrease the production cost. In this embodiment, the valve 155 may be replaced by a one-way valve.

Figure 37:
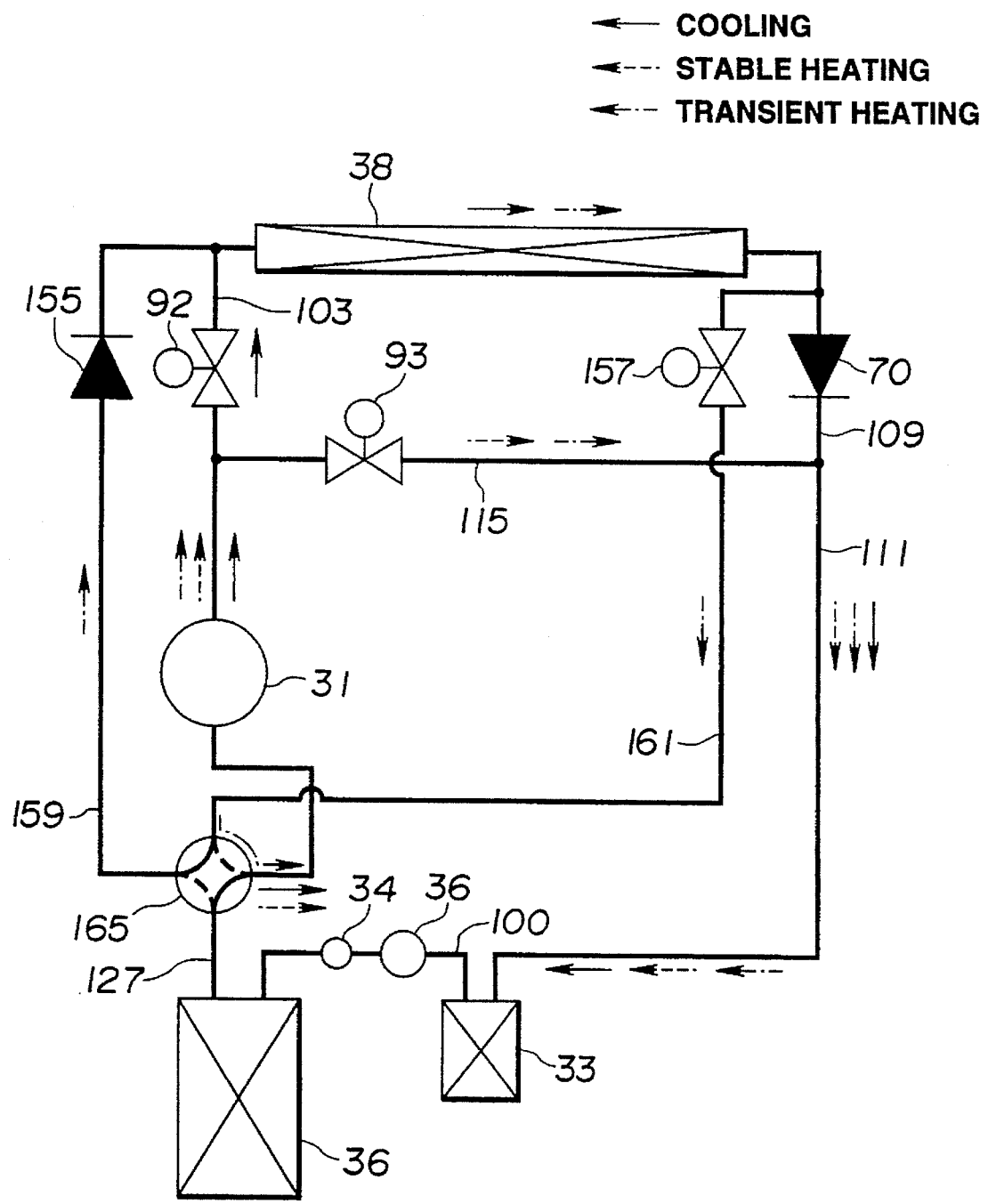
FIG. 37 is a view which shows refrigerant flow during each mode in a sixteenth embodiment of the air conditioner according to the present invention.

FIG. 37 shows a refrigeration cycle of a sixteenth embodiment of the air conditioner according to the present invention.

In this embodiment, the first refrigerant flow rate control valve 155 is constituted by a one-way valve. The other construction of this embodiment is the same as that of the fifteenth embodiment.

FIGS. 38A and 38B show the set conditions of the valves and the refrigerant flow conditions according to the operating condition of the sixteenth embodiment. Basic flow of the refrigerant in this embodiment is the same as that of the fifteenth embodiment. On the other hand, since the outer heat exchanger 38 is kept in high-pressure side of the refrigerant during the cooling operation, even if the low pressure refrigerant is stayed in the four-way valve 165, the refrigerant flow from the outer heat exchanger 38 to the four-way valve 165 is avoided due to the first refrigerant flow rate control valve 155. Further, during the stable heating operation, the outer heat exchanger 38 is separated from the refrigeration cycle by means of the four-way valve 165 and the like. Therefore, the first refrigerant flow rate control valve 155 does not operate during the heating operation. Accordingly, the functional effect similar to that of the fifteenth embodiment is obtained by this embodiment. Further, since the first refrigerant flow rate control valve 155 is constituted by a one-way valve, the structure of this system becomes simple and the control thereof is simplified.

Figure 39:
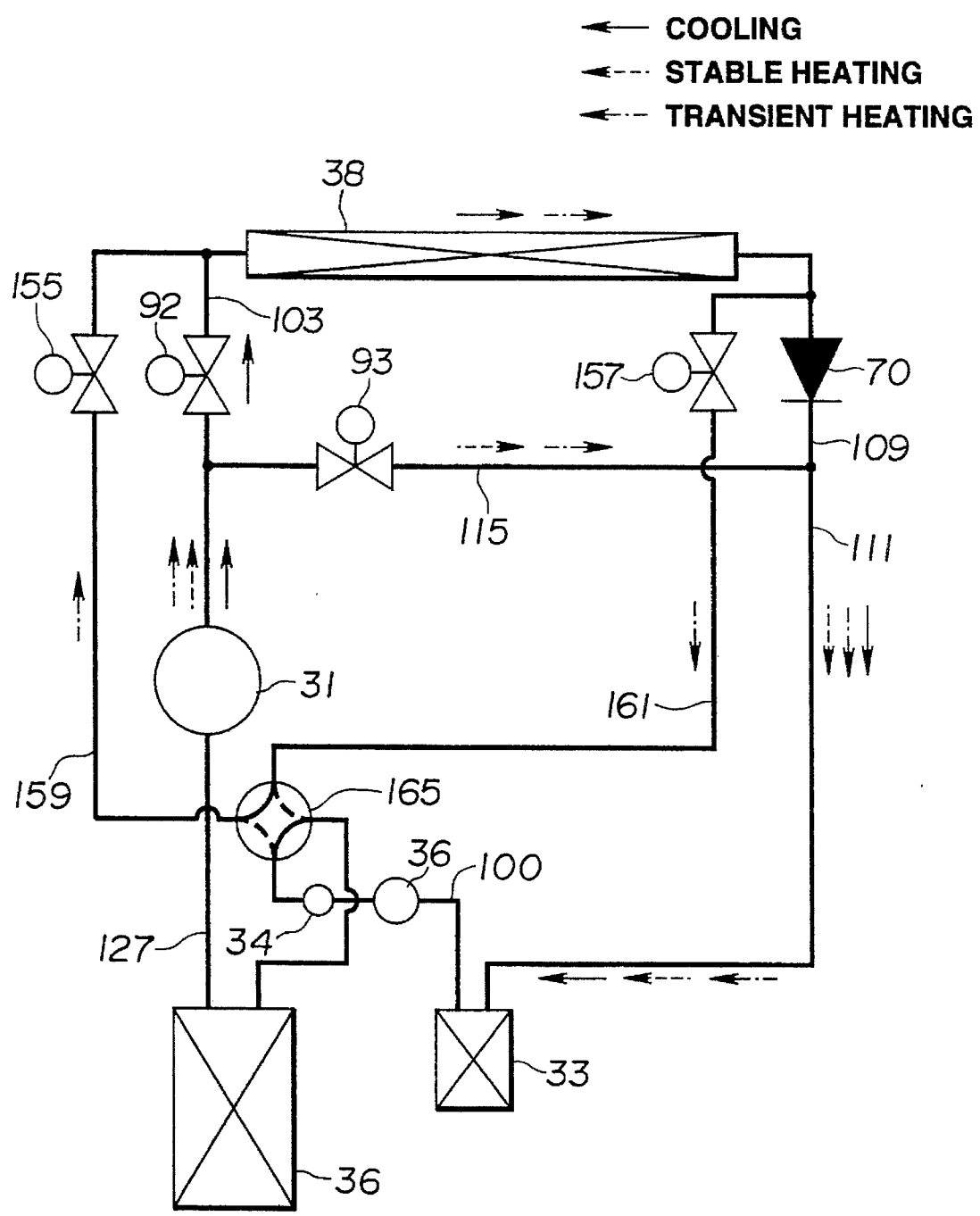
FIG. 39 is a view which shows refrigerant flow during each mode in a seventeenth embodiment of the air conditioner according to the present invention.

FIG. 39 shows a refrigeration cycle of a seventeenth embodiment of the air conditioner according to the present invention.

This embodiment uses the four-way valve 165 as is the same as that of the fifteenth embodiment of the air conditioner according to the present invention, although the installed position of the four-way valve 165 is changed from that of the fifteenth embodiment. That is, the four-way valve 165 is disposed between the expansion valve 34 and the heat-absorbing inner heat exchanger 35 through the conduit 100. An end of the first series auxiliary conduit 159 and an end of the second series auxiliary conduit 161 are connected to the four-way valve 165. The other construction of this embodiment is the same as that of the fifteenth embodiment.

FIGS. 40A and 40B show the set conditions of the valves and the refrigerant flow condition according to the operating condition. During the transient heating operation, the refrigerant from the expansion valve 34 is flowed into the outer heat exchanger 38 through the four-way valve 165 and the first refrigerant flow-rate control valve 155, and then flowed into the heat-absorbing inner heat exchanger 35 through the second refrigerant flow-rate control valve 157 and the four-way valve 165. Further, the refrigerant is sucked into the compressor 31. On the other hand, during the transient heating operation, the refrigerant is flowed into the outer heat exchanger 38, and then to the heat-absorbing inner heat exchanger 35. Therefore, the functional effect similar to that of the twelfth embodiment is obtained. Further, by using the four-way valve 165, the functional effect similar to that of the fifteenth embodiment is obtained.

Figure 41:
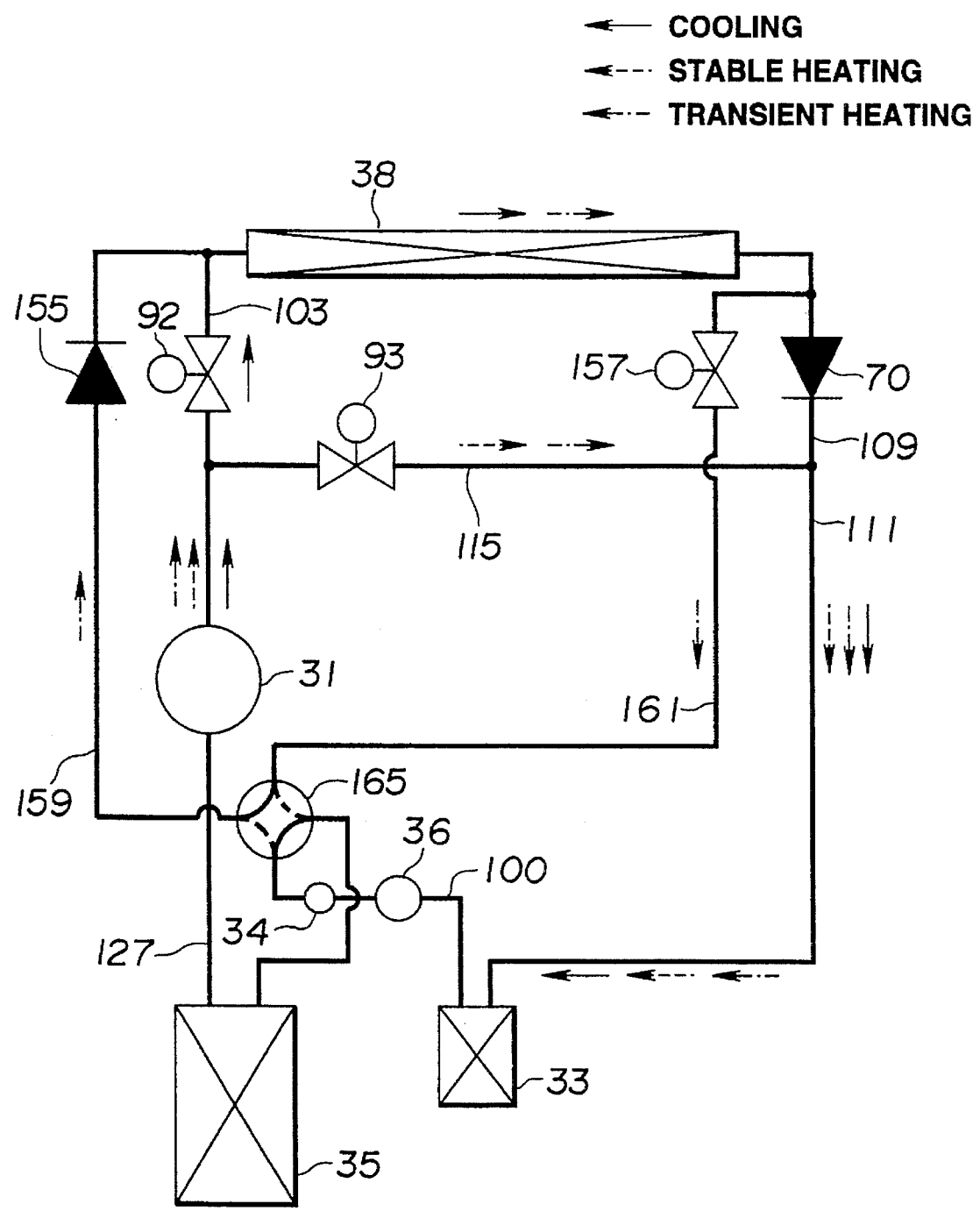
FIG. 41 is a view which shows refrigerant flow during each mode in a eighteenth embodiment of the air conditioner according to the present invention.

FIG. 41 shows a refrigeration cycle of an eighteenth embodiment of the air conditioner according to the present invention.

The construction of this eighteenth embodiment is generally the same as that of the seventeenth embodiment, except that a one-way valve is used as a first refrigerant flow-rate control valve 155.

FIGS. 42A and 42B show the set conditions and the refrigerant flow conditions according to the operating conditions of the eighteenth embodiment. With this arrangement, a functional effect is obtained as is the same as that of the seventeenth embodiment. Further, since the one-way valve is used as the first refrigerant flow-rate control valve 155, it is possible to obtain the functional effect as is the same as that of the sixteenth embodiment.

Figure 43:
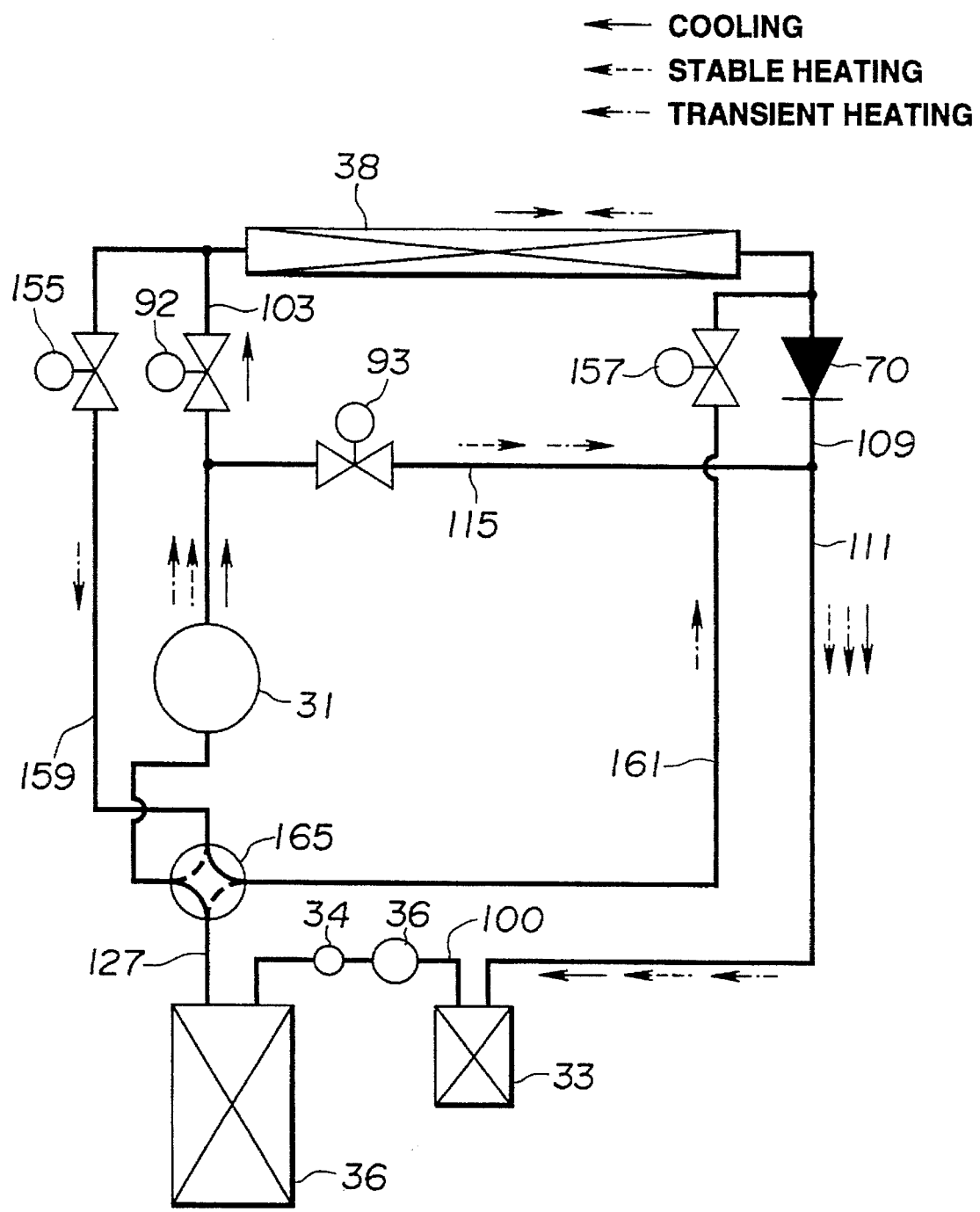
FIG. 43 is a view which shows refrigerant flow during each mode in a nineteenth embodiment of the air conditioner according to the present invention.

FIG. 43 shows a refrigeration cycle of a nineteenth embodiment of the air conditioner according to the present invention.

In this embodiment, the four-way valve 165 is used as is the same as that in the fifteenth embodiment. The four-way valve 165 is arranged so as to flow the refrigerant through the outer heat exchanger 38 in a reverse direction. Accordingly, the connections of the one end of the first series auxiliary conduit 159 and the one end of the second series auxiliary conduit 162 relative to the four-way valve 165 are different from those of the fifteenth embodiment, as shown in FIG. 43.

FIGS. 44A and 44B show the set conditions and the refrigerant flow conditions according to the operating conditions of the nineteenth embodiment. In this embodiment, during the transient heating operation the refrigerant from the heat-absorbing inner heat exchanger 35 is flowed into the outer heat exchanger 38 through the four-way valve 165 and the valve 157, and sucked into the compressor 31 from the valve 155 through the four-way valve 165. Since the refrigerant flows through the outer heat exchanger 38 in a reverse direction, it is possible to return the hold-up refrigerant in the outer heat exchanger to the operating refrigeration cycle by vaporization.

Figure 45:
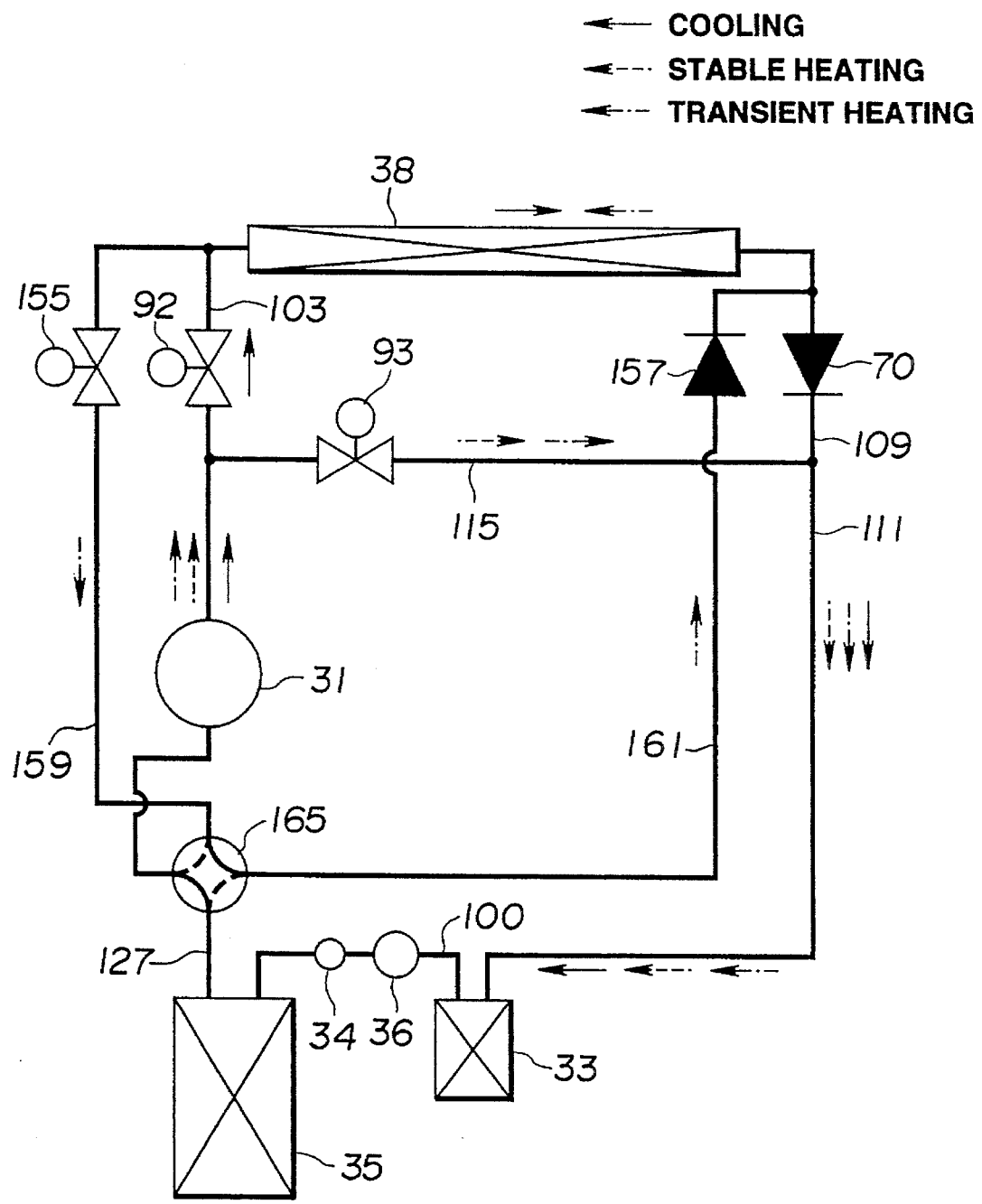
FIG. 45 is a view which shows refrigerant flow during each mode in a twentieth embodiment of the air conditioner according to the present invention.

FIG. 45 shows a refrigeration cycle of a twentieth embodiment of the air conditioner according to the present invention.

The construction of the twentieth embodiment is the same as that of the nineteenth embodiment, except that the second refrigerant flow rate control valve 157 is constituted by a one-way valve.

FIGS. 46A and 46B show the set conditions and the refrigerant flow conditions according to the operating conditions of the twentieth embodiment.

With this arrangement, a functional effect is obtained as is the same as that of the nineteenth embodiment. Further, since the one-way valve is used as the second refrigerant flow-rate control valve 157, it is possible to obtain the functional effect as is the same as that of the eighteenth embodiment.

Figure 47:
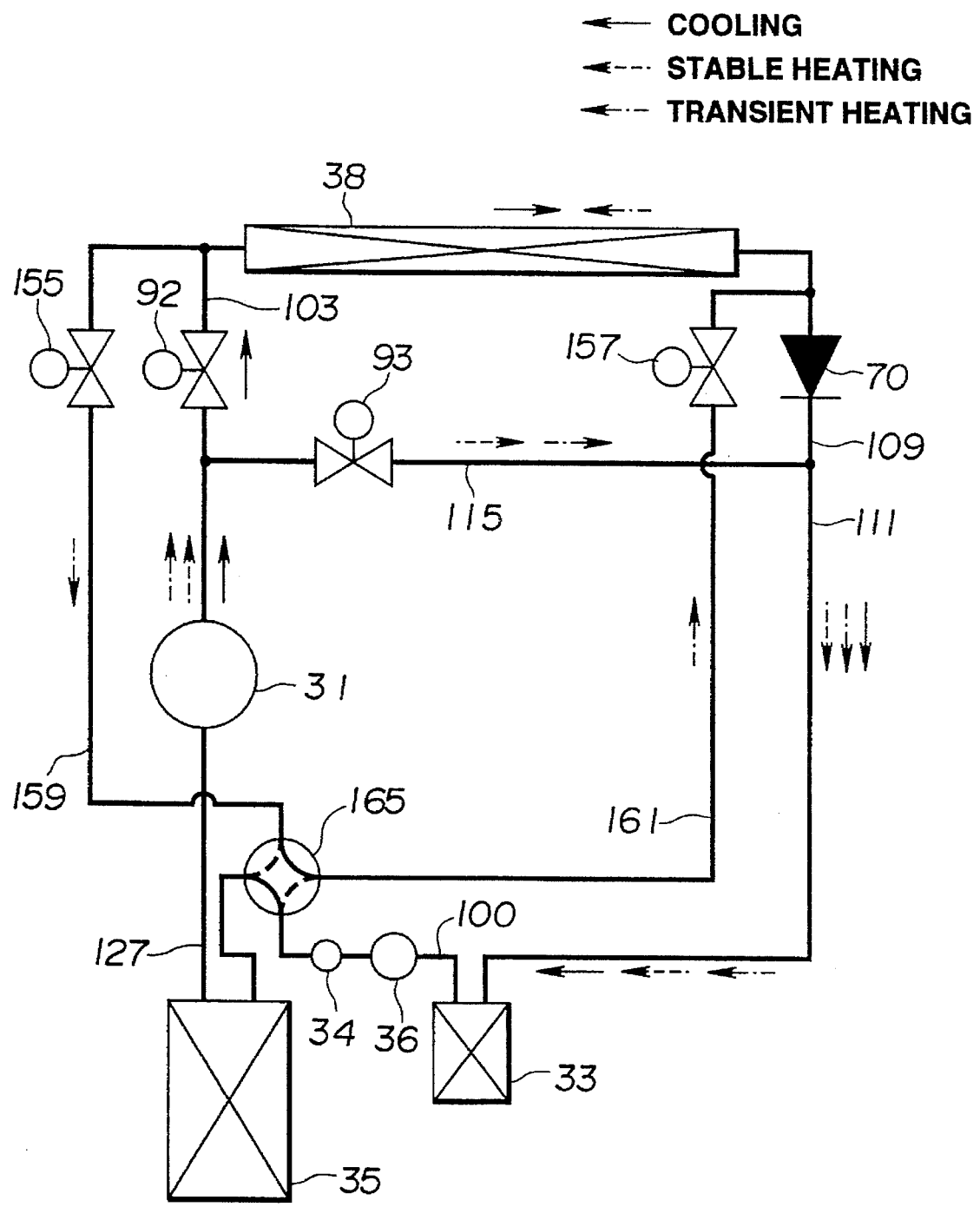
FIG. 47 is a view which shows refrigerant flow during each mode in a twenty-first embodiment of the air conditioner according to the present invention.

FIG. 47 shows a refrigeration cycle of a twenty-first embodiment of the air conditioner according to the present invention.

In this embodiment, the four-way valve 165 is disposed between the expansion valve 34 and the heat-absorbing inner heat exchanger 35 and is connected to the first and second series auxiliary conduits 159 and 161, as is similar to the seventeenth embodiment. However, the connection of the conduits to the four-way valve 165 is changed from that of the seventeenth embodiment, such that during the transient heating operation the refrigerant flows the outer heat exchanger 38 in a reverse direction.

FIGS. 48A and 48B show the set conditions and the refrigerant flow conditions according to the operating conditions of the twenty-first embodiment.

With this arrangement, a functional effect is obtained as is the same as that by of the seventeenth embodiment. Further, since the refrigerant flows the outer heat exchanger 38 in a reverse direction, it is possible to obtain the functional effect similar to that of the twentieth embodiment.

Figure 49:
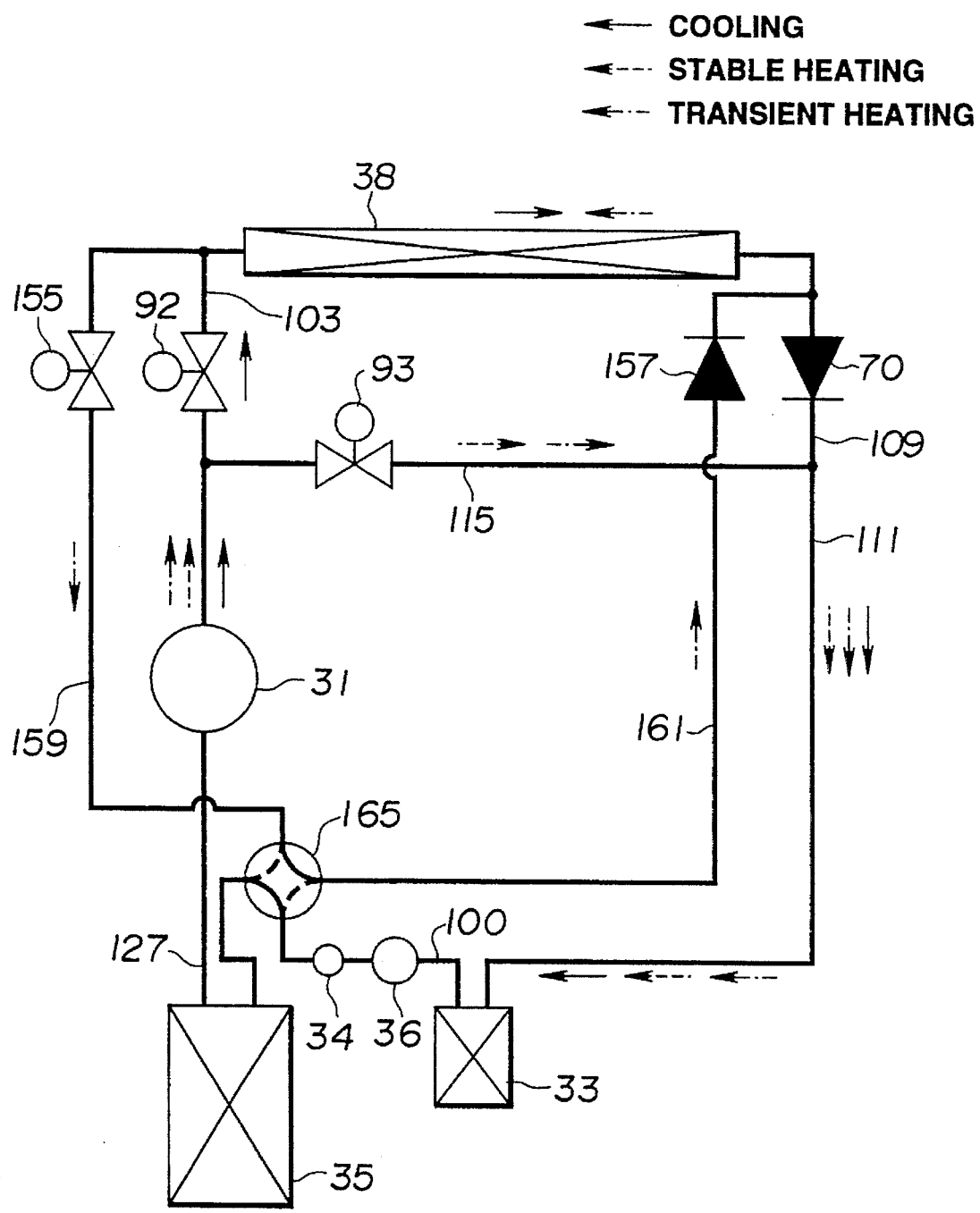
FIG. 49 is a view which shows refrigerant flow during each mode in a twenty-second embodiment of the air conditioner according to the present invention.

FIG. 49 shows a refrigeration cycle of a twenty-second embodiment of the air conditioner according to the present invention. The construction of the twenty-second embodiment is the same as that of the twenty-first embodiment, except that the second refrigerant flow rate control valve 157 is constituted by a one-way valve.

FIGS. 50A and 50B show the set conditions of valves and the refrigerant flow conditions according to the operating conditions of the twenty-second embodiment. With this arrangement, a functional effect is obtained as is the same as that of the twentieth embodiment. Further, since the one-way valve is used as the second refrigerant flow-rate control valve 157, it is possible to obtain the functional effect as is the same as that of the twentieth embodiment.

Figure 51:
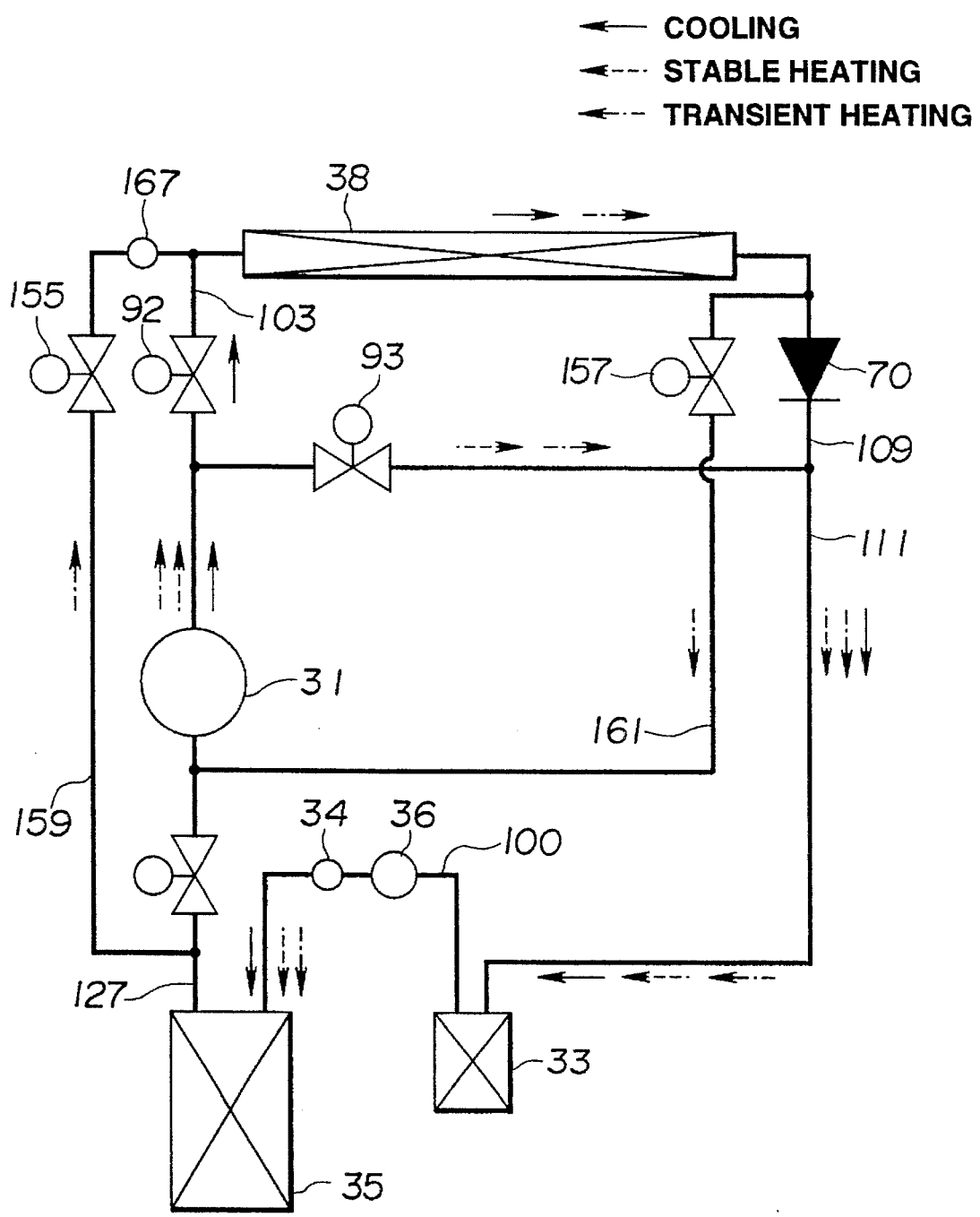
FIG. 51 is a view which shows refrigerant flow during each mode in a twenty-third embodiment of the air conditioner according to the present invention.
Figure 52:
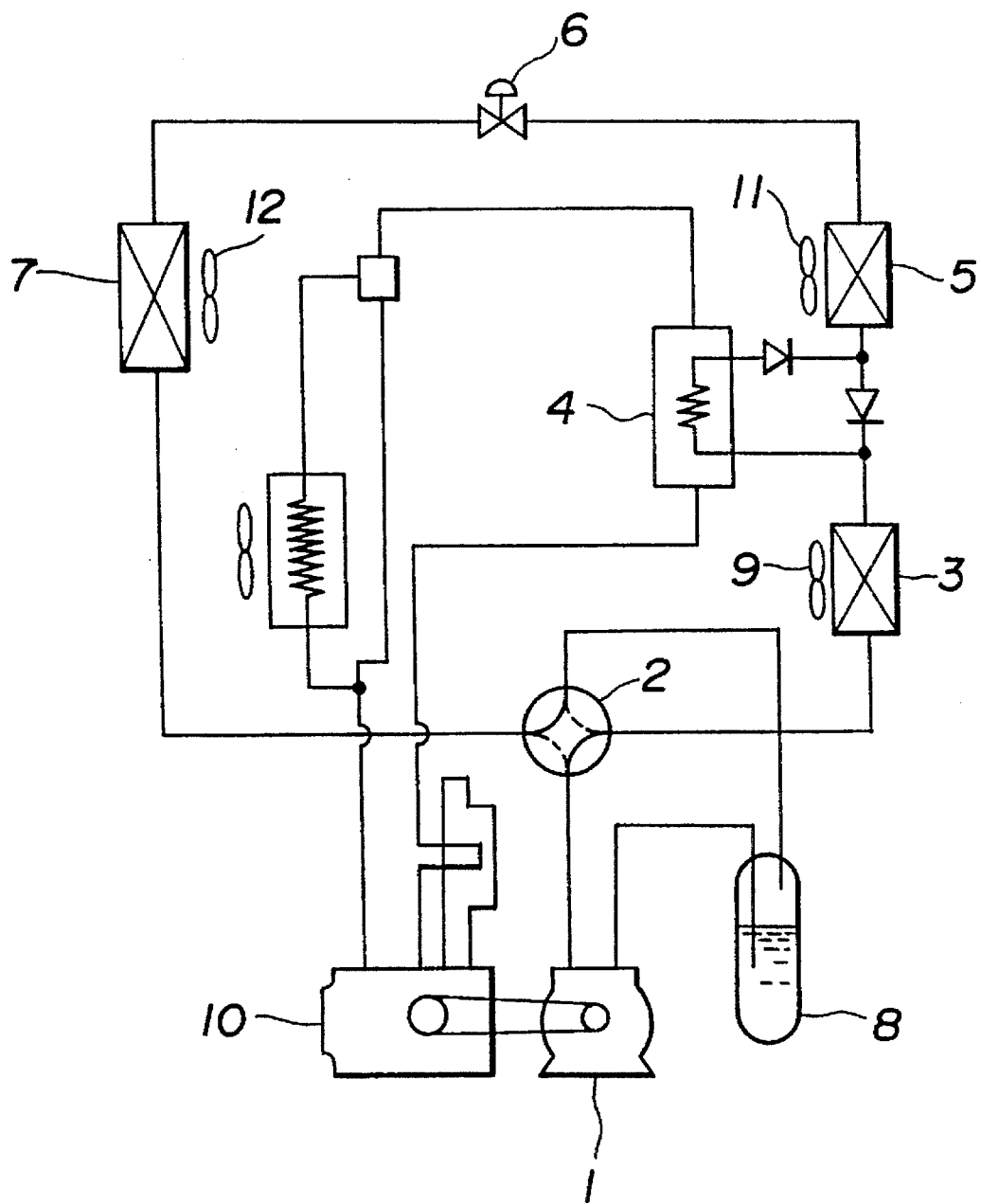
FIG. 52 is a schematic structural view of a conventional air conditioner for a vehicle.

FIG. 51 shows a refrigeration cycle of a twenty-third embodiment of the air conditioner according to the present invention. The construction of the twenty-third embodiment is the same as that of the eleventh embodiment, except that a second expansion valve 167 is disposed between the valve 155 and the outer heat exchanger 38.

With this arrangement, it becomes easy to independently control the heat-absorbing inner heat exchanger 35 and the outer heat exchanger 38 during the transient heating operation. Accordingly, the refrigerant is vaporized in the heat-absorbing inner heat exchanger 35 and further vaporized in the outer heat exchanger 38 upon lowering the pressure and temperature of the refrigerant by means of the second expansion valve 167. This enables to lower the operation temperature in the outer heat exchanger 38 as compared with that in the heat-absorbing inner heat exchanger 35. Therefore, the heat-absorption in the outer heat exchanger 38 is enabled even under a relatively lower ambient temperature condition.

What is claimed is:

1. An air conditioner for a vehicle, comprising:

refrigerant;

a compressor applying a workload to said refrigerant, said compressor having a refrigerant suction side and a refrigerant discharge side;

an outer heat exchanger transmitting heat between said refrigerant and ambient air, said outer heat exchanger having a first side and a second side;

a blower leading air for air-conditioning a passenger compartment of the vehicle;

a heat-radiating inner heat exchanger transmitting the heat of said refrigerant to the air led by said blower, said heat-radiating inner heat exchanger having a refrigerant inlet side and a refrigerant outlet side;

an expansion valve adiabatically expanding said refrigerant, said expansion value having a refrigerant inlet side and a refrigerant outlet side;

a heat-absorbing inner heat exchanger transmitting the heat of the air led by said blower to said refrigerant, said heat-absorbing heat exchanger having a refrigerant inlet side and a refrigerant outlet side; and refrigerant passage switching means for setting a refrigeration cycle to one of a cooling mode, a heating mode and a weak heating mode, said refrigerant passage switching means including a plurality of parallel auxiliary conduits which connect said heat-absorbing inner heat exchanger and said outer heat exchanger in parallel during the weak heating mode, in the cooling mode, said refrigerant flowing in the order of said compressor, said outer heat exchanger, said expansion valve, said heat-absorbing inner heat exchanger and said compressor, in the heating mode, said refrigerant flowing in the order of said compressor, said heat-radiating inner heat exchanger, said expansion valve, said heat-absorbing inner heat exchanger and said compressor while bypassing said outer heat exchanger, and in the weak heating mode, said refrigerant flowing in the order of said compressor, said heat-radiating inner heat exchanger, said expansion valve, said outer heat exchanger and said compressor.

2. An air conditioner for a vehicle as claimed in claim 1, wherein said refrigerant passage switching means includes:

a first parallel auxiliary conduit which connects the refrigerant inlet side of said heat-absorbing inner heat exchanger and the first side of said outer heat exchanger, a second parallel auxiliary conduit which connects the refrigerant outlet side of said heat-absorbing inner heat exchanger and the second side of said outer heat exchanger, a first refrigerant passage control means which is disposed in the first parallel auxiliary conduit, and a second refrigerant passage control means which is disposed in the second parallel auxiliary conduit.

3. An air conditioner as claimed in claim 2, wherein said first refrigerant passage control means is one of a two-way valve and a one-way valve, and said second refrigerant passage control means is a two-way valve.

4. An air conditioner for a vehicle as claimed in claim 1, wherein said refrigerant passage switching means includes:

a first parallel auxiliary conduit which connects the refrigerant outlet side of said heat-absorbing inner heat exchanger and the second side of said outer heat exchanger, a second parallel auxiliary conduit which connects the refrigerant inlet side of said heat-absorbing inner heat exchanger and the first side of the outer heat exchanger, a first refrigerant passage control means which is disposed in the first parallel auxiliary conduit, and a second refrigerant passage control means which is disposed in the second parallel auxiliary conduit.

5. An air conditioner as claimed in claim 1, further comprising:

means for detecting a condition of a refrigeration cycle constituted by said compressor, outer heat exchanger, heat-radiating inner heat exchanger, expansion valve and heat-absorbing inner heat exchanger, and means for implementing the heating mode during a stable condition of the refrigeration cycle and for implementing the weak heating mode during an early period or when a transient condition of the refrigeration cycle occurs, in accordance with the detected condition of the refrigeration cycle.

6. An air conditioner as claimed in claim 1, further comprising:

a timer for counting an operating time period from a start of said compressor, and switching control means for controlling said refrigerant passage switching means such that the weak heating mode is implemented until the timer counts up to a predetermined number, wherein the heating mode is implemented after the timer has counted up to the predetermined number.

7. An air conditioner as claimed in claim 1, further comprising:

means for detecting a passenger compartment thermal condition, and switching control means for implementing the heating mode during a stable temperature in the passenger compartment and for implementing the weak heating mode during an early period of a heating operation or when a transient temperature in the passenger compartment occurs, in accordance with the detected passenger compartment thermal condition.

8. An air conditioner for a vehicle, comprising:

refrigerant;

a compressor applying a workload to said refrigerant, said compressor having a refrigerant suction side and a refrigerant discharge side;

an outer heat exchanger transmitting heat between said refrigerant and ambient air, said outer heat exchanger having a first side and a second side;

a blower leading air for air-conditioning a passenger compartment of the vehicle;

a heat-radiating inner heat exchanger transmitting the heat of said refrigerant to the air led by said blower, said heat-radiating inner heat exchanger having a refrigerant inlet side and a refrigerant outlet side;

an expansion valve adiabatically expanding said refrigerant, said expansion value having a refrigerant inlet side and a refrigerant outlet side;

a heat-absorbing inner heat exchanger transmitting the heat of the air led by said blower to said refrigerant, said heat-absorbing inner heat exchanger having a refrigerant inlet side and a refrigerant outlet side; and refrigerant passage switching means for setting a refrigeration cycle to one of a cooling mode, a heating mode and a weak heating mode, said refrigerant passage switching means including a plurality of series auxiliary conduits which connect said heat-absorbing inner heat exchanger and said outer heat exchanger in series during the weak heating mode, in the cooling mode, said refrigerant flowing in the order of said compressor, said outer heat exchanger, said expansion valve, said heat-absorbing inner heat exchanger and said compressor, in the heating mode, said refrigerant flowing in the order of said compressor, said heat-radiating inner heat exchanger, said expansion valve, said heat-absorbing inner heat exchanger and said compressor while bypassing said outer heat exchanger, and in the weak heating mode, said refrigerant flowing in the order of said compressor, said heat-radiating inner heat exchanger, said expansion valve, said outer heat exchanger and said compressor.

9. An air conditioner for a vehicle, as claimed in claim 8, wherein said refrigerant passage switching means includes:

a first series auxiliary conduit which connects the refrigerant outlet side of said heat-absorbing inner heat exchanger and the second side of said outer heat exchanger, a second series auxiliary conduit which connects the refrigerant suction side of said compressor and the first side of said outer heat exchanger, a first refrigerant passage control means which is disposed in the first series auxiliary conduit, a second refrigerant passage control means which is disposed in the second series auxiliary conduit, and a third refrigerant passage control means which is disposed between the first and second series auxiliary conduits.

10. An air conditioner as claimed in claim 9, wherein said first refrigerant passage control means is one of a two-way valve and a one-way valve, and each of said second and third refrigerant passage control means is a two-way valve.

11. An air conditioner as claimed in claim 8, wherein said refrigerant passage switching means includes:

a four-way valve disposed between said heat-absorbing inner heat exchanger and said compressor, a first series auxiliary conduit which connects the four-way valve and an end of said outer heat exchanger, a second series auxiliary conduit which connects the four-way valve and the other end of said outer heat exchanger, a first refrigerant passage control means disposed in the first series auxiliary conduit, and a second refrigerant passage control means disposed in the second series auxiliary conduit.

12. An air conditioner as claimed in claim 8, wherein said refrigerant passage switching means includes:

a four-way valve which is disposed between said expansion valve and said heat-absorbing inner heat exchanger, a first series auxiliary conduit which connects the four-way valve and an end of said outer heat exchanger, a second series auxiliary conduit which connects the four-way valve and the other end of said outer heat exchanger, a first refrigerant passage control means which is disposed in the first series auxiliary conduit, and a second refrigerant passage control means which is disposed in the second series auxiliary conduit.

13. An air conditioner as claimed in claim 8, wherein said refrigerant passage switching means includes:

a first series auxiliary conduit which connects the refrigerant outlet side of said expansion valve and the second side of said outer heat exchanger, a second series auxiliary conduit which connects the refrigerant inlet side of said heat-absorbing inner heat exchanger and the first side of said outer heat exchanger, a first refrigerant passage control means which is disposed in the first series auxiliary conduit, a second refrigerant passage control means which is disposed in the second series auxiliary conduit, and a third refrigerant passage control means which is disposed between said expansion valve an said heat-absorbing inner heat exchanger and between the first and second series auxiliary conduits.

14. An air conditioner for a vehicle, comprising:

refrigerant;

a compressor applying a workload to said refrigerant, said compressor having a refrigerant suction side and a refrigerant discharge side;

an outer heat exchanger transmitting heat between said refrigerant and ambient air, said outer heat exchanger having a first side and a second side;

a blower leading air for air-conditioning a passenger compartment of the vehicle;

a heat-radiating inner heat exchanger transmitting the heat of said refrigerant to the air led by said blower, said heat-radiating inner heat exchanger having a refrigerant inlet side and a refrigerant outlet side;

an expansion valve adiabatically expanding said refrigerant, said expansion valve having a refrigerant inlet side and a refrigerant outlet side;

a heat-absorbing inner heat exchanger transmitting the heat of the air led by said blower to said refrigerant, said heat-absorbing inner heat exchanger having a refrigerant inlet side and a refrigerant outlet side;

an inner thermal condition detecting means for detecting a thermal condition of the passenger compartment and for outputting a signal indicative of said thermal condition;

an inner thermal condition setting means for setting a desired thermal condition of the passenger compartment by means of a setting operation by a driver of the vehicle; and refrigerant passage switching means for switching a refrigerant flow among said compressor, said outer heat exchanger, Said heat-radiating inner heat exchanger, said expansion valve and said heat-absorbing inner heat exchanger, said refrigerant passage switching means setting a refrigeration cycle to one of a cooling mode, a first heating mode and a second heating mode according to said signal output from said inner thermal condition detecting means and said inner thermal condition setting means, the first heating mode being a main heating operation for strongly heating the passenger compartment, and the second heating mode being a weak heating operation for weakly heating the passenger compartment.

15. An air conditioner as claimed in claim 14, wherein the first heating mode is a stable heating mode for stably heating the passenger compartment, and the second heating mode is a transient heating mode implemented during an early period of the heating operation.

16. An air conditioner for a vehicle as claimed in claim 14, wherein said refrigerant passage switching means includes a plurality of parallel auxiliary conduits which connect said heat-absorbing inner heat exchanger and said outer heat exchanger in parallel during the second heating mode.

17. An air conditioner for a vehicle, as claimed in claim 14, wherein said refrigerant passage switching means includes plurality of a series auxiliary conduits which connect said heat-absorbing inner heat exchanger and said outer heat exchanger in series during the second heating mode.

18. An air conditioner as claimed in claim 14, further comprising:

means for detecting a passenger compartment thermal condition, and switching control means for implementing the first heating mode during a stable temperature in the passenger compartment and for implementing the second heating mode during an early period of a heating operation or when a transient temperature in the passenger compartment occurs in accordance with the detected passenger compartment thermal condition.

19. An air conditioner as claimed in claim 14, further comprising:

means for detecting a condition of a refrigeration cycle constituted by said compressor, outer heat exchanger, heat-radiating inner heat exchanger, expansion valve, and heat-absorbing inner heat exchanger, and means for implementing the first heating mode during a stable condition of the refrigeration cycle and for implementing the second heating mode during an early period of the refrigeration cycle or when a transient condition of the refrigeration cycle occurs in accordance with the detected condition of the refrigeration cycle.

* * * * *